(12) United States Patent
Nielsen et al.

(10) Patent No.: US 8,589,202 B2
(45) Date of Patent: Nov. 19, 2013

(54) METHODS AND APPARATUS FOR DISPLAYING AND PROCESSING FACILITIES MAP INFORMATION AND/OR OTHER IMAGE INFORMATION ON A MARKING DEVICE

(71) Applicants: Steven Nielsen, North Palm Beach, FL (US); Curtis Chambers, Palm Beach Gardens, FL (US); Jeffrey Farr, Tequesta, FL (US)

(72) Inventors: Steven Nielsen, North Palm Beach, FL (US); Curtis Chambers, Palm Beach Gardens, FL (US); Jeffrey Farr, Tequesta, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 13/795,337

(22) Filed: Mar. 12, 2013

(65) Prior Publication Data

US 2013/0194303 A1     Aug. 1, 2013

Related U.S. Application Data

(63) Continuation of application No. 12/701,496, filed on Feb. 5, 2010, which is a continuation-in-part of application No. 12/571,356, filed on Sep. 30, 2009, and a continuation-in-part of application No. 12/649,535, filed on Dec. 30, 2009, which is a continuation of application No. 12/569,192, filed on Sep. 29, 2009, which is a continuation-in-part of application No. 12/568,087, filed on Sep. 28, 2009, which is a continuation-in-part of application No. 12/539,497, filed on Aug. 11, 2009, now Pat. No. 8,280,631.

(60) Provisional application No. 61/151,778, filed on Feb. 11, 2009, provisional application No. 61/151,562, filed on Feb. 11, 2009, provisional application No. 61/102,169, filed on Oct. 2, 2008, provisional application No. 61/102,122, filed on Oct. 2, 2008, provisional application No. 61/102,205, filed on Oct. 2, 2008, provisional application No. 61/102,151, filed on Oct. 2, 2008.

(51) Int. Cl.
   *G06Q 10/00* (2012.01)
(52) U.S. Cl.
   USPC ........................................... 705/7.11
(58) Field of Classification Search
   None
   See application file for complete search history.

(56) References Cited

U.S. PATENT DOCUMENTS

| | | | |
|---|---|---|---|
| 3,988,922 | A | 11/1976 | Clark et al. |
| 4,623,282 | A | 11/1986 | Allen |

(Continued)

FOREIGN PATENT DOCUMENTS

| | | |
|---|---|---|
| CA | 2623761 | 10/2008 |
| CA | 2623466 | 6/2011 |

(Continued)

OTHER PUBLICATIONS

U.S. Appl. No. 13/797,229, filed Mar. 12, 2013, Nielsen et al.

(Continued)

*Primary Examiner* — Brett Feeney

(57) ABSTRACT

A marking device for a marking operation to mark a presence of an absence of one or more underground facilities is configured to access and display facilities map information, and/or other image information, as a visual aid to facilitate the marking operation. In various aspects, methods and apparatus relate to: selection of an "base" facilities map, or information from a database of facilities map data, relating to a given work side/dig area; selection of an pan and/or zoom (resolution) for displaying facilities map information; updating displayed facilities map information while a marking device is used during a marking operation (e.g. changing pan, zoom and/or orientation); overlaying on the displayed facilities map information marking information and/or landmark information relating to the marking operation; and storing locally on the marking device, and/or transmitting from the marking device, facilities map information and/or overlaid marking/landmark information (e.g., for further processing, analysis and/or subsequent display).

47 Claims, 18 Drawing Sheets

(56) References Cited

U.S. PATENT DOCUMENTS

| | | |
|---|---|---|
| 4,899,293 A | 2/1990 | Dawson et al. |
| 4,972,319 A | 11/1990 | Delorme |
| 4,984,279 A | 1/1991 | Kidney et al. |
| 4,989,151 A | 1/1991 | Nuimura |
| 5,150,295 A | 9/1992 | Mattingly |
| 5,214,757 A * | 5/1993 | Mauney et al. ............... 715/751 |
| 5,299,300 A | 3/1994 | Femal |
| 5,311,195 A | 5/1994 | Mathis et al. |
| 5,329,464 A * | 7/1994 | Sumic et al. ...................... 703/1 |
| 5,379,045 A | 1/1995 | Gilbert et al. |
| 5,381,338 A | 1/1995 | Wysocki |
| 5,389,149 A | 2/1995 | Carey et al. |
| 5,467,271 A | 11/1995 | Abel et al. |
| 5,486,067 A | 1/1996 | Huynh |
| 5,487,139 A | 1/1996 | Saylor et al. |
| 5,490,646 A | 2/1996 | Shaw |
| 5,517,419 A * | 5/1996 | Lanckton et al. ............. 701/409 |
| 5,529,433 A | 6/1996 | Huynh |
| 5,553,407 A | 9/1996 | Stump |
| 5,576,973 A | 11/1996 | Haddy |
| 5,596,494 A | 1/1997 | Kuo |
| 5,652,717 A | 7/1997 | Miller et al. |
| 5,659,985 A | 8/1997 | Stump |
| 5,673,050 A * | 9/1997 | Moussally et al. ............... 342/22 |
| 5,689,415 A | 11/1997 | Calotychos et al. |
| 5,699,244 A | 12/1997 | Clark, Jr. |
| 5,704,142 A | 1/1998 | Stump |
| 5,751,450 A | 5/1998 | Robinson |
| 5,819,859 A * | 10/1998 | Stump et al. ..................... 175/26 |
| 5,848,373 A | 12/1998 | Delorme et al. |
| 5,864,632 A | 1/1999 | Ogawa et al. |
| 5,918,565 A * | 7/1999 | Casas ............................ 116/211 |
| 6,024,655 A | 2/2000 | Coffee |
| 6,026,135 A | 2/2000 | McFee et al. |
| 6,026,345 A | 2/2000 | Shah |
| 6,037,010 A | 3/2000 | Kahmann et al. |
| 6,053,260 A * | 4/2000 | Boon et al. ...................... 173/90 |
| 6,064,940 A | 5/2000 | Rodgers |
| 6,074,693 A | 6/2000 | Manning |
| 6,075,481 A | 6/2000 | Eslambolchi et al. |
| 6,095,081 A | 8/2000 | Gochenour |
| 6,119,376 A | 9/2000 | Stump |
| 6,138,906 A | 10/2000 | DeMayo |
| 6,148,262 A | 11/2000 | Fry |
| 6,188,392 B1 | 2/2001 | O'Connor et al. |
| 6,240,360 B1 | 5/2001 | Phelan |
| 6,282,477 B1 | 8/2001 | Gudat et al. |
| 6,285,911 B1 | 9/2001 | Watts et al. |
| 6,292,108 B1 | 9/2001 | Straser et al. |
| 6,294,022 B1 | 9/2001 | Eslambolchi et al. |
| 6,299,934 B1 | 10/2001 | Manning |
| 6,320,518 B2 | 11/2001 | Saeki et al. |
| 6,337,693 B1 | 1/2002 | Roy |
| RE37,574 E | 3/2002 | Rawlins |
| 6,388,629 B1 * | 5/2002 | Albats et al. .................... 343/757 |
| 6,390,336 B1 | 5/2002 | Orozco |
| 6,397,147 B1 | 5/2002 | Whitehead |
| 6,401,051 B1 * | 6/2002 | Merriam ........................ 702/150 |
| 6,437,708 B1 | 8/2002 | Brouwer |
| 6,438,239 B1 | 8/2002 | Kuechen |
| 6,477,588 B1 | 11/2002 | Yerazunis |
| 6,496,137 B1 | 12/2002 | Johansson |
| 6,512,478 B1 | 1/2003 | Chien |
| 6,526,352 B1 | 2/2003 | Breed et al. |
| 6,526,400 B1 | 2/2003 | Takata |
| 6,617,996 B2 | 9/2003 | Johansson |
| 6,650,293 B1 | 11/2003 | Eslambolchi |
| 6,658,148 B1 | 12/2003 | Fung et al. |
| 6,700,526 B2 * | 3/2004 | Witten ............................. 342/22 |
| 6,710,741 B2 | 3/2004 | Tucker |
| 6,723,375 B2 * | 4/2004 | Zeck et al. ..................... 427/136 |
| 6,751,552 B1 | 6/2004 | Minelli |
| 6,751,553 B2 * | 6/2004 | Young et al. ....................... 702/5 |
| 6,778,128 B2 * | 8/2004 | Tucker et al. .................... 342/22 |
| 6,798,379 B2 * | 9/2004 | Tucker et al. ............. 342/357.31 |
| 6,825,793 B2 * | 11/2004 | Taylor et al. ..................... 342/22 |
| 6,833,795 B1 * | 12/2004 | Johnson et al. ............. 340/853.5 |
| 6,850,161 B1 * | 2/2005 | Elliott et al. ................ 340/572.1 |
| 6,898,525 B1 | 5/2005 | Minelli |
| 6,904,361 B1 * | 6/2005 | Tallman et al. ..................... 703/1 |
| 6,941,890 B1 | 9/2005 | Cristo et al. |
| 6,947,028 B2 | 9/2005 | Shkolnikov |
| 6,956,524 B2 * | 10/2005 | Tucker et al. ............. 342/357.31 |
| 6,956,564 B1 | 10/2005 | Williams |
| 6,972,698 B2 | 12/2005 | Deguchi |
| 6,975,942 B2 * | 12/2005 | Young et al. ....................... 702/5 |
| 6,999,021 B2 * | 2/2006 | Taylor et al. ..................... 342/22 |
| 7,009,399 B2 | 3/2006 | Olsson et al. |
| 7,048,320 B2 | 5/2006 | Rubel |
| 7,133,802 B2 * | 11/2006 | Koch et al. .................... 702/150 |
| 7,142,196 B1 * | 11/2006 | Connor et al. ................. 345/173 |
| 7,319,387 B2 * | 1/2008 | Willson et al. ............. 340/539.13 |
| 7,345,617 B2 | 3/2008 | Friborg |
| 7,353,110 B2 | 4/2008 | Kim |
| 7,356,406 B2 * | 4/2008 | Harrison et al. ............... 701/532 |
| 7,372,247 B1 * | 5/2008 | Giusti et al. ..................... 324/67 |
| 7,400,976 B2 * | 7/2008 | Young et al. ....................... 702/5 |
| 7,403,853 B1 | 7/2008 | Janky et al. |
| 7,443,154 B1 | 10/2008 | Merewether et al. |
| 7,451,721 B1 | 11/2008 | Garza et al. |
| 7,482,973 B2 * | 1/2009 | Tucker et al. ............. 342/357.48 |
| 7,532,127 B2 | 5/2009 | Holman et al. |
| 7,586,433 B1 | 9/2009 | Johansson |
| 7,636,901 B2 | 12/2009 | Munson |
| 7,640,105 B2 * | 12/2009 | Nielsen et al. ................. 701/484 |
| 7,664,530 B2 | 2/2010 | Skelton |
| 7,733,077 B1 | 6/2010 | Merewether et al. |
| 7,773,095 B1 * | 8/2010 | Badrak et al. .................. 345/619 |
| 7,834,801 B2 * | 11/2010 | Waite et al. ..................... 342/22 |
| 7,834,806 B2 | 11/2010 | Tucker et al. |
| 7,853,463 B2 * | 12/2010 | Orifici et al. .................. 705/7.17 |
| 7,889,124 B2 | 2/2011 | Islam et al. |
| 7,889,888 B2 | 2/2011 | Deardorr |
| 7,929,981 B2 | 4/2011 | Sangberg |
| 7,978,129 B2 | 7/2011 | Sawyer et al. |
| 7,986,246 B2 | 7/2011 | Angelis et al. |
| 7,990,151 B2 | 8/2011 | Olsson |
| 8,060,304 B2 | 11/2011 | Nielsen et al. |
| 8,081,112 B2 * | 12/2011 | Tucker et al. ................... 342/459 |
| 8,106,660 B1 | 1/2012 | Merewether et al. |
| 8,118,192 B2 | 2/2012 | Daugherty |
| 8,144,245 B2 | 3/2012 | Vik |
| 8,155,390 B2 | 4/2012 | Nielsen et al. |
| 8,194,932 B2 | 6/2012 | Nielsen et al. |
| 8,218,827 B2 | 7/2012 | Nielsen et al. |
| 8,249,306 B2 | 8/2012 | Nielsen et al. |
| 8,260,489 B2 | 9/2012 | Nielsen et al. |
| 8,264,409 B2 | 9/2012 | Miller |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,301,380 B2 | 10/2012 | Nielsen et al. |
| 8,311,765 B2 | 11/2012 | Nielsen et al. |
| 8,340,359 B2 * | 12/2012 | Nielsen et al. ................. 382/113 |
| 8,355,542 B2 | 1/2013 | Nielsen et al. |
| 8,356,255 B2 * | 1/2013 | Nielsen et al. ................. 715/764 |
| 8,361,543 B2 | 1/2013 | Nielsen et al. |
| 8,374,789 B2 | 2/2013 | Nielsen et al. |
| 8,384,742 B2 * | 2/2013 | Nielsen et al. ................. 345/632 |
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,424,486 B2 | 4/2013 | Nielsen et al. |
| 2002/0035432 A1 | 3/2002 | Kubica et al. |
| 2002/0052750 A1 | 5/2002 | Hirooka |
| 2002/0053608 A1 | 5/2002 | Zeck et al. |
| 2002/0103625 A1 | 8/2002 | Card et al. |
| 2002/0115472 A1 | 8/2002 | Andress |

(56) References Cited

U.S. PATENT DOCUMENTS

| | | |
|---|---|---|
| 2002/0122000 A1 | 9/2002 | Bradley et al. |
| 2002/0130806 A1* | 9/2002 | Taylor et al. .................. 342/22 |
| 2002/0130906 A1 | 9/2002 | Miyaki |
| 2003/0012411 A1* | 1/2003 | Sjostrom et al. ............. 382/109 |
| 2003/0064705 A1 | 4/2003 | Desiderio |
| 2003/0080897 A1 | 5/2003 | Tranchina |
| 2003/0100316 A1 | 5/2003 | Odamura |
| 2003/0135328 A1 | 7/2003 | Burns et al. |
| 2003/0168834 A1 | 9/2003 | Ulrich |
| 2003/0196585 A1 | 10/2003 | McDonald et al. |
| 2004/0006425 A1 | 1/2004 | Wood |
| 2004/0051368 A1 | 3/2004 | Caputo |
| 2004/0070535 A1 | 4/2004 | Olsson et al. |
| 2004/0124988 A1 | 7/2004 | Leonard et al. |
| 2004/0210370 A1* | 10/2004 | Gudat et al. .................... 701/50 |
| 2004/0220731 A1* | 11/2004 | Tucker et al. ................ 701/213 |
| 2004/0225444 A1* | 11/2004 | Young et al. .................. 702/14 |
| 2005/0023367 A1 | 2/2005 | Reighard |
| 2005/0034074 A1 | 2/2005 | Munson |
| 2005/0038825 A1* | 2/2005 | Tarabzouni et al. .......... 707/200 |
| 2005/0054457 A1 | 3/2005 | Eyestone et al. |
| 2005/0062475 A1 | 3/2005 | Nakanishi |
| 2005/0150399 A1 | 7/2005 | Wiley |
| 2005/0156600 A1 | 7/2005 | Olsson |
| 2005/0206562 A1* | 9/2005 | Willson et al. ........... 342/357.07 |
| 2005/0232475 A1 | 10/2005 | Floeder |
| 2005/0278371 A1 | 12/2005 | Funk et al. |
| 2006/0026020 A1* | 2/2006 | Waite et al. ...................... 705/1 |
| 2006/0055584 A1* | 3/2006 | Waite et al. ..................... 342/22 |
| 2006/0077095 A1* | 4/2006 | Tucker et al. ............ 342/357.08 |
| 2006/0085133 A1* | 4/2006 | Young et al. ...................... 702/5 |
| 2006/0085396 A1* | 4/2006 | Evans et al. ...................... 707/3 |
| 2006/0132136 A1 | 6/2006 | Mizuno |
| 2006/0169776 A1 | 8/2006 | Hornbaker |
| 2006/0208927 A1 | 9/2006 | Poor et al. |
| 2006/0220955 A1 | 10/2006 | Hamilton |
| 2006/0262963 A1 | 11/2006 | Navulur |
| 2006/0276985 A1 | 12/2006 | Xu |
| 2006/0282191 A1 | 12/2006 | Gotfried |
| 2006/0282280 A1* | 12/2006 | Stotz et al. ........................ 705/1 |
| 2006/0289679 A1 | 12/2006 | Johnson et al. |
| 2007/0031042 A1 | 2/2007 | Simental |
| 2007/0040558 A1 | 2/2007 | Overby et al. |
| 2007/0112936 A1* | 5/2007 | Harrison ...................... 709/217 |
| 2007/0143676 A1* | 6/2007 | Chen .............................. 715/700 |
| 2007/0195011 A1* | 8/2007 | Hatori et al. ................... 345/2.1 |
| 2007/0219722 A1* | 9/2007 | Sawyer et al. .................... 702/1 |
| 2007/0223803 A1 | 9/2007 | Shindo |
| 2007/0268110 A1 | 11/2007 | Little |
| 2007/0286021 A1* | 12/2007 | Hoenmans et al. ............. 367/56 |
| 2007/0288159 A1* | 12/2007 | Skelton ......................... 701/207 |
| 2008/0010009 A1 | 1/2008 | Miyoshi |
| 2008/0013940 A1 | 1/2008 | Jung |
| 2008/0021863 A1* | 1/2008 | Evans et al. ....................... 707/1 |
| 2008/0103695 A1 | 5/2008 | Whiting |
| 2008/0125942 A1 | 5/2008 | Tucker et al. |
| 2008/0180319 A1 | 7/2008 | Islam |
| 2008/0180322 A1 | 7/2008 | Islam |
| 2008/0194268 A1 | 8/2008 | Koch |
| 2008/0204322 A1 | 8/2008 | Oswald et al. |
| 2008/0208415 A1 | 8/2008 | Vik |
| 2008/0228294 A1* | 9/2008 | Nielsen et al. ................... 700/58 |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0005977 A1 | 1/2009 | Chung |
| 2009/0063258 A1 | 3/2009 | Mueller et al. |
| 2009/0109081 A1 | 4/2009 | Ryerson |
| 2009/0121933 A1* | 5/2009 | Tucker et al. ............ 342/357.13 |
| 2009/0171616 A1 | 7/2009 | Zhang et al. |
| 2009/0174768 A1* | 7/2009 | Blackburn et al. ............ 348/130 |
| 2009/0185858 A1 | 7/2009 | Malit |
| 2009/0201311 A1 | 8/2009 | Nielsen et al. |
| 2009/0202101 A1 | 8/2009 | Nielsen et al. |
| 2009/0202111 A1 | 8/2009 | Nielsen et al. |
| 2009/0204238 A1 | 8/2009 | Nielsen et al. |
| 2009/0204466 A1 | 8/2009 | Nielsen et al. |
| 2009/0204625 A1* | 8/2009 | Chambers et al. ............ 707/101 |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0238417 A1* | 9/2009 | Nielsen et al. ................. 382/113 |
| 2009/0324815 A1 | 12/2009 | Nielsen et al. |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1* | 2/2010 | Tucker et al. ............ 342/357.08 |
| 2010/0070347 A1 | 3/2010 | Chen |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0094553 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0207816 A1 | 8/2010 | Islam et al. |
| 2010/0211354 A1* | 8/2010 | Park et al. ..................... 702/165 |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |

(56) References Cited

U.S. PATENT DOCUMENTS

| | | |
|---|---|---|
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0093162 A1 | 4/2011 | Nielsen et al. |
| 2011/0093304 A1 | 4/2011 | Nielsen et al. |
| 2011/0093306 A1 | 4/2011 | Nielsen et al. |
| 2011/0095885 A9 | 4/2011 | Nielsen et al. |
| 2011/0117272 A1 | 5/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0249394 A1 | 10/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2012/0274476 A1 | 11/2012 | Nielsen et al. |
| 2012/0328162 A1 | 12/2012 | Nielsen et al. |
| 2012/0330849 A1 | 12/2012 | Nielsen et al. |
| 2013/0002854 A1 | 1/2013 | Nielsen et al. |
| 2013/0006718 A1 | 1/2013 | Nielsen et al. |
| 2013/0044918 A1 | 2/2013 | Nielsen et al. |
| 2013/0085670 A1 | 4/2013 | Nielsen et al. |

FOREIGN PATENT DOCUMENTS

| | | |
|---|---|---|
| CH | 695087 A5 | 12/2005 |
| EP | 522862 | 1/1993 |
| EP | 1974638 | 10/2008 |
| JP | 7256169 | 10/1994 |
| JP | 7128061 | 5/1995 |
| JP | 8285601 | 11/1996 |
| JP | 10060865 | 3/1998 |
| JP | 11072348 | 3/1999 |
| JP | 2000501666 | 2/2000 |
| JP | 2002079167 | 3/2002 |
| JP | 2006003206 | 1/2006 |
| WO | WO9516827 | 6/1995 |
| WO | WO9844364 | 10/1998 |
| WO | WO0194016 | 12/2001 |
| WO | WO0228541 | 4/2002 |
| WO | WO2007014072 | 2/2007 |

OTHER PUBLICATIONS

U.S. Appl. No. 13/834,382, filed Mar. 15, 2013, Nielsen et al.
U.S. Appl. No. 13/846,120, filed Mar. 18, 2013, Nielsen et al.
U.S. Appl. No. 13/867,521, filed Apr. 22, 2013, Nielsen et al.
Corrected Notice of Allowability dated May 10, 2013 from U.S. Appl. No. 12/797,227.
Corrected Notice of Allowability dated May 13, 2013 from U.S. Appl. No. 12/429,929.
Corrected Notice of Allowability dated May 14, 2013 from U.S. Appl. No. 12/797,202.
Corrected Notice of Allowability from U.S. Appl. No. 12/364,369 dated Apr. 15, 2013.
Corrected Notice of Allowability from U.S. Appl. No. 12/622,768 dated Apr. 3, 2013.
Corrected Notice of Allowability from U.S. Appl. No. 12/703,958 dated Apr. 18, 2013.
Corrected Notice of Allowability from U.S. Appl. No. 12/797,202 dated Apr. 4, 2013.
Corrected Notice of Allowability from U.S. Appl. No. 12/797,227 dated Apr. 17, 2013.
Notice of Allowance dated Mar. 28, 2013 from U.S. Appl. No. 12/797,227.
Notice of Allowance dated Apr. 25, 2013 from U.S. Appl. No. 12/364,359.
Notice of Allowance dated May 10, 2013 from U.S. Appl. No. 12/797,243.
Notice of Allowance dated Mar. 12, 2013 from U.S. Appl. No. 12/429,929.
Office Action dated Feb. 26, 2013 from Canadian Application No. 2,738,968.
Office Action dated Mar. 13, 2013 from Chinese Application No. 201080045879.1.
Office Action dated Mar. 20, 2013 from U.S. Appl. No. 12/764,164.
Office Action dated Mar. 25, 2013 from U.S. Appl. No. 12/797,211.
Office Action dated Mar. 28, 2013 from U.S. Appl. No. 12/571,408.
Office Action dated Apr. 26, 2013 from U.S. Appl. No. 12/859,394.
Office Action dated May 10, 2013 from U.S. Appl. No. 12/786,929.
U.S. Appl. No. 13/644,226, filed Oct. 3, 2012, Nielsen et al.
U.S. Appl. No. 13/686,262, filed Nov. 27, 2012, Nielsen et al.
U.S. Appl. No. 13/751,862, filed Jan. 28, 2013, Nielsen et al.
3M Dynatel, Brochure, 2006, 1-4.
3M Dynatel, Locating and Marking System, Brochure, 2007, 1-16.
Applied Geophysics. Telford et al. Cambridge University Press. Library of Congress catalogue card No. 74-16992. First published in 1976; reprinted 1977, 1978, 1980-82. Chapter on Magnetic Methods, pp. 123-217.
ArcFM UT, "A GIS for Utilities Based on Standards," White Paper, AED SICAD, Sep. 2008, 1-28.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http:/www.esri.com/library/brochures/pdfs/arcpadbro.pdf.
ArcPad: Mobile GIS, ESRI White Paper, Sep. 2004, 1-17, http://www.esri.com/library/whitepapers/pdfs/arcpad.pdf.
DigiTerra Explorer, brochure, v. 6, 2009, 1-2.
DigiTerra Explorer, User Manual, v. 5, 2007, 1-64.
European Search Report, Application No. 08743671.3, Nov. 16, 2011.
European Search Report, Application No. 08743673.9, Feb. 28, 2011.
GPS Technology Enhancing Underground Utility Locating, Underground Construction Magazine, Apr. 7, 2010, 4 pages, http://www.undergroundconstructionmagazine.com/print/1034?page=show.
International Search Report and Written Opinion, Application No. PCT/2009/05416, Jun. 7, 2010.
International Search Report and Written Opinion, Application No. PCT/2009/05443, Apr. 5, 2010.
International Search Report and Written Opinion, Application No. PCT/2010/000343, Jun. 1, 2010.
International Search Report and Written Opinion, Application No. PCT/2010/000389, Jun. 2, 2010.
International Search Report and Written Opinion, Application No. PCT/US10/000333, Jan. 21, 2011.
International Search Report and Written Opinion, Application No. PCT/US10/45161, Oct. 29, 2010.
International Search Report and Written Opinion, Application No. PCT/US10/45409, Nov. 18, 2010.
International Search Report and Written Opinion, Application No. PCT/US10/45969, Nov. 18, 2010.

(56) References Cited

OTHER PUBLICATIONS

International Search Report and Written Opinion, Application No. PCT/US2009/003957, Mar. 21, 2011.
International Search Report and Written Opinion, Application No. PCT/US2010/036029, Sep. 3, 2010.
International Search Report and Written Opinion, Application No. PCT/US2011/047807, Dec. 6, 2011.
Interpretation Theory in Applied Geophysics. Grant et al. Copyright 1965 by McGraw Hill. Library of Congress catalogue card No. 64-8413. Chapters 11-12 part III, pp. 306 to 464.
Jung, H.G., Structure Analysis Based Parking Slot Marking Recognition for Semi-automatic Parking System, Springer-Verlag Berlin Heidelberg 2006, 10 pages.
Luczak, S., "Increasing Accuracy of Tilt Measurements," Engineering Mechanics, vol. 14, 2007, p. 143-154.
MALA Application Note—Using MALA GPR systems with GPS equipment, Printed Matter No. 2894, 5 pages, www.malags.se, printed Apr. 9, 2010 (original publication date unknown).
MALA Application Note—Visualizing GPR data in Google Earth using MALA GPS Mapper, Printed Matter No. 2896, 3 pages, www.malags.se, printed Apr. 9, 2010 (original publication date unknown).
MALA GPS Mapper—Processing, 1 page, http://www.malags.se/Downloads/Software/processing/MALA-GPS-Mapper.aspx, printed on Apr. 9, 2010 (original publication date unknown).
MALA GPS Mapper—Product Releases, Sep. 19, 2007, 1 page, http://www.malags.se/News-and-Events/Product-Releases/MALA-GPS-Mapper.aspx, printed Apr. 9, 2010.
MALA Object Mapper™ Processing, 1 page, http://www.malags.se/Downloads/Software/Processing/Object-Mapper.aspx, printed Apr. 9, 2010 (original publication date unknown).
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
New Mexico's Recommended Marking Guidelines for Underground Utilities, May 2006, 8 pages.
Notice of Allowance dated Jan. 8, 2013 from U.S. Appl. No. 12/797,243.
Notice of Allowance dated Jan. 22, 2013 from U.S. Appl. No. 12/703,958.
Notice of Allowance dated Jan. 24, 2012 from U.S. Appl. No. 12/363,951.
Notice of Allowance dated Feb. 1, 2013 from U.S. Appl. No. 12/797,202.
Notice of Allowance dated Feb. 13, 2013 from U.S. Appl. No. 12/701,447.
Notice of Allowance dated Feb. 20, 2013 from U.S. Appl. No. 12/364,369.
Notice of Allowance dated Mar. 9, 2012 from U.S. Appl. No. 12/236,688.
Notice of Allowance dated May 2, 2012 from U.S. Appl. No. 12/429,929.
Notice of Allowance dated Jul. 12, 2012 from U.S. Appl. No. 12/539,497.
Notice of Allowance dated Aug. 1, 2012 from U.S. Appl. No. 12/364,339.
Notice of Allowance dated Aug. 25, 2011 from U.S. Appl. No. 11/696,606.
Notice of Allowance dated Sep. 5, 2012 from U.S. Appl. No. 12/854,370.
Notice of Allowance dated Oct. 1, 2012 from U.S. Appl. No. 12/607,843.
Notice of Allowance dated Oct. 17, 2012 from U.S. Appl. No. 12/236,688.
Notice of Allowance dated Oct. 25, 2012 from U.S. Appl. No. 12/639,373.
Notice of Allowance dated Nov. 7, 2012 from U.S. Appl. No. 12/639,041.
Notice of Allowance dated Dec. 12, 2012 from U.S. Appl. No. 12/703,958.
Notice of Allowance dated Dec. 21, 2012 from U.S. Appl. No. 12/364,339.
Notice of Allowance dated Apr. 28, 2011 from U.S. Appl. No. 29/356,631.
Notice of Allowance dated Jan. 25, 2012 from Canadian Application No. 2,710,189.
Notice of Allowance dated Nov. 12, 2010 from U.S. Appl. No. 29/356,633.
Notice of Allowance dated Nov. 12, 2010 from U.S. Appl. No. 29/356,634.
Notice of Allowance dated Nov. 12, 2010 from U.S. Appl. No. 29/356,635.
Notice of Allowance from U.S. Appl. No. 12/622,768 dated Jan. 24, 2013.
Office Action dated Jan. 9, 2013 from U.S. Appl. No. 12/571,411.
Office Action dated Jan. 12, 2012 from U.S. Appl. No. 12/364,369.
Office Action dated Jan. 25, 2012 from U.S. Appl. No. 12/568,087.
Office Action dated Feb. 1, 2011 from Canadian Application No. 2,691,707.
Office Action dated Feb. 9, 2012 from U.S. Appl. No. 12/364,339.
Office Action dated Feb. 28, 2012 from U.S. Appl. No. 12/539,497.
Office Action dated Mar. 2, 2012 from U.S. Appl. No. 12/639,041.
Office Action dated Mar. 13, 2012 from U.S. Appl. No. 12/364,359.
Office Action dated Mar. 20, 2012 from U.S. Appl. No. 12/764,164.
Office Action dated Mar. 26, 2012 from U.S. Appl. No. 12/701,500.
Office Action dated Mar. 29, 2012 from GB Application No. 1107052.1.
Office Action dated Apr. 10, 2012 from U.S. Appl. No. 12/854,370.
Office Action dated Apr. 12, 2012 from Canadian Application No. 2,691,707.
Office Action dated Apr. 13, 2012 from Australian Application No. 2008236526.
Office Action dated Apr. 17, 2012 from U.S. Appl. No. 12/607,843.
Office Action dated Apr. 25, 2012 from U.S. Appl. No. 12/363,046.
Office Action dated May 1, 2012 from Australian Application No. 2009300362.
Office Action dated May 15, 2012 from U.S. Appl. No. 12/797,243.
Office Action dated May 17, 2012 from U.S. Appl. No. 12/364,369.
Office Action dated May 24, 2011 from U.S. Appl. No. 12/363,951.
Office Action dated Jun. 1, 2012 from U.S. Appl. No. 12/855,977.
Office Action dated Jun. 4, 2012 from U.S. Appl. No. 12/568,087.
Office Action dated Jun. 4, 2012 from U.S. Appl. No. 12/703,958.
Office Action dated Jun. 8, 2012 from U.S. Appl. No. 12/639,041.
Office Action dated Jun. 13, 2012 from U.S. Appl. No. 12/639,373.
Office Action dated Jun. 16, 2010 from Canadian Application No. 2,691,707.
Office Action dated Jun. 18, 2012 from U.S. Appl. No. 12/701,468.
Office Action dated Jun. 18, 2012 from U.S. Appl. No. 12/701,496.
Office Action dated Jun. 18, 2012 from U.S. Appl. No. 12/701,505.
Office Action dated Jul. 2, 2012 from U.S. Appl. No. 12/797,262.
Office Action dated Jul. 12, 2012 from U.S. Appl. No. 12/571,411.
Office Action dated Jul. 26, 2012 from U.S. Appl. No. 12/639,041.
Office Action dated Jul. 27, 2012 from European Application No. 08743671.3.
Office Action dated Aug. 15, 2012 from Australian Application No. 2010214104.
Office Action dated Aug. 29, 2012 from U.S. Appl. No. 12/701,447.
Office Action dated Aug. 29, 2012 from U.S. Appl. No. 12/701,501.
Office Action dated Sep. 4, 2012, from U.S. Appl. No. 12/622,768.
Office Action dated Sep. 17, 2012 from Australian Patent Application No. 2010214099.
Office Action dated Sep. 18, 2012 from U.S. Appl. No. 12/701,500.
Office Action dated Sep. 21, 2012 from U.S. Appl. No. 12/797,202.
Office Action dated Sep. 25, 2012 from Australian Application No. 2010214053.
Office Action dated Sep. 26, 2011 from Canadian Application No. 2,739,119.
Office Action dated Sep. 26, 2011 from Canadian Application No. 2,739,320.
Office Action dated Oct. 2, 2012 from Japanese Application No. 2010-502170.
Office Action dated Oct. 4, 2011 from U.S. Appl. No. 12/364,359.
Office Action dated Oct. 12, 2012 from U.S. Appl. No. 12/701,505.

(56) References Cited

OTHER PUBLICATIONS

Office Action dated Oct. 15, 2012 from U.S. Appl. No. 12/797,227.
Office Action dated Oct. 19, 2012 from U.S. Appl. No. 12/797,243.
Office Action dated Oct. 20, 2011 from U.S. Appl. No. 12/639,041.
Office Action dated Oct. 24, 2011 from U.S. Appl. No. 12/236,688.
Office Action dated Nov. 9, 2011 from U.S. Appl. No. 12/429,929.
Office Action dated Nov. 14, 2012 from Canadian Application No. 2,750,908.
Office Action dated Nov. 15, 2011 from Canadian Application No. 2,691,707.
Office Action dated Nov. 20, 2012 from U.S. Appl. No. 12/701,468.
Office Action dated Nov. 21, 2012 from U.S. Appl. No. 12/701,496.
Office Action dated Nov. 23, 2012 from U.S. Appl. No. 12/855,977.
Office Action dated Nov. 26, 2012 from U.S. Appl. No. 12/764,164.
Office Action dated Dec. 5, 2012 from U.S. Appl. No. 12/797,262.
Office Action dated Dec. 18, 2012 from U.S. Appl. No. 12/786,929.
Office Action dated Dec. 20, 2012 from U.S. Appl. No. 12/571,408.
Office Action dated Dec. 28, 2012 from U.S. Appl. No. 12/364,359.
Office Action dated Dec. 30, 2011 from U.S. Appl. No. 12/701,447.
Office Action dated Jul. 20, 2010 from U.S. Appl. No. 11/696,606.
Office Action dated Jul. 11, 2011 from Canadian Application No. 2713282.
Office Action dated Oct. 6, 2010 from Canadian Application No. 2623761.
Office Action received Jan. 18, 2013 from Japanese Application No. 2009-553688.
Olsson, Office Action dated Sep. 13, 2012 from U.S. Appl. No. 12/827,993.
Our World is Magnetic; Versatile Proton Magnetometer/Gradiometer; http://ww.gemsys.ca/products/versatile-proton-magnetometer-gradiometer/ [retrieved from the internet on Oct. 26, 2012].
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Pickus, J., "Call USA—Automating "Call Before You Dig" Processes for a Major Utility," GITA's Annual Conference on Apr. 25-28, 2004, 19 pages.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Surface Geophysical Methods, Chapter III, Mar. 1997, 43 pages.
Trimble Comprehensive Utilities, brochure, 2010, 1-6.
Vanaartsen, S.J., GIS Automates Utility One Call Process, Proceeding ESRI, 1-15, http://proceedings.esri.com/library/useconf/proc06/papers/papers/pap_1148.pdf.
Virginia Underground utility marking standard, Mar. 2004, 20 pages.
Notice of Allowability dated Jul. 5, 2013 from U.S. Appl. No. 12/701,447.
Notice of Allowance dated Jun. 17, 2013 from Canadian Application No. 2,750,908.
Notice of Allowance dated Jul. 10, 2013 from U.S. Appl. No. 12/571,411.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Supplemental Notice of Allowability dated Aug. 1, 2013 from U.S. Appl. No. 12/571,411.

\* cited by examiner

METHODS AND APPARATUS FOR DISPLAYING AND PROCESSING FACILITIES MAP INFORMATION AND/OR OTHER IMAGE INFORMATION ON A MARKING DEVICE

CROSS-REFERENCE TO RELATED APPLICATIONS

This application claims a priority benefit, under 35 U.S.C. §120, as a continuation (CON) of U.S. Non-provisional application Ser. No. 12/701,496, entitled, "Methods And Apparatus For Displaying And Processing Facilities Map Information And/Or Other Image Information On A Marking Device," filed on Feb. 5, 2010.

Application Ser. No. 12/701,496 claims a priority benefit, under 35 U.S.C. §119(e), of U.S. Provisional Patent Application No. 61/151,562, entitled "Marking Device that has a Mechanism for Viewing Facilities Maps Integrated Therein and Associated Methods," filed on Feb. 11, 2009.

Application Ser. No. 12/701,496 also claims a priority benefit, under 35 U.S.C. §119(e), of U.S. Provisional Patent Application No. 61/151,778, entitled "Marking Device that has a Ticket Management Mechanism Integrated Therein and Associated Methods," filed on Feb. 11, 2009.

Application Ser. No. 12/701,496 also claims a priority benefit, under 35 U.S.C. §120, as a continuation-in-part (CIP) of U.S. Non-provisional application Ser. No. 12/571,356, entitled, "Method And Apparatus For Analyzing Locate And Marking Operations With Respect To Facilities Maps," filed on Sep. 30, 2009.

Application Ser. No. 12/571,356 in turn claims a priority benefit, under 35 U.S.C. §119(e), of U.S. Provisional Patent Application Ser. No. 61/102,169, entitled "Data Acquisition System For And Method Of Analyzing Locate Operations With Respect To Facilities Maps," filed on Oct. 2, 2008.

Application Ser. No. 12/701,496 also claims a priority benefit, under 35 U.S.C. §120, as a continuation-in-part (CIP) of U.S. Non-provisional application Ser. No. 12/649,535, entitled, "Method And Apparatus For Displaying an Electronic Rendering of a Locate and/or Marking Operation Using Display Layers," filed on Dec. 30, 2009.

Application Ser. No. 12/649,535 in turn claims a priority benefit, under 35 U.S.C. §120, as a continuation (CON) of U.S. Non-provisional application Ser. No. 12/569,192, entitled "Methods, Apparatus, and Systems for Generating Electronic Records of Locate and Marking Operations, and Combined Locate and Marking Apparatus for Same," filed on Sep. 29, 2009.

Application Ser. No. 12/569,192 in turn claims a priority benefit, under 35 U.S.C. §119(e), of U.S. Provisional Application Ser. No. 61/102,122, entitled "Combination Locate and Marking Device With a Data Acquisition System Installed Therein, and Associated Methods," filed on Oct. 2, 2008.

Application Ser. No. 12/569,192 also claims a priority benefit, under 35 U.S.C. §120, as a continuation-in-part (CIP) of U.S. Non-provisional application Ser. No. 12/568,087, entitled "Methods and Apparatus for Generating an Electronic Record of Environmental Landmarks Based on Marking Device Actuations," filed on Sep. 28, 2009.

Application Ser. No. 12/568,087 in turn claims the benefit, under 35 U.S.C. §119(e), of U.S. Provisional Patent Application Ser. No. 61/102,205, entitled "Data Acquisition For And Method Of Analyzing Locate Operations With Respect To Environmental Landmarks," filed Oct. 2, 2008.

Application Ser. No. 12/568,087 also claims a priority benefit, under 35 U.S.C. §120, as a continuation-in-part (CIP) of U.S. Non-provisional application Ser. No. 12/539,497, entitled "Methods and Apparatus for Generating an Electronic Record of a Marking Operation based on Marking Device Actuations," filed on Aug. 11, 2009.

Application Ser. No. 12/539,497 in turn claims the benefit, under 35 U.S.C. §119(e), of U.S. Provisional Application Ser. No. 61/102,151, entitled "Data acquisition system for and method of analyzing marking operations based on marking device actuations," filed on Oct. 2, 2008.

Each of the above-identified applications is hereby incorporated herein by reference.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

An example of a field service operation in the construction industry is a so-called "locate and marking operation," also commonly referred to more simply as a "locate operation" (or sometimes merely as "a locate"). In a typical locate operation, a locate technician visits a work site in which there is a plan to disturb the ground (e.g., excavate, dig one or more holes and/or trenches, bore, etc.) so as to determine a presence or an absence of one or more underground facilities (such as various types of utility cables and pipes) in a dig area to be excavated or disturbed at the work site. In some instances, a locate operation may be requested for a "design" project, in which there may be no immediate plan to excavate or otherwise disturb the ground, but nonetheless information about a presence or absence of one or more underground facilities at a work site may be valuable to inform a planning, permitting and/or engineering design phase of a future construction project.

In many states, an excavator who plans to disturb ground at a work site is required by law to notify any potentially affected underground facility owners prior to undertaking an excavation activity. Advanced notice of excavation activities may be provided by an excavator (or another party) by contacting a "one-call center." One-call centers typically are operated by a consortium of underground facility owners for the purposes of receiving excavation notices and in turn notifying facility owners and/or their agents of a plan to excavate. As part of an advanced notification, excavators typically provide to the one-call center various information relating to the planned activity, including a location (e.g., address) of the work site and a description of the dig area to be excavated or otherwise disturbed at the work site.

FIG. 1 illustrates an example in which a locate operation is initiated as a result of an excavator 1 providing an excavation notice to a one-call center 2. An excavation notice also is commonly referred to as a "locate request," and may be provided by the excavator to the one-call center via an electronic mail message, information entry via a website maintained by the one-call center, or a telephone conversation between the excavator and a technician at the one-call center. The locate request may include an address or some other location-related information describing the geographic location of a work site at which the excavation is to be performed, as well as a description of the dig area (e.g., a text description), such as its location relative to certain landmarks and/or its approximate dimensions, within which there is a plan to disturb the ground at the work site. One-call centers similarly may receive locate requests for design projects (for which, as discussed above, there may be no immediate plan to excavate or otherwise disturb the ground).

Using the information provided in a locate request for planned excavation or design projects, the one-call center identifies certain underground facilities that may be present at the indicated work site. For this purpose, many one-call centers typically maintain a collection "polygon maps" which indicate, within a given geographic area over which the one-call center has jurisdiction, generally where underground facilities may be found relative to some geographic reference frame or coordinate system.

Polygon maps typically are provided to the one-call centers by underground facilities owners within the jurisdiction of the one call center ("members" of the one-call center). A one-call center first provides the facility owner/member with one or more maps (e.g., street or property maps) within the jurisdiction, on which are superimposed some type of grid or coordinate system employed by the one-call center as a geographic frame of reference. Using the maps provided by the one-call center, the respective facilities owners/members draw one or more polygons on each map to indicate an area within which their facilities generally are disposed underground (without indicating the facilities themselves). These polygons themselves do not precisely indicate geographic locations of respective underground facilities; rather, the area enclosed by a given polygon generally provides an over-inclusive indication of where a given facilities owner's underground facilities are disposed. Different facilities owners/members may draw polygons of different sizes around areas including their underground facilities, and in some instances such polygons can cover appreciably large geographic regions (e.g., an entire subdivision of a residential area), which may further obfuscate the actual/precise location of respective underground facilities.

Based on the polygon maps collected from the facilities owners/members, the one-call center may in some instances create composite polygon maps to show polygons of multiple different members on a single map. Whether using single member or composite polygon maps, the one-call center examines the address or location information provided in the locate request and identifies a significant buffer zone around an identified work site so as to make an over-inclusive identification of facilities owners/members that may have underground facilities present (e.g., to err on the side of caution). In particular, based on this generally over-inclusive buffer zone around the identified work site (and in some instances significantly over-inclusive buffer zone), the one-call center consults the polygon maps to identify which member polygons intersect with all or a portion of the buffer zone so as to notify these underground facility owners/members and/or their agents of the proposed excavation or design project. Again, it should be appreciated that the buffer zones around an indicated work site utilized by one-call centers for this purpose typically embrace a geographic area that includes but goes well beyond the actual work site, and in many cases the geographic area enclosed by a buffer zone is significantly larger than the actual dig area in which excavation or other similar activities are planned. Similarly, as noted above, the area enclosed by a given member polygon generally does not provide a precise indication of where one or more underground facilities may in fact be found.

In some instances, one-call centers may also or alternatively have access to various existing maps of underground facilities in their jurisdiction, referred to as "facilities maps."

Facilities maps typically are maintained by facilities owners/members within the jurisdiction and show, for respective different utility types, where underground facilities purportedly may be found relative to some geographic reference frame or coordinate system (e.g., a grid, a street or property map, GPS latitude and longitude coordinates, etc.). Facilities maps generally provide somewhat more detail than polygon maps provided by facilities owners/members; however, in some instances the information contained in facilities maps may not be accurate and/or complete. For at least this reason, whether using polygon maps or facilities maps, as noted above the one-call center utilizes a significant buffer zone around an identified work site so as to make an over-inclusive identification of facilities owners/members that may have underground facilities present.

Once facilities implicated by the locate request are identified by a one-call center (e.g., via the polygon map/buffer zone process), the one-call center generates a "locate request ticket" (also known as a "locate ticket," or simply a "ticket"). The locate request ticket essentially constitutes an instruction to inspect a work site and typically identifies the work site of the proposed excavation or design and a description of the dig area, typically lists on the ticket all of the underground facilities that may be present at the work site (e.g., by providing a member code for the facility owner whose polygon falls within a given buffer zone), and may also include various other information relevant to the proposed excavation or design (e.g., the name of the excavation company, a name of a property owner or party contracting the excavation company to perform the excavation, etc.). The one-call center sends the ticket to one or more underground facility owners 4 and/or one or more locate service providers 3 (who may be acting as contracted agents of the facility owners) so that they can conduct a locate and marking operation to verify a presence or absence of the underground facilities in the dig area. For example, in some instances, a given underground facility owner 4 may operate its own fleet of locate technicians (e.g., locate technician 6), in which case the one-call center 2 may send the ticket to the underground facility owner 4. In other instances, a given facility owner may contract with a locate service provider to receive locate request tickets and perform a locate and marking operation in response to received tickets on their behalf.

Upon receiving the locate request, a locate service provider or a facility owner (hereafter referred to as a "ticket recipient") may dispatch a locate technician 5 to the work site of planned excavation to determine a presence or absence of one or more underground facilities in the dig area to be excavated or otherwise disturbed. A typical first step for the locate technician 5 includes utilizing an underground facility "locate device," which is an instrument or set of instruments (also referred to commonly as a "locate set") for detecting facilities that are concealed in some manner, such as cables and pipes that are located underground. The locate device is employed by the technician to verify the presence or absence of underground facilities indicated in the locate request ticket as potentially present in the dig area (e.g., via the facility owner member codes listed in the ticket). This process is often referred to as a "locate operation."

In one example of a locate operation, an underground facility locate device is used to detect electromagnetic fields that are generated by an applied signal provided along a length of a target facility to be identified. In this example, a locate device may include both a signal transmitter to provide the applied signal (e.g., which is coupled by the locate technician to a tracer wire disposed along a length of a facility), and a signal receiver which is generally a hand-held apparatus carried by the locate technician as the technician walks around the dig area to search for underground facilities. FIG. 2 illustrates a conventional locate device 20 (indicated by the dashed box) that includes a transmitter 22 and a locate receiver 24. The transmitter 22 is connected, via a connection point 26, to a target object (in this example, underground facility 28) located in the ground 21. The transmitter generates the applied signal 23, which is coupled to the underground facility via the connection point (e.g., to a tracer wire along the facility), resulting in the generation of a magnetic field 25. The magnetic field in turn is detected by the locate receiver 24, which itself may include one or more detection antenna (not shown). The locate receiver 24 indicates a presence of a facility when it detects electromagnetic fields arising from the applied signal 23. Conversely, the absence of a signal detected by the locate receiver generally indicates the absence of the target facility.

In yet another example, a locate device employed for a locate operation may include a single instrument, similar in some respects to a conventional metal detector. In particular, such an instrument may include an oscillator to generate an alternating current that passes through a coil, which in turn produces a first magnetic field. If a piece of electrically conductive metal is in close proximity to the coil (e.g., if an underground facility having a metal component is below/near the coil of the instrument), eddy currents are induced in the metal and the metal produces its own magnetic field, which in turn affects the first magnetic field. The instrument may include a second coil to measure changes to the first magnetic field, thereby facilitating detection of metallic objects.

In addition to the locate operation, the locate technician also generally performs a "marking operation," in which the technician marks the presence (and in some cases the absence) of a given underground facility in the dig area based on the various signals detected (or not detected) during the locate operation. For this purpose, the locate technician conventionally utilizes a "marking device" to dispense a marking material on, for example, the ground, pavement, or other surface along a detected underground facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground or pavement.

FIGS. 3A and 3B illustrate a conventional marking device 50 with a mechanical actuation system to dispense paint as a marker. Generally speaking, the marking device 50 includes a handle 38 at a proximal end of an elongated shaft 36 and resembles a sort of "walking stick," such that a technician may operate the marking device while standing/walking in an upright or substantially upright position. A marking dispenser holder 40 is coupled to a distal end of the shaft 36 so as to contain and support a marking dispenser 56, e.g., an aerosol paint can having a spray nozzle 54. Typically, a marking dispenser in the form of an aerosol paint can is placed into the holder 40 upside down, such that the spray nozzle 54 is proximate to the distal end of the shaft (close to the ground, pavement or other surface on which markers are to be dispensed).

In FIGS. 3A and 3B, the mechanical actuation system of the marking device 50 includes an actuator or mechanical trigger 42 proximate to the handle 38 that is actuated/triggered by the technician (e.g., via pulling, depressing or squeezing with fingers/hand). The actuator 42 is connected to a mechanical coupler 52 (e.g., a rod) disposed inside and along a length of the elongated shaft 36. The coupler 52 is in turn connected to an actuation mechanism 58, at the distal end of the shaft 36, which mechanism extends outward from the shaft in the direction of the spray nozzle 54. Thus, the actuator 42, the mechanical coupler 52, and the actuation mechanism 58 constitute the mechanical actuation system of the marking device 50.

FIG. 3A shows the mechanical actuation system of the conventional marking device 50 in the non-actuated state, wherein the actuator 42 is "at rest" (not being pulled) and, as a result, the actuation mechanism 58 is not in contact with the spray nozzle 54. FIG. 3B shows the marking device 50 in the actuated state, wherein the actuator 42 is being actuated (pulled, depressed, squeezed) by the technician. When actuated, the actuator 42 displaces the mechanical coupler 52 and the actuation mechanism 58 such that the actuation mechanism contacts and applies pressure to the spray nozzle 54, thus causing the spray nozzle to deflect slightly and dispense paint. The mechanical actuation system is spring-loaded so that it automatically returns to the non-actuated state (FIG. 3A) when the actuator 42 is released.

In some environments, arrows, flags, darts, or other types of physical marks may be used to mark the presence or absence of an underground facility in a dig area, in addition to or as an alternative to a material applied to the ground (such as paint, chalk, dye, tape) along the path of a detected utility. The marks resulting from any of a wide variety of materials and/or objects used to indicate a presence or absence of underground facilities generally are referred to as "locate marks." Often, different color materials and/or physical objects may be used for locate marks, wherein different colors correspond to different utility types. For example, the American Public Works Association (APWA) has established a standardized color-coding system for utility identification for use by public agencies, utilities, contractors and various groups involved in ground excavation (e.g., red=electric power lines and cables; blue=potable water; orange=telecommunication lines; yellow=gas, oil, steam). In some cases, the technician also may provide one or more marks to indicate that no facility was found in the dig area (sometimes referred to as a "clear").

As mentioned above, the foregoing activity of identifying and marking a presence or absence of one or more underground facilities generally is referred to for completeness as a "locate and marking operation." However, in light of common parlance adopted in the construction industry, and/or for the sake of brevity, one or both of the respective locate and marking functions may be referred to in some instances simply as a "locate operation" or a "locate" (i.e., without making any specific reference to the marking function). Accordingly, it should be appreciated that any reference in the relevant arts to the task of a locate technician simply as a "locate operation" or a "locate" does not necessarily exclude the marking portion of the overall process. At the same time, in some contexts a locate operation is identified separately from a marking operation, wherein the former relates more specifically to detection-related activities and the latter relates more specifically to marking-related activities.

Inaccurate locating and/or marking of underground facilities can result in physical damage to the facilities, property damage, and/or personal injury during the excavation process that, in turn, can expose a facility owner or contractor to significant legal liability. When underground facilities are damaged and/or when property damage or personal injury results from damaging an underground facility during an excavation, the excavator may assert that the facility was not accurately located and/or marked by a locate technician, while the locate contractor who dispatched the technician may in turn assert that the facility was indeed properly located and marked. Proving whether the underground facility was properly located and marked can be difficult after the excavation (or after some damage, e.g., a gas explosion), because in many cases the physical locate marks (e.g., the marking material or other physical marks used to mark the facility on the surface of the dig area) will have been disturbed or destroyed during the excavation process (and/or damage resulting from excavation).

SUMMARY

The inventors have appreciated that, at least in some circumstances, advance knowledge of existing facilities that may be present at a work site/dig area for a proposed excavation may be useful to a technician dispatched to perform a locate and/or marking operation. In this respect, facilities maps may be a valuable resource to the technician; as noted above, facilities maps generally are maintained by various facilities owners and these maps typically indicate the type and geographic location of one or more facility lines (e.g., pipes, cables, and the like) owned and/or operated by the facility owner(s). Although the accuracy of facilities maps may in some cases be suspect (e.g., due to incorrect information in the maps, age of the maps, lack of timely revisions that reflect the current status of deployed facilities, etc.), the various information present in many types of facilities maps generally provides at least some meaningful orientation to the deployment of underground facilities in a given area.

Accordingly, the inventors have recognized and appreciated that ready access to available facilities maps pertaining to a given work site/dig area may provide the technician with helpful information toward effectively and efficiently conducting a locate and/or marking operation. To this end, a library of facilities maps pertaining to various types of facilities in a given geographic area may be provided to a locate technician dispatched to the field to perform a locate and/or marking operation. For example, a library of appropriate facilities maps may be available for viewing electronically via a computer available at a particular work site (e.g., a laptop computer or other mobile computer disposed in the technician's vehicle). Alternatively, the locate technician may carry with them a set of paper facilities maps in his/her vehicle. The locate technician may review the facilities maps in their vehicle, for example, then proceed to the actual dig area to perform the locate and/or marking operation while attempting to remember relevant information in the facilities maps. However, especially for complex facilities maps, it may be difficult for the technician to commit to memory relevant information in the facilities maps, and it may be inconvenient for the technician to return to the vehicle to consult facilities maps once a locate and/or marking operation has begun.

In view of the foregoing, various embodiments of the present invention are directed to methods and apparatus for viewing facilities maps information on a marking device used to conduct a marking operation. In this manner, a technician may have access to, and may view locally (e.g., immediately before, during and/or after conducting a locate and/or marking operation in a given work site/dig area), various information derived from facilities maps. For purposes of the present disclosure, and as discussed in greater detail herein, "facilities maps information" refers to any information that may be derived from a facilities map, examples of which information include, but are not limited to, all or a portion of the imagery associated with a facilities map, any underlying metadata (e.g., GIS metadata, facility type information, line or symbol codes, etc.) that may accompany a facilities map or set of facilities maps, and any legend information that may be included in a facilities map.

In various aspects, the inventive concepts discussed herein generally relate to one of more of the following: 1) selection, from a local or remote library/archive, of one or more appropriate "base" facilities maps or database(s) of facility map data relating to a given work site/dig area; 2) manual or automated selection of an appropriate pan and/or zoom (resolution) for displaying, on a user interface/display of a marking device, facilities map information derived from the base facilities map(s); 3) appropriately updating (e.g., changing pan, zoom, orientation, etc.), if/as necessary, displayed facilities map information while a marking device is used during a marking operation; 4) overlaying, on the displayed facilities map information, marking information relating to the marking operation; and 5) storing locally on the marking device, and/or transmitting from the marking device, facilities map information and/or overlaid marking information (e.g., for further processing, analysis and/or subsequent display).

Some examples of marking devices configured to collect various information relating specifically to marking operations, which marking devices may be modified according to the inventive concepts described herein to facilitate display of facilities map information, are provided in U.S. publication no. 2008-0228294-A1, published Sep. 18, 2008, filed Mar. 13, 2007, and entitled "Marking System and Method With Location and/or Time Tracking," U.S. publication no. 2008-0245299-A1, published Oct. 9, 2008, filed Apr. 4, 2007, and entitled "Marking System and Method," and U.S. publication no. 2009-0204238-A1, published Aug. 13, 2009, filed Feb. 2, 2009, and entitled "Electronically Controlled Marking Apparatus and Methods," all of which publications are incorporated herein by reference. These publications describe, amongst other things, collecting information relating to the geographic location, time, and/or characteristics (e.g., color/type) of dispensed marking material from a marking device and generating an electronic record based on this collected information. It should be appreciated, however, that the inventive concepts discussed herein in connection with display of facilities map information may be applied generally to various instrumentation/equipment used for one or both of a locate operation and a marking operation (e.g., a marking device, a locate device such as a locate transmitter and/or locate receiver, a combined locate and marking device, etc.), as discussed in further detail below. An example of combined locate and marking device in which the inventive concepts discussed below may be implemented is described in U.S. Non-provisional application Ser. No. 12/569,192, entitled "Methods, Apparatus, and Systems for Generating Electronic Records of Locate and Marking Operations, and Combined Locate and Marking Apparatus for Same," filed on Sep. 29, 2009.

Similarly, it should be appreciated that pursuant to the inventive concepts described herein, facilities map information displayed on a marking device may facilitate execution of either or both of a locate operation and a marking operation, as at least in some instances a technician would have at their disposal, and use together, both a locate device and a marking device to detect and mark a presence or absence of one or more underground facilities at a work site/dig area.

Furthermore, in addition to facilities map information, it should be appreciated that the present disclosure contemplates other types of image information being accessed and displayed on a user interface/display of a marking device to facilitate various aspects of a locate and/or marking operation. For example, other types of maps (e.g., street/road maps, polygon maps, tax maps, etc.), architectural, construction and/or engineering drawings, land surveys, and photographic renderings/images, and various information derived therefrom, may be displayed on the marking device and may also be used as the basis for overlaying marking information relating to a marking operation. As with facilities map information, such image information and/or overlaid marking information may be stored locally on the marking device, and/or transmitted from the marking device (e.g., for further processing, analysis and/or subsequent display).

In sum, one embodiment of the present invention is directed to a marking apparatus to mark a presence or an absence of an underground facility. The marking apparatus comprises: a housing; a marking dispenser holder coupled to the housing to hold a replaceable marking material; an actuator that, when actuated, causes dispensing of the marking material; a display device coupled to the housing; at least one memory; and at least one processor, communicatively coupled to the display device and the at least one memory, and configured to display on the display device a map image that is generated based on first map data selected by the at least one processor.

Another embodiment is directed to a method for displaying information on a marking apparatus having a housing, a marking dispenser holder coupled to the housing to hold a replaceable marking material, an actuator that, when actuated, causes dispensing of the marking material, a display device coupled to the housing, at least one memory, and at least one processor, coupled to the display device and the at least one memory. The method comprises displaying on the display device a map image that is generated based on first map data selected by the at least one processor.

Another embodiment is directed to at least one computer-readable storage medium encoded with instructions that, when executed on at least one processor in marking apparatus having a housing, a marking dispenser holder coupled to the housing to hold a replaceable marking material, an actuator that, when actuated, causes dispensing of the marking material, a display device coupled to the processor and the housing, and at least one memory coupled to the at least one processor, causes the at least one processor to perform a method comprising displaying on the display device a map image that is generated based on first map data selected by the at least one processor.

Another embodiment is directed to a marking apparatus to mark a presence or an absence of an underground facility. The marking apparatus comprises: a housing; a marking dispenser holder coupled to the housing to hold a replaceable marking material; an actuator that, when actuated, causes dispensing of the marking material; a display device coupled to the housing; at least one memory; and at least one processor, communicatively coupled to the display device and the at least one memory, and configured to: display on the display device a map image that is generated based on first map data selected by the at least one processor and that includes a geographic location at which the marking apparatus has dispensed the marking material; and overlay an electronic representation of the marking material on the first map image at a position on the first map image corresponding to a location at which the marking material was dispensed.

Another embodiment is directed to a method for displaying information on a marking apparatus having a housing, a marking dispenser holder coupled to the housing to hold a replaceable marking material, an actuator that, when actuated, causes dispensing of the marking material, a display device coupled to the housing, at least one memory, and at least one processor, coupled to the display device and the at least one memory. The method comprises: displaying on the display device a map image that is generated based on first map data selected by the at least one processor and that includes a geographic location at which the marking apparatus has dispensed the marking material; and overlaying an electronic representation of the marking material on the first map image at a position on the first map image corresponding to a location at which the marking material was dispensed.

Another embodiment is directed to at least one computer-readable storage medium encoded with instructions that, when executed on at least one processor in marking apparatus having a housing, a marking dispenser holder coupled to the housing to hold a replaceable marking material, an actuator that, when actuated, causes dispensing of the marking material, a display device coupled to the processor and the housing, and at least one memory coupled to the at least one processor, causes the at least one processor to perform a method comprising: displaying on the display device a map image that is generated based on first map data selected by the at least one processor and that includes a geographic location at which the marking apparatus has dispensed the marking material; and overlaying an electronic representation of the marking material on the first map image at a position on the first map image corresponding to a location at which the marking material was dispensed.

Another embodiment is directed to a marking apparatus to mark a presence or an absence of an underground facility. The marking apparatus comprises: a housing; a marking dispenser holder coupled to the housing to hold a replaceable marking material; an actuator that, when actuated, causes dispensing of the marking material; a display device coupled to the housing; at least one memory; and at least one processor, communicatively coupled to the display device and the at least one memory, and configured to: display on the display device a map image that is generated based on first map data that comprises facilities map data and is selected by the at least one processor; and compare a location at which marking material was dispensed to a location of a facility line as indicated by the first map data and generate an alert based on the comparison.

Another embodiment is directed to a method for displaying information on a marking apparatus having a housing, a marking dispenser holder coupled to the housing to hold a replaceable marking material, an actuator that, when actuated, causes dispensing of the marking material, a display device coupled to the housing, at least one memory, and at least one processor, coupled to the display device and the at least one memory. The method comprises displaying on the display device a map image that is generated based on first map data that comprises facilities map data and is selected by the at least one processor; and comparing a location at which marking material was dispensed to a location of a facility line as indicated by the first map data and generating an alert based on the comparison.

Another embodiment is directed to at least one computer-readable storage medium encoded with instructions that, when executed on at least one processor in marking apparatus having a housing, a marking dispenser holder coupled to the housing to hold a replaceable marking material, an actuator that, when actuated, causes dispensing of the marking material, a display device coupled to the processor and the housing, and at least one memory coupled to the at least one processor, causes the at least one processor to perform a method comprising: displaying on the display device a map image that is generated based on first map data that comprises facilities map data and is selected by the at least one processor; and comparing a location at which marking material was dispensed to a location of a facility line as indicated by the first map data and generating an alert based on the comparison.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility. Additionally, the term "marking dispenser" refers to any apparatus, mechanism, or other device for dispensing and/or otherwise using, separately or in combination, a marking material and/or a marking object. An example of a marking dispenser may include, but is not limited to, a pressurized can of marking paint. The term "marking material" means any material, substance, compound, and/or element, used or which may be used separately or in combination to mark, signify, and/or indicate. Examples of marking materials may include, but are not limited to, paint, chalk, dye, and/or iron. The term "marking object" means any object and/or objects used or which may be used separately or in combination to mark, signify, and/or indicate. Examples of marking objects may include, but are not limited to, a flag, a dart, and arrow, and/or an RFID marking ball. It is contemplated that marking material may include marking objects. It is further contemplated that the terms "marking materials" or "marking objects" may be used interchangeably in accordance with the present disclosure.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "actuate" or "trigger" (verb form) are used interchangeably to refer to starting or causing any device, program, system, and/or any combination thereof to work, operate, and/or function in response to some type of signal or stimulus. Examples of actuation signals or stimuli may include, but are not limited to, any local or remote, physical, audible, inaudible, visual, non-visual, electronic, mechanical, electromechanical, biomechanical, biosensing or other signal, instruction, or event. The terms "actuator" or "trigger" (noun form) are used interchangeably to refer to any method or device used to generate one or more signals or stimuli to cause or causing actuation. Examples of an actuator/trigger may include, but are not limited to, any form or combination of a lever, switch, program, processor, screen, microphone for capturing audible commands, and/or other device or method. An actuator/trigger may also include, but is not limited to, a device, software, or program that responds to any movement and/or condition of a user, such as, but not limited to, eye movement, brain activity, heart rate, other data, and/or the like, and generates one or more signals or stimuli in response thereto. In the case of a marking device or other marking mechanism (e.g., to physically or electronically mark a facility or other feature), actuation may cause marking material to be dispensed, as well as various data relating to the marking operation (e.g., geographic location, time stamps, characteristics of material dispensed, etc.) to be logged in an electronic file stored in memory. In the case of a locate device or other locate mechanism (e.g., to physically locate a facility or other feature), actuation may cause a detected signal strength, signal frequency, depth, or other information relating to the locate operation to be logged in an electronic file stored in memory.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request" and "excavation notice" are used interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility. The term "historical ticket" refers to past tickets that have been completed.

The following U.S. published applications and patents are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;" and U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

DETAILED DESCRIPTION

Figure 1:
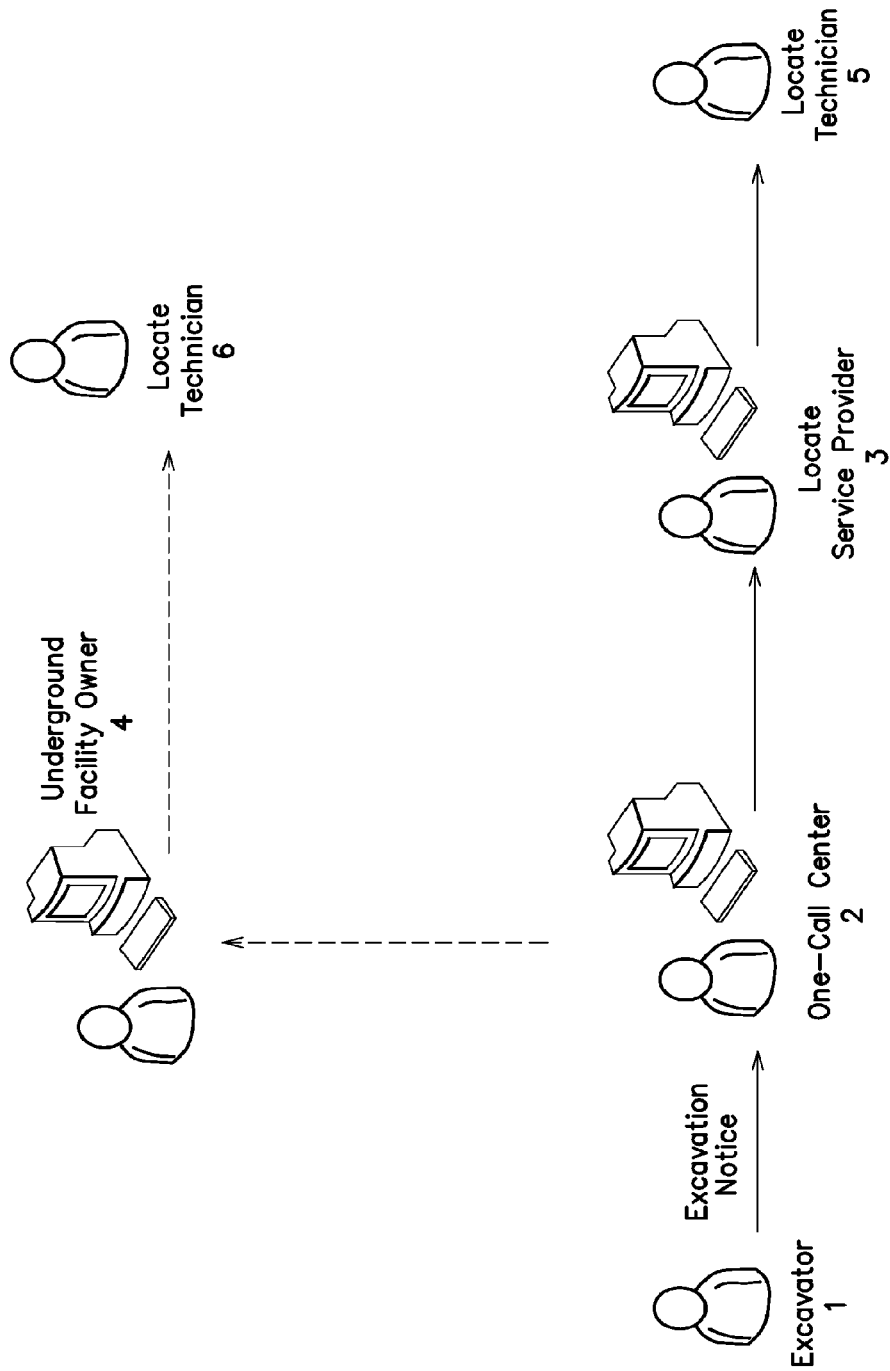
FIG. 1 shows an example in which a locate and marking operation is initiated as a result of an excavator providing an excavation notice to a one-call center.
Figure 2:
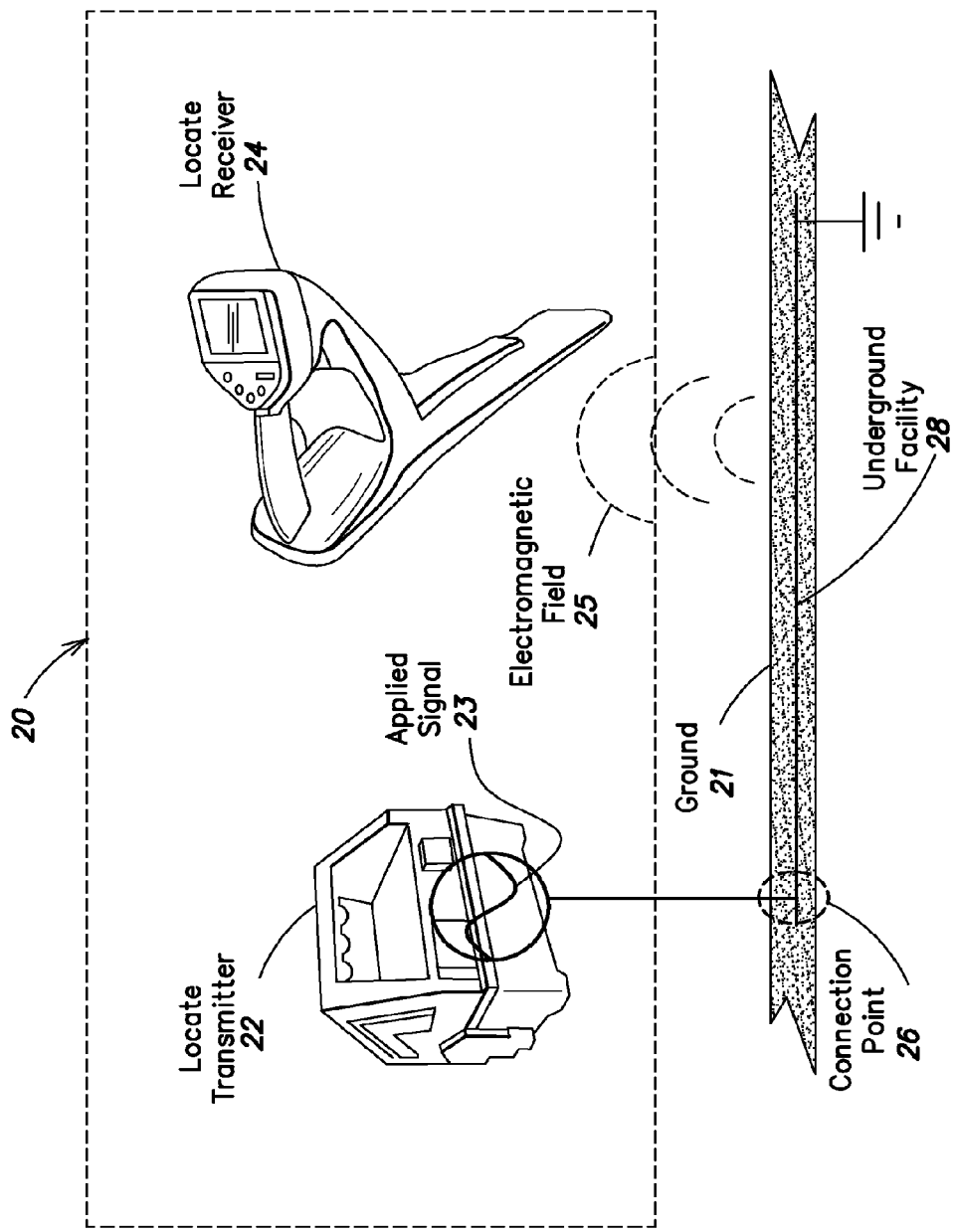
FIG. 2 illustrates one example of a conventional locate instrument set including a locate transmitter and a locate receiver.
Figure 3B:
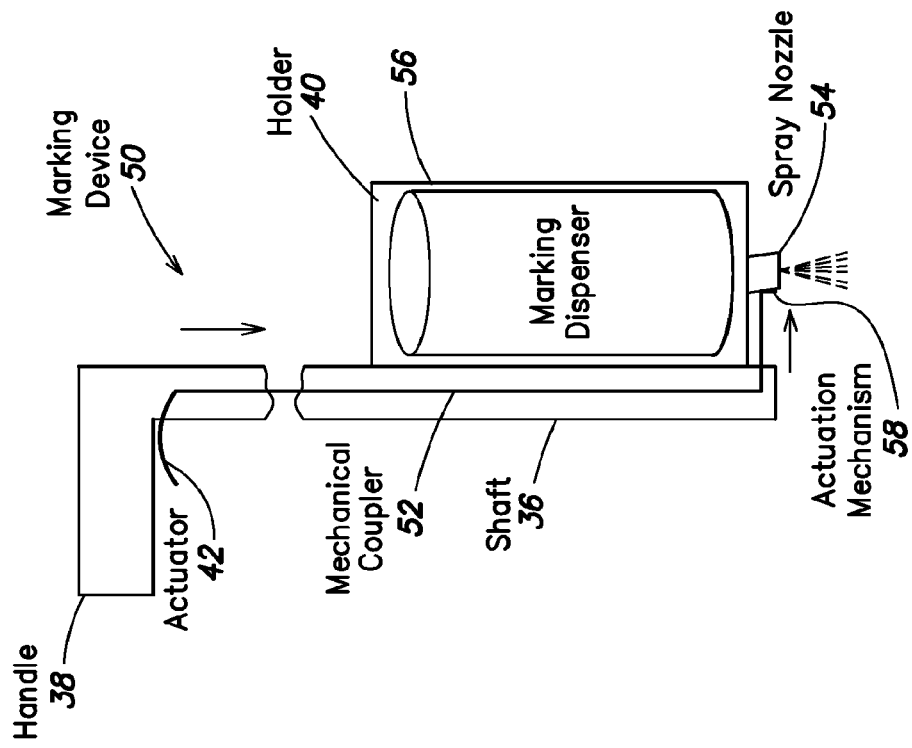
FIGS. 3A and 3B illustrate a conventional marking device in an actuated and non-actuated state, respectively.
Figure 3A:
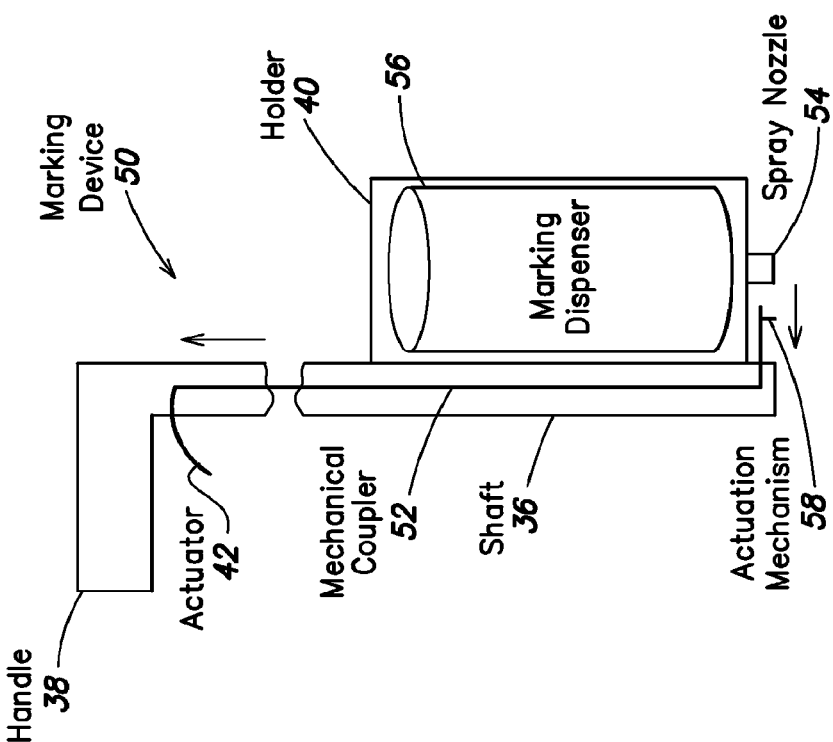

Following below are more detailed descriptions of various concepts related to, and embodiments of, inventive systems, methods and apparatus for viewing facilities maps information and/or other image information on a marking device. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various embodiments of the present invention relate to a marking device capable of accessing and displaying various types of information derived from one or more facilities maps. In some embodiments, the marking device may have the capability to access one or more locally and/or remotely stored electronic facilities maps or a database of facilities map information, and select and display all or a portion of a facilities map that is of interest to a technician or other technician of the marking device. As explained in detail below, in some embodiments, the marking device may update the display of the facilities map information in essentially real-time (e.g., change one or more of pan, zoom, orientation, etc.), as the marking device is in use, when changes in the geo-location and/or heading of the marking device are detected. In this manner, the marking device provides a convenient way for the locate technician to view and interact with facilities map information in real-time while conducting a locate and/or marking operation (and/or immediately before or after the marking operation).

In various aspects, the inventive concepts discussed herein generally relate to one of more of the following: 1) selection, from a local or remote library/archive, of one or more appropriate "base" facilities maps or facilities map data sets relating to a given work site/dig area; 2) manual or automated selection of an appropriate pan and/or zoom (resolution) for displaying, on a user interface/display of a marking device, facilities map information derived from the base facilities map(s); 3) appropriately updating, if/as necessary, displayed facilities map information while a marking device is used during a marking operation; 4) overlaying, on the displayed facilities map information, marking information relating to the marking operation; and 5) storing locally on the marking device, and/or transmitting from the marking device, facilities map information and/or overlaid marking information (e.g., for further processing, analysis and/or subsequent display).

Furthermore, in addition to facilities map information, it should be appreciated that the present disclosure contemplates other types of image information being accessed and displayed on a user interface/display of a marking device to facilitate various aspects of a locate and/or marking operation. For example, other types of maps (e.g., street/road maps, polygon maps, tax maps, etc.), architectural, construction and/or engineering drawings, land surveys, and photographic renderings/images, and various information derived therefrom, including virtual white line (VWL) designations that delimit, on a map or other image, a planned excavation area, may be displayed on the marking device and may also be used as the basis for overlaying marking information relating to a marking operation.

I. MARKING DEVICE

One example of a marking device which may be configured to access, view, update, store, analyze and process facilities map information is described below. It should be appreciated that the marking device described below is merely one example of a marking device that may be configured for applications involving facilities map information and/or other image information, and that the invention is not limited to implementation on this marking device. In particular, other types of marking devices may be similarly configured as discussed herein, as well as various types of locate devices and combined marking and locate devices.

Figure 4:
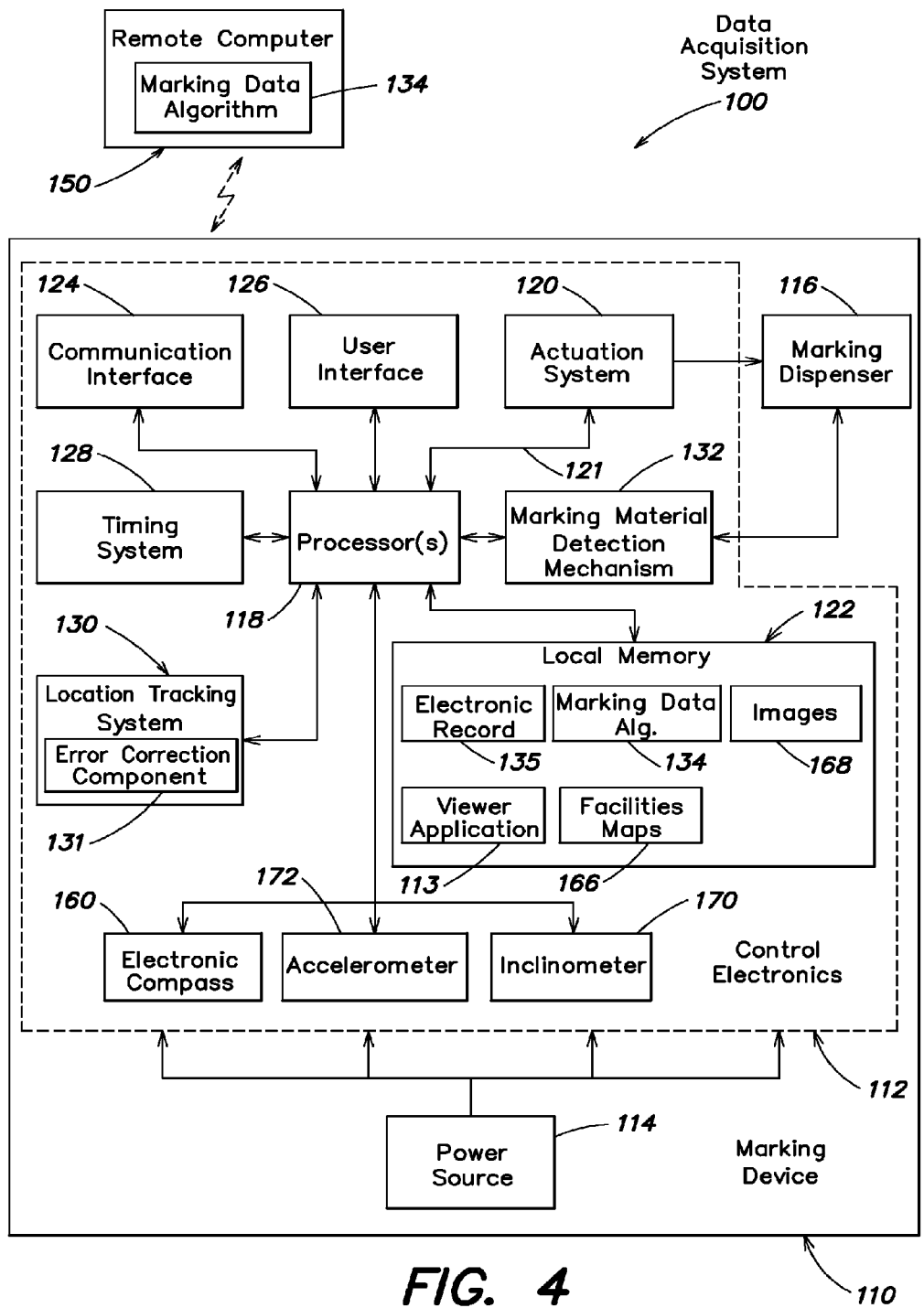
FIG. 4 is a functional block diagram of a data acquisition system including a marking device for creating electronic records of marking operations and displaying facilities map information, according to some embodiments of the present invention.
Figure 5:
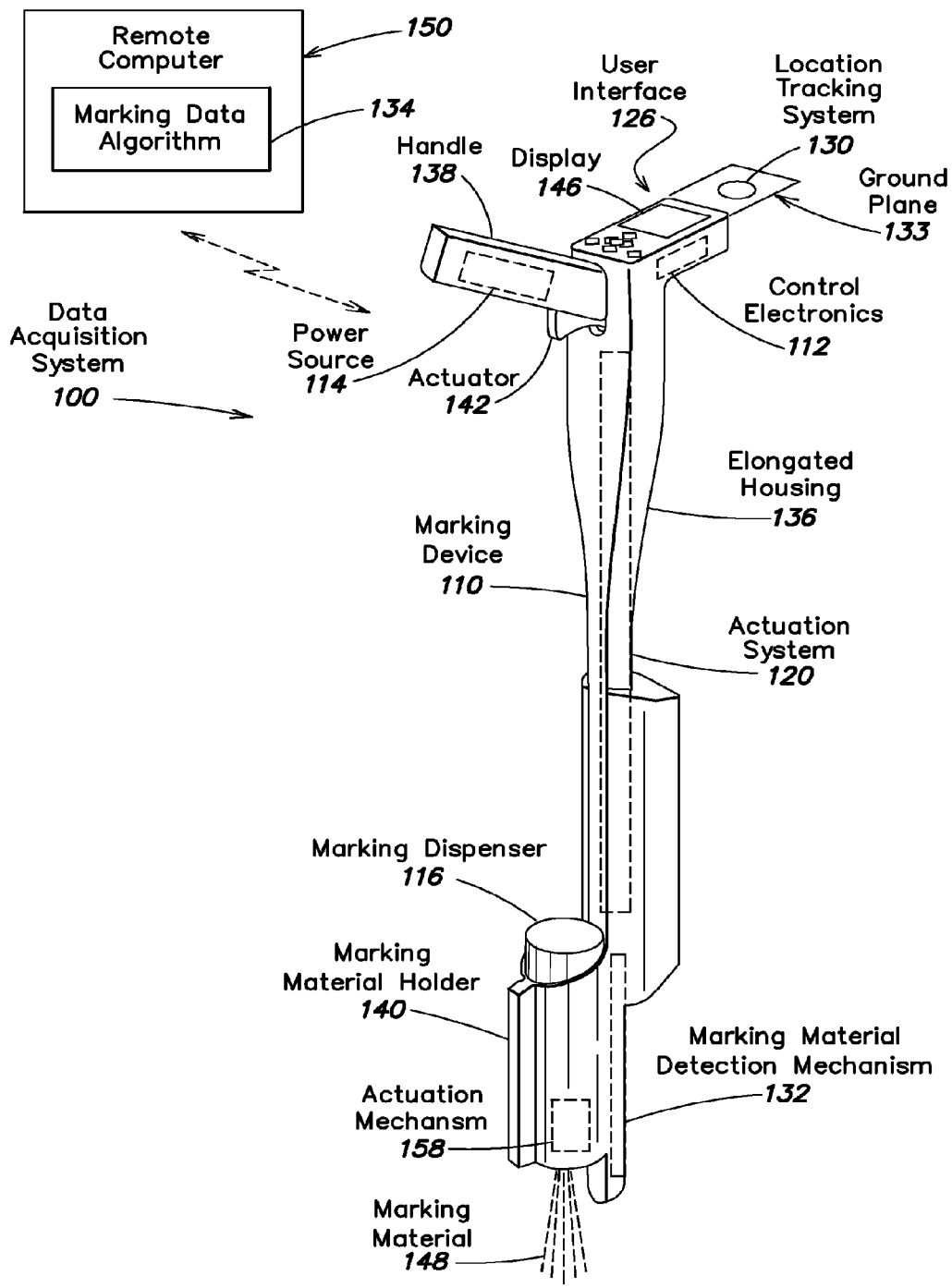
FIG. 5 is a perspective view of the data acquisition system of FIG. 4, illustrating an exemplary marking device upon which some embodiments of the invention may be implemented.

FIGS. 4 and 5 illustrate a functional block diagram and perspective view, respectively, of one example of a data acquisition system 100, including a marking device 110 and optionally a remote computer 150, according to one embodiment of the present invention. One or both of the marking device 110 and the remote computer 150 of the data acquisition system 100 may be configured to sense one or more actuations of the marking device 110 (e.g., to dispense marking material during a marking operation), and collect information based on one or more actuations of the marking device so as to generate an electronic record.

As shown in FIG. 4, in one embodiment marking device 110 includes control electronics 112, the components of which are powered by a power source 114. Power source 114 may be any power source that is suitable for use in a portable device, such as, but not limited to, one or more rechargeable batteries, one or more non-rechargeable batteries, a solar photovoltaic panel, a standard AC power plug feeding an AC-to-DC converter, and the like.

The marking device 110 is configured to hold a marking dispenser 116, which as shown in FIG. 5 is loaded into a marking material holder 140 of the marking device 110. In one exemplary implementation, the marking dispenser 116 is an aerosol paint canister that contains paint; however, it should be appreciated that the present invention is not limited in this respect, as a marking material dispensed by the marking device 110 may be any material, substance, compound, and/or element, used to mark, signify, and/or indicate. Examples of marking materials may include, but are not limited to, paint, chalk, dye, and/or marking powder.

As also shown in FIG. 4, in one embodiment control electronics 112 of marking device 110 may include, but are not limited to, a processor 118, at least a portion of an actuation system 120 (another portion of which may include one or more mechanical elements), a local memory 122, a communication interface 124, a user interface 126, a timing system 128, and a location tracking system 130.

The processor 118 may be any general-purpose processor, controller, or microcontroller device. Local memory 122 may be any volatile or non-volatile data storage device, such as, but not limited to, a random access memory (RAM) device and a removable memory device (e.g., a universal serial bus (USB) flash drive, a multimedia card (MMC), a secure digital card (SD), a compact flash card (CF), etc.). As discussed further below, the local memory may store a marking data algorithm 134, which may be a set of processor-executable instructions that when executed by the processor 118 causes the processor to control various other components of the marking device 110 so as to generate an electronic record 135 of a marking operation, which record also may be stored in the local memory 122 and/or transmitted in essentially real-time (as it is being generated) or after completion of a marking operation to a remote device (e.g., remote computer 150). In other aspects, the local memory 122 also may store a map or image viewer application 113 (hereafter simply "map viewer application"), and one or more facilities maps or facilities map data sets 166 and/or other images 168. As discussed further below, the one or more facilities maps/data sets 166 may in some implementations include a library of facilities maps, or a database of facilities map data, for one or more different types of facilities deployed in a geographical region.

In one exemplary implementation, a Linux-based processing system for embedded handheld and/or wireless devices may be employed in the marking device 110 to implement various components of the control electronics 112. For example, the Fingertip4™ processing system, including a Marvell PXA270 processor and available from InHand Electronics, Inc. (www.inhandelectronics.com/products/fingertip4), may be used. In addition to the PXA270 processor (e.g., serving as the processor 118), the Fingertip4™ includes flash memory and SDRAM (e.g., serving as local memory 122), multiple serial ports, a USB port, and other I/O interfaces (e.g., to facilitate interfacing with one or more input devices and other components of the marking device), supports a variety of wired and wireless interfaces (WiFi, Bluetooth, GPS, Ethernet, any IEEE 802.11 interface, or any other suitable wireless interface) to facilitate implementation of the communication interface 124, and connects to a wide variety of LCD displays (to facilitate implementation of a user interface/display). In yet other exemplary implementations, the processor 118 may be realized by multiple processors that divide/share some or all of the functionality discussed herein in connection with the processor 118. For example, in one implementation, an Atom™ processor available from Intel Corporation of Santa Clara, Calif., may be used alone or in connection with one or more PIC processors to accomplish various functionality described herein.

Communication interface 124 of marking device 110 may be any wired and/or wireless communication interface by which information may be exchanged between marking device 110 and an external or remote device, such as a remote computing device that is elsewhere in the dig area (i.e., not a part of the marking device 110) or outside the dig area. For example, data that is provided by components of data acquisition system 100 and/or stored in local memory 122 (e.g., one or more electronic records 135, one or more facilities maps 166) may be transmitted via communication interface 124 to a remote computer, such as remote computer 150, for processing. Similarly, one or more facilities maps 166 may be received from the remote computer 150 or one or more other external sources via the communication interface 124. Examples of wired communication interfaces may include, but are not limited to, USB ports, RS232 connectors, RJ45 connectors, Ethernet, and any combination thereof. Examples of wireless communication interfaces may include, but are not limited to, an Intranet connection, Internet, Bluetooth® technology, Wi-Fi, Wi-Max, IEEE 802.11 technology (e.g., operating at a minimum bandwidth of 54 Mbps, or any other suitable bandwidth), radio frequency (RF), Infrared Data Association (IrDA) compatible protocols, Local Area Networks (LAN), Wide Area Networks (WAN), Shared Wireless Access Protocol (SWAP), any combination thereof, and other types of wireless networking protocols. The wireless interface may be capable of capturing signals that reflect a user's intent. For example, the wireless interface may include a microphone that can capture a user's intent by capturing the user's audible commands. Alternatively, the wireless interface may interact with a device that monitors a condition of the user, such as eye movement, brain activity, and/or heart rate.

User interface 126 of marking device 110 may be any mechanism or combination of mechanisms by which a user may operate data acquisition system 100 and by which information that is generated by data acquisition system 100 may be presented to the user. For example, user interface 126 may include, but is not limited to, a display device (including integrated displays and external displays, such as Heads-Up Displays (HUDs)), a touch screen, one or more manual pushbuttons, a microphone to provide for audible commands, one or more light-emitting diode (LED) indicators, one or more toggle switches, a keypad, an audio output (e.g., speaker, buzzer, and alarm), and any combination thereof. In one implementation, the user interface 126 includes a "menu/on" button to power up the marking device and provide a menu-driven graphical user interface (GUI) displayed by the display device (e.g., menu items and/or icons displayed on the display device) and navigated by the technician via a joystick or a set of four "up/down/left/right" buttons, as well as a "select/ok" button to take some action pursuant to the selection of a menu item/icon. As described below, the display may also be used in some embodiments of the invention to display information relating to one or more facilities maps and/or one or more other images germane to a locate and/or marking information, as well as information relating to a placement of marking material in a dig area, a location of an underground facility in a dig area, or any other suitable information that may be displayed based on information acquired to create an electronic record 135.

In various embodiments, the one or more interfaces of the marking device 110—including the communication interface 124 and user interface 126—may be used as input devices to receive information to be stored in the memory 122, to facilitate various functions of the marking device and/or to be logged as part of an electronic record of a marking operation. In some cases, marking information received via the interface(s) (e.g., via the communication interface 124) may include ticket information regarding underground facilities to be marked during a marking operation. As another example, using an interface such as the user interface 126, service-related information may be input, including an identifier for the marking device used by the technician, an identifier for a technician, and/or an identifier for the technician's employer. Alternatively, some or all of the service-related information similarly may be received via the communication interface 124 (and likewise some or all of the ticket information may be received via the user interface 126). As also noted above, facilities map information and/or other image information also may be received via the communication interface 124.

The actuation system 120 of marking device 110 shown in the block diagram of FIG. 4 may include both electrical and mechanical elements according to various embodiments discussed in further detail below, and for purposes of illustration is shown in FIG. 4 as included as part of the control electronics 112. The actuation system 120 may include a mechanical and/or electrical actuator mechanism (e.g., see the actuator 142 shown in FIG. 5) to provide one or more signals or stimuli as an input to the actuation system 120. Upon receiving one or more signals or stimuli (e.g., actuation/triggering by a locate technician or other user), the actuation system 120 causes marking material to be dispensed from marking dispenser 116. In various embodiments, the actuation system 120 may employ any of a variety of mechanical and/or electrical techniques (e.g., one or more switches or other circuit components, a dedicated processor or the processor 118 executing instructions, one or more mechanical elements, various types of transmitters and receivers, or any combination of the foregoing), as would be readily appreciated by those of skill in the relevant arts, to cause the marking dispenser 116 to dispense marking material in response to one or more signals or stimuli. The actuation system 120 also provides one or more output signals in the form of an actuation signal 121 to the processor 118 to indicate one or more actuations of the marking device, in response to which the processor 118 may acquire/collect various marking information and log data into the electronic record 135. Additional details of exemplary actuation system implementations are provided below in connection with FIGS. 5 through 7.

In some embodiments, the actuation system 120 may be configured so as not to cause marking material to be dispensed from marking dispenser 116 in response to one or more signals or stimuli; rather, the actuation system may merely facilitate a logging of data from one or more input devices in response to operation of an actuator/trigger, without necessarily dispensing marking material. In some instances, this may facilitate "simulation" of a marking operation (i.e., simulating the dispensing of marking material) by providing an actuation signal 121 to the processor 118 indicating one or more simulated actuation events, in response to which the processor may cause the logging of various data for creating an electronic record without any marking material actually being dispensed.

Location tracking system 130 of marking device 110 constitutes another type of input device that provides marking information, and may include any device that can determine its geographical location to a certain degree of accuracy. For example, location tracking system 130 may include a global positioning system (GPS) receiver or a global navigation satellite system (GNSS) receiver. A GPS receiver may provide, for example, any standard format data stream, such as a National Marine Electronics Association (NMEA) data stream, or other data formats. An error correction component 131 may be, but is not limited to, any mechanism for improving the accuracy of the geographic information provided by location tracking system 130; for example, error correction component 131 may be an algorithm for correcting any offsets (e.g., due to local disturbances in the atmosphere) in the geo-location data of location tracking system 130. While shown as part of a local location tracking system of the marking device 110, error correction component 131 alternatively may reside at a remote computing device, such as remote computer 150. In other embodiments, location tracking system 130 may include any device or mechanism that may determine location by any other means, such as performing triangulation by use of cellular radiotelephone towers.

In one exemplary implementation, the location tracking system 130 may include an ISM300F2-05-V0005 GPS module available from Inventek Systems, LLC of Westford, Mass. (see www.inventeksys.com/html/ism300f2-c5-v0005.html). The Inventek GPS module includes two UARTs (universal asynchronous receiver/transmitter) for communication with the processor 118, supports both the SIRF Binary and NMEA-0183 protocols (depending on firmware selection), and has an information update rate of 5 Hz. A variety of geographic location information may be requested by the processor 118 and provided by the GPS module to the processor 118 including, but not limited to, time (coordinated universal time—UTC), date, latitude, north/south indicator, longitude, east/west indicator, number and identification of satellites used in the position solution, number and identification of GPS satellites in view and their elevation, azimuth and SNR values, and dilution of precision values. Accordingly, it should be appreciated that in some implementations the location tracking system 130 may provide a wide variety of geographic information as well as timing information (e.g., one or more time stamps) to the processor 118.

In another embodiment, location tracking system 130 may not reside locally on marking device 110. Instead, location tracking system 130 may reside on any on-site computer, which serves as a location reference point, to which the location of marking device 110 may be correlated by any other means, such as, but not limited to, by a triangulation technique between the on-site computer and marking device 110.

In some embodiments, control electronics 112 may also include one or more of an electronic compass 160, an inclinometer 170, and one or more accelerometers 172. An inclinometer is an instrument for measuring angles of slope (or tilt) or inclination of an object with respect to gravity. The inclinometer 170 may be any commercially available inclinometer device. In one example, inclinometer 170 may be a digital device for sensing the inclination of the marking device 110 in which it is installed (i.e., senses angle of spray). An accelerometer is a device for measuring acceleration and gravity-induced reaction forces. A multi-axis accelerometer is able to detect magnitude and direction of the acceleration as a vector quantity. The acceleration specification may be in terms of g-force, which is a measurement of an object's acceleration. The accelerometer 172 may be any commercially available accelerometer device, including, for example, Part No. ADXL330 sold by Analog Devices of Wilmington, Mass. In one example, accelerometer 172 may be used for detecting the rate of movement of the marking device 110 in which it is installed. Electronic compass 160 may be any commercially available electronic compass, including, for example, the OS5000-S sold by OceanServer Technology, Inc. of Fall River, Mass., the SP3002D sold by SPARTON Corporation of Brooksville, Fla., the PNI-PRIME sold by PNI Sensor Corp. of Santa Rosa, Calif., the Revolution GS sold by True North LLC of Maynard, Mass., or the HMR3400 sold by Honeywell International, Inc. of Morristown, N.J.

With respect to other input devices of the marking device 110 that may provide marking information, the control electronics 112 may also include a timing system 128 having an internal clock (not shown), such as a crystal oscillator device, for processor 118. Additionally, timing system 128 may include a mechanism for registering time with a certain degree of accuracy (e.g., accuracy to the minute, second, or millisecond) and may also include a mechanism for registering the calendar date. In various implementations, the timing system 128 may be capable of registering the time and date using its internal clock, or alternatively timing system 128 may receive its time and date information from the location tracking system 130 (e.g., a GPS system) or from an external timing system, such as a remote computer or network, via communication interface 124. In yet other implementations, a dedicated timing system for providing timing information to be logged in an electronic record 135 may be optional, and timing information for logging into an electronic record may be obtained from the location tracking system 130 (e.g., GPS latitude and longitude coordinates with a corresponding time stamp). Timing information may include, but is not limited to, a period of time, timestamp information, date, and/or elapsed time.

Marking material detection mechanism 132 of the marking device 110 shown in FIG. 4 is another type of input device that provides marking information, and may be any mechanism or mechanisms for determining a presence or absence of a marking dispenser 116 in or otherwise coupled to the marking device 110, as well as determining certain attributes/characteristics of the marking material within marking dispenser 116 when the dispenser is placed in or coupled to the marking device. As shown in FIG. 5, in some embodiments the marking material detection mechanism 132 may be disposed generally in an area proximate to a marking material holder 140 in which a marking dispenser 116 may be placed.

For example, in one embodiment, the marking material detection mechanism 132 may include one or more switch devices (e.g., a make/break single pole/single throw contact switch) disposed at one or more points along the marking material holder 140 and electrically coupled to the processor 118. The switch device(s) may also be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. When the marking dispenser 116 is present in the holder 140, the switch device(s) is in one of two possible states and when there is no marking dispenser the switch device(s) is in another of the two possible states (e.g., the marking dispenser, when present, may depress the switch device(s) so as to make contact and pass the ground/DC voltage to the processor). In this manner, the marking material detection mechanism 132 may provide a signal to the processor indicating the presence or absence of the marking dispenser 116 in the marking device 110.

The marking material detection mechanism 132 also or alternatively may include a barcode reader to read barcode data from a dispenser 116 and/or a radio-frequency identification (RFID) reader for reading information from an RFID tag that is provided on marking dispenser 116. The RFID tag may include, for example, a unique serial number or universal product code (UPC) that corresponds to the brand and/or type of marking material in marking dispenser 116. The type of information that may be encoded within the RFID tag on marking dispenser 116 may include product-specific information for the marking material, but any information of interest may be stored on an RFID tag. For example, user-specific information and/or inventory-related information may be stored on each RFID tag for a marking dispenser 116 to facilitate inventory tracking of marking materials. In particular, an identifier for a technician may be stored on an RFID tag when the technician is provided with a marking dispenser 116, and information relating to weight, amount dispensed, and/or amount remaining may be written to the RFID tag whenever the marking dispenser is used.

In one exemplary implementation, the marking material detection mechanism 132 may include a Micro RWD MIFARE-ICODE RFID reader module available from IB Technology (Eccel Technology Ltd) of Aylesbury, Buckinghamshire, UK (see www.ibtechnology.co.uk/products/icode-.htm). The Micro RWD reader module includes an RS232 communication interface to facilitate communication between the processor 118 and the reader module (e.g., via messages sent as a string of ASCII characters), and supports both reading information from an RFID tag attached to a marking dispenser as well as writing information to an RFID tag attached to the marking dispenser. In one aspect of an exemplary implementation, an antenna constituted by one or more turns of wire (e.g., two turns of awg 26 wire, 6.5 cm in diameter, about 1 uH) is coupled to the Micro RWD reader module and disposed in the marking material holder 140 of the marking device 110 (see FIG. 5), proximate to a marking dispenser 116 when placed in the holder 140, so as to capture close near field signals (e.g., from an RFID tag on the dispenser, within about 2 inches) and exclude far field signals. In another aspect, the Micro RWD reader module may be configured to read RFID tags having an ICODE SLI format (e.g., ISO 15693 ICODE SLI). In yet another aspect, an RFID tag may be affixed to an aerosol paint can serving as the marking dispenser, such that the tag conforms to a plastic cap of the paint can and is disposed at a particular location relative to a notch in the cap (e.g., 90 degrees+/−15 degrees from the notch) that allows access to the spray nozzle of the can and is in a relatively predictable position substantially aligned with the antenna when the paint can is placed in the marking material holder 140. Examples of RFID tags suitable for this purpose are available from BCS Solutions, Inc. (see www-.bcssolutions.com/solutions/rfid) and include, but are not limited to, the HF Bullseye Wet Inlay SLA Round 40.

In yet other embodiments, marking material detection mechanism 132 may alternatively or further be configured to detect properties of marking material as it is dispensed. For example, the marking material detection mechanism may include one or more of an optical sensor, an olfactory sensor, an auditory sensor (e.g., a microphone), a weight sensor, and any combination thereof. For example, in one embodiment an optical sensor in the marking device may be used to identify the composition and/or type of marking material in the marking dispenser by analyzing light reflected by the material as it is dispensed. Similarly, an olfactory sensor may be used to identify one or more characteristics of the marking material based on an odor profile of the material, and an auditory sensor may be used to identify the difference between paint being sprayed from an aerosol can and aerosol without paint being sprayed from a can (e.g., as the dispenser becomes emptied of paint).

In one embodiment, information provided by one or more input devices of the marking device 110 (e.g., the timing system 128, the location tracking system 130, the marking material detection mechanism 132, the user interface 126, the communication interface 124) is acquired and logged (stored in memory) upon actuation of the actuation system 120 (e.g., triggering an actuator). Some embodiments of the invention may additionally or alternatively acquire/log information from one or more input devices at one or more times during or throughout an actuation, such as when a technician is holding a mechanical or electrical actuator for some period of time and moving to dispense marking material in a line. In various aspects of such embodiments, marking information derived from one or more input devices may be collected at a start time of an actuation, at one or more times during an actuation, and in some cases at regular intervals during an actuation (e.g., several times per second, once per second, once every few seconds). Further, some marking information may be collected at an end of an actuation, such as time information that may indicate a duration of an actuation.

Additionally, it should be appreciated that while some marking information may be received via one or more input devices at the start of each marking operation and upon successive actuations of the marking device, in other cases some marking information, as well as facilities maps information and/or other image information, may be collected by or provided to the marking device prior to a marking operation (e.g., on power-up or reset of the marking device, as part of an electronic instruction or dispatch by a locate company, and/or in response to a request/query from a locate technician), and stored in local memory 122 for subsequent use by the marking device (e.g., display of information via the user interface display 146, later incorporation into an electronic record, etc.). For example, prior to a given marking operation and one or more actuations of the marking device, one or more of ticket information, service-related information, facilities maps information, and other image information, may have already been received (e.g., via the communication interface 124 and/or user interface 126) and stored in local memory 122. Pursuant to a marking operation (e.g., immediately before, during and/or after a marking operation), information previously received via the interface(s) may be retrieved from the local memory (if stored there initially), and displayed and/or entered into an electronic record as appropriate, in some case together with information collected pursuant to one or more actuations of the marking device. In some implementations, ticket information and/or service-related information may be received via the interface(s) and stored in an entry in the electronic record 135 "directly" in response to one or more actuations of the marking device (e.g., without being first stored in local memory).

In sum, according to embodiments of the present invention, various marking information from one or more input devices, as well as facilities map information and/or other image information, regardless of how or when it is received, may be displayed in various manners and/or stored in memory of the marking device (e.g., in an electronic record of a marking operation), and in some implementations at least some of the marking information may be logged pursuant to one or more actuations of the marking device.

In various implementations, the optional remoter computer 150 of the data acquisition system 100 may be any external computer system with which the marking device 110 communicates (e.g., via the communications interface 124). In one embodiment, the remote computer 150 may be a centralized computer, such as a central server of an underground facility locate service provider. In another embodiment, remote computer 150 may be a computer that is at or near the work site (i.e., "on-site"), e.g., a computer that is present in a locate technician's vehicle. As shown in FIGS. 4 and 5, the remote computer may also or alternatively store one or more of the marking data algorithm 134, the map viewer application 113, one or more facilities maps 166 (e.g., a library/archive of facilities maps), and one or more images 168. To this end, in some exemplary implementations, an example of a remote computer 150 may include an image server or a facilities maps server to provide facilities maps/images to the marking device 110.

Whether resident and/or executed on either the marking device 110 or the remote computer 150, as noted above the marking data algorithm 134 includes a set of processor-executable instructions (e.g., stored in memory, such as local memory 122 of the marking device) that, when executed by processor 118 of the marking device 110 or another processor, processes information (e.g., various marking information) collected in response to (e.g., during) one or more actuations of the marking device 110, and/or in some cases before or after a given actuation or series of actuations. As also discussed above, according to various embodiments the actuations of marking device 110 may effect both dispensing marking material and logging of marking information, or merely logging of marking information for other purposes (e.g., simulating the dispensing of marking material) without dispensing marking material. In either situation, marking data algorithm 134, when executed by the processor 118, may cause the processor to perform collection, logging/storage (creation of electronic records), and in some instances further processing and analysis of various marking information with respect to marking device actuations.

While the functionality of various components of the marking device 110 was discussed above in connection with FIG. 4, FIG. 5 shows some structural aspects of the marking device 110 according to one embodiment. For example, the marking device 110 may include an elongated housing 136 in which is disposed one or more elements of the actuation system 120, one or more elements of the control electronics 112 and the power source 114. Elongated housing 136 may be hollow or may contain certain cavities or molded compartments for installing any components therein, such as the various components of marking device 110 that are shown in FIG. 4. The elongated housing 136 and other structural elements associated with the housing, as discussed below, may be formed of any rigid, semi-rigid, strong, and lightweight material, such as, but not limited to, molded plastic and aluminum.

Incorporated at a proximal end of elongated housing 136 may be a handle 138, which provides a convenient grip by which the user (e.g., the locate technician) may carry the marking device 110 during use (i.e., the exemplary marking device depicted in FIG. 5 is intended to be a hand-held device). In one implementation, the power source 114 may be provided in the form of a removable battery pack housing one or more rechargeable batteries that are connected in series or parallel in order to provide a DC voltage to marking device 110, and disposed within a compartment in the handle 138. Such an arrangement facilitates use of conventional removable/rechargeable battery packs often employed in a variety of cordless power tools, in which the battery pack similarly is situated in a handle of the tool. It should be appreciated, however, that the power source 114 in the form of a battery pack may be disposed in any of a variety of locations within or coupled to the elongated housing 136.

As also shown in FIG. 5, mounted near handle 138 is user interface 126, which may include a display 146. The display 146 may be a touch screen display to facilitate interaction with a user/technician, and/or the user interface also may include one or more buttons, switches, joysticks, a keyboard, and the like to facilitate entry of information by a user/technician. One or more elements of the control electronics 112 (e.g., the processor 118, memory 122, communication interface 124, and timing system 128) also may be located in the proximal end of the elongated housing in the vicinity of the user interface 126 and display 146. As with the power source 114, it should be appreciated that one or more elements of the control electronics 112 may be disposed in any of a variety of locations within or coupled to the elongated housing 136.

In the embodiment of FIG. 5, the location tracking system 130 similarly may be positioned on the proximal end of the elongated housing 136 to facilitate substantially unobstructed exposure to the atmosphere; in particular, as illustrated in FIG. 5, the location tracking system 130 may be situated on an a ground plane 133 (providing an electrical ground at least at the antenna frequency of the location tracking system, e.g., at approximately 1.5 GHz) that extends from the proximal end of the housing 136 and is approximately parallel to the ground, surface or pavement when the marking device is being normally operated by a technician (so as to reduce signal modulation with subtle movements of the marking device).

As also shown in FIG. 5, incorporated at the distal end of elongated housing 136 is a marking dispenser holder 140 for holding one or more marking dispensers 116 (e.g., an aerosol paint canister). Dispenser 116 may be one or more replaceable dispensers or one or more reusable refillable dispensers (including a fixed reservoir forming a part of the device 110) or any other suitable dispenser. Also situated at the distal end of the housing is the marking material detection mechanism 132 to detect a presence or absence of the marking dispenser 116 in the marking material holder 140, and/or one or more characteristics of the marking material 148, as well as an actuation mechanism 158, which in some implementations may constitute part of the actuation system 120 and be employed to interact with the marking dispenser 116 so as to effect dispensing of the marking material 148.

With respect to the actuation system 120, as shown in FIG. 5, at least a portion of the actuation system 120 is indicated generally along the length of the elongated housing for purposes of illustration. More specifically, however, in various implementations the actuation system 120 may include multiple components disposed in various places in, on or coupled to the marking device 110. For example, in the embodiment of FIG. 5, the actuation system 120 includes an actuator 142, which for example may be a mechanical mechanism provided at the handle 138 in the form of a trigger that is pulled by a finger or hand of an user/technician. The actuation system 120 further includes the actuation mechanism 158 disposed at the distal end of the marking device that is responsive to the actuator 142 to dispense marking material. In general, in various exemplary implementations as discussed in further detail below, the actuation system 120 may employ any of a variety of mechanical and/or electrical techniques to cause the marking dispenser 116 to dispense marking material 148 in response to one or more signals or stimuli. In the embodiment shown in FIG. 5, the signal/stimulus is initially provided to the actuation system via the mechanical actuator 142; i.e., a locate technician or other user triggers (e.g., pulls/depresses) the actuator 142 to provide a signal/stimulus to the actuation system 120, which in turn operates the actuation mechanism 158 to dispense marking material in response to the signal/stimulus.

In response to the signal/stimulus provided by the actuator 142, as discussed above the actuation system may also provide an actuation signal 121 to the processor 118 to indicate an actuation. As discussed in further detail below in connection with FIG. 15, pursuant to the execution by the processor 118 of the marking data algorithm 134, the actuation signal 121 may be used to cause the logging of information that is provided by one or more components of the marking device 110 so as to generate an electronic record of the marking operation.

Figure 6A:
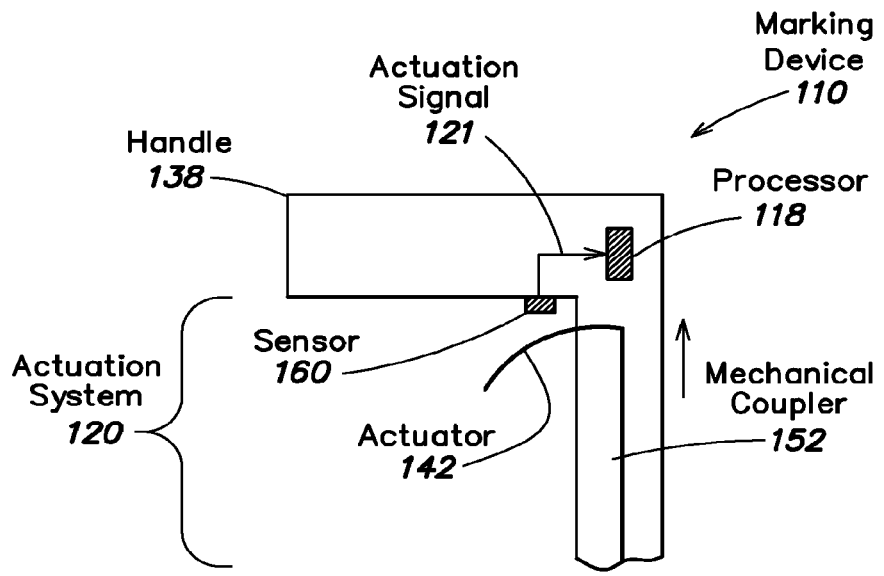
FIGS. 6A and 6B illustrate a portion of an actuation system of the marking device of FIG. 5.
Figure 6B:
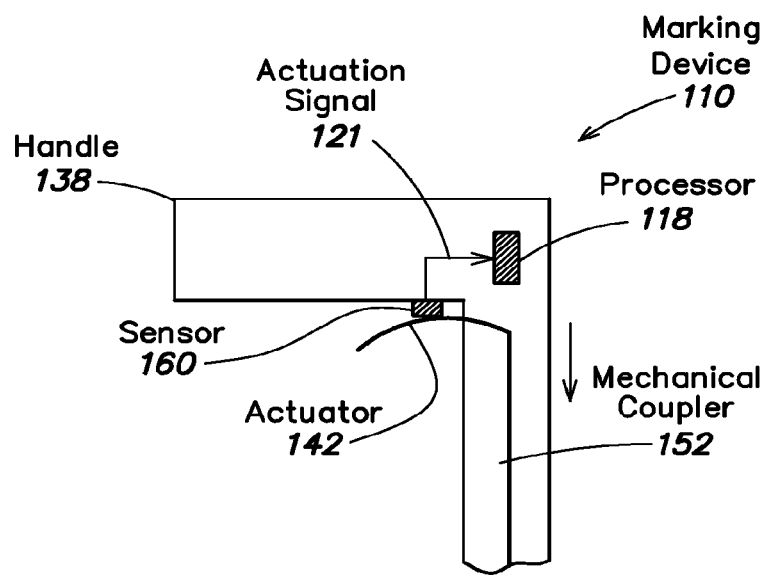

FIGS. 6A and 6B illustrate a portion of the actuation system 120 according to one embodiment of the present invention. FIG. 6A shows the actuator 142 in an un-actuated state, whereas FIG. 6B shows the actuator 142 in an actuated state (in which a signal/stimulus is provided by the actuator). In the example of FIGS. 6A and 6B, the actuator 142 is coupled to a mechanical coupler 152 which extends along a length of the elongated housing and is in turn coupled to a mechanical actuation mechanism 158 at the distal end of the housing (not shown in FIGS. 6A and 6B) that ultimately effects dispensing of marking material when the actuator is in the actuated state. The portion of the actuation system 120 shown in FIGS. 6A and 6B also includes a sensor 160 which is configured to provide an actuation signal 121 to the processor 118 to indicate one or both of the respective actuated and un-actuated states of the actuator 142.

In one implementation, the sensor 160 may include a switch device (e.g., a make/break single pole/single throw contact switch) disposed along the handle 138 of the marking device such that, when pulled, the actuator contacts (e.g., depresses) the switch causing a state of the switch to toggle. In another implementation, the sensor 160 may include a switch device such as a reed (magnetic) switch disposed at some point along the length of the elongated housing; in such an implementation, the mechanical coupler 152 may have a magnet disposed along it at an appropriate position relative to the reed switch, such that movement of the mechanical coupler 152 upon actuation of the actuator 142 causes a state of the reed switch to toggle. Electrically, a switch device serving as the sensor 160 may be coupled to ground or a DC supply voltage, such that when the switch device is in a first state (e.g., closed/making contact) the ground or DC supply voltage is passed to the processor 118 (e.g., via an I/O pin of the processor which provides an interrupt to, or is periodically monitored by, the processor), and when the switch is in a second state (e.g., open/no contact) the ground or DC supply voltage is not passed to the processor 118. In this manner, the sensor 160 may provide the actuation signal 121 to the processor indicating actuation (and release) of the actuator 142.

Figure 7:
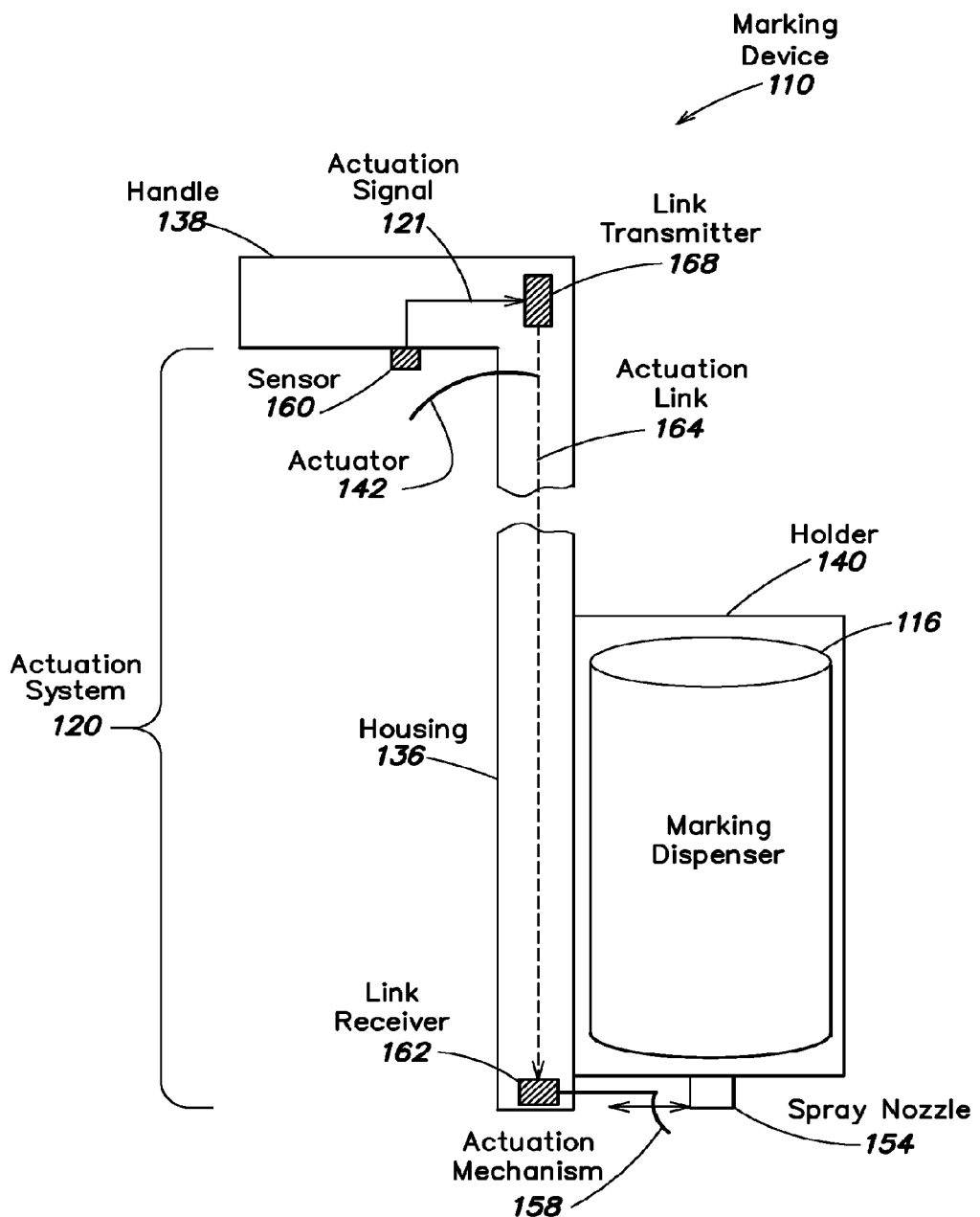
FIG. 7 illustrates various components of the actuation system of FIGS. 6A and 6B.

FIG. 7 illustrates various components of an actuation system 120 according to other embodiments of the present invention. Generally speaking, the actuation system 120 may include the actuator 142 and the sensor 160 to detect actuation and release of the actuator 142 (and also provide a corresponding actuation signal 121 representing same to the processor 118). While a "trigger-pull" type of actuator 142 is shown primarily for purposes of illustration in FIG. 5, it should be appreciated that more generally an actuator of the actuation system 120 may be implemented by any form or combination of a lever, switch, program, processor, screen, microphone for capturing audible commands, and the like, as discussed above. For example, in one implementation, a microphone may serve as both the actuator 142 and the sensor 160 shown in FIG. 7 to provide an actuation signal 121 based on audible commands, so as to effect voice-activated actuation of the marking device.

FIG. 7 also shows that the actuation system 120 of this embodiment includes a link transmitter 168 coupled and responsive to the sensor 160 to transmit one or more signals and/or other stimulus via an actuation link 164, and a link receiver 162 to receive the one or more signals and/or other stimulus from the actuation link 164. In response to such signals and/or other stimulus, the link receiver 162 operates the actuation mechanism 158. The link transmitter 168, the link 164, and the link receiver 162 may include one or more electrical and/or mechanical components. For example, the link receiver 162 may include a linear solenoid mechanically coupled to the actuation mechanism 158 and whose movement is responsive to one or more signals and/or stimuli received from the link 164. In various exemplary implementations, the link transmitter 168 and the link 164 simply may include a wire that couples the sensor 160 to the solenoid to activate the solenoid upon changes of state in the actuation signal 121. Alternatively, the transmitter 168 may be an RF transmitter that is activated in response to the actuation signal 121, the link 164 may be a wireless link, and the receiver 162 may include an RF receiver.

Other examples of transmitter/link/receiver combinations include, but are not limited to, an acoustic transmitter/link/receiver (e.g., a sound wave source that provides a sound wave of a certain tone, duration, and/or amplitude when the actuator is actuated, and a corresponding sound wave detector), an optical transmitter/link/receiver (e.g., a light or laser source that provides an optical signal of a certain wavelength, duration, and/or amplitude when the actuator is actuated, and a corresponding optical detector), a fluid transmitter/link/receiver (e.g., a fluid system that provides a fluid control output of a certain volume, pressure, and/or duration when the actuator is actuated, and a corresponding fluid sensor for sensing the presence of, for example, a short blast of water of a certain volume, pressure, and/or duration to indicate an actuation; the fluid system may be, for example, a closed-loop system that has a source reservoir at the top of the marking device, a fluid line in proximity with the fluid sensor, a return reservoir for capturing water during the actuation process, and appropriate pressure regulation and ducts for cycling water from the return reservoir back to the source reservoir), and an air transmitter/link/receiver (e.g., an air system that provides an air control output of a certain volume, pressure, and/or duration when the actuator is actuated, and a corresponding air sensor for sensing the presence of, for example, a blast or puff of air of a certain volume, pressure, and/or duration to indicate an actuation).

While not explicitly shown in FIG. 7, in yet other embodiments it should be appreciated that the sensor 160 may be coupled to the processor 118 (to provide the actuation signal 121 representing actuation/release of the actuator), and in turn the processor may provide a signal to the link transmitter 168, such that dispensing of marking material may in part be under the control of the processor 118 executing particular instructions for this purpose. More specifically, while in some implementations dispensing of marking material may be directly responsive to actuation of the actuator (and cease upon release of the actuator), in other implementations dispensing of marking material may be initiated in some manner upon actuation of the actuator, but then continued dispensing of marking material may not necessarily be dictated by continued actuation, or release, of the actuator. Rather, the processor 118 may provide one or more signals or commands to the link transmitter 168 to govern dispensing of marking material in some manner that does not necessarily track each actuation and release of the actuator.

II. FACILITIES MAPS

As noted above and discussed in further detail below, various embodiments of the present invention relate to accessing and displaying facilities map information. A facilities map is any physical, electronic, or other representation of the geographic location, type, number, and/or other attributes of a facility or facilities. Facilities maps may be supplied by various facility owners and may indicate the geographic location of the facility lines (e.g., pipes, cables, and the like) owned and/or operated by the facility owner. For example, facilities maps may be supplied by the owner of the gas facilities, power facilities, telecommunications facilities, water and sewer facilities, and so on.

As indicated above, facilities maps may be provided in any of a variety of different formats. As facilities maps often are provided by facility owners of a given type of facility, typically a set of facilities maps includes a group of maps covering a particular geographic region and directed to showing a particular type of facility disposed/deployed throughout the geographic region. One facilities map of such a set of maps is sometimes referred to in the relevant arts as a "plat."

Perhaps the simplest form of facilities maps is a set of paper maps that cover a particular geographic region. In addition, some facilities maps may be provided in electronic form. An electronic facilities map may in some instances simply be an electronic conversion (i.e., a scan) of a paper facilities map that includes no other information (e.g., electronic information) describing the content of the map, other than what is printed on the paper maps.

Alternatively, however, more sophisticated facilities maps also are available which include a variety of electronic information, including geographic information and other detailed information, regarding the contents of various features included in the maps. In particular, facilities maps may be formatted as geographic information system (GIS) map data, in which map features (e.g., facility lines and other features) are represented as shapes and/or lines, and the metadata that describes the geographic locations and types of map features is associated with the map features. In some examples, a GIS map data may indicate a facility line using a straight line (or series of straight lines), and may include some symbol or other annotation (e.g., a diamond shape) at each endpoint of the line to indicate where the line begins and terminates. From the foregoing, it should be appreciated that in some instances in which the geo-locations of two termination or end-points of a given facility line may be provided by the map, the geo-location of any point on the facility line may be determined from these two end-points.

Examples of a wide variety of environmental landmarks and other features that may be represented in GIS facilities map data include, but are not limited to: landmarks relating to facilities such as pedestal boxes, utility poles, fire hydrants, manhole covers and the like; one or more architectural elements (e.g., buildings); and/or one or more traffic infrastructure elements (e.g., streets, intersections, curbs, ramps, bridges, tunnels, etc.). GIS facilities map data may also include various shapes or symbols indicating different environmental landmarks relating to facilities, architectural elements, and/or traffic infrastructure elements.

Examples of information provided by metadata include, but are not limited to, information about the geo-location of various points along a given line, the termination points of a given line (e.g., the diamond shapes indicating the start and end of the line), the type of facility line (e.g., facility type and whether the line is a service line or main), geo-location of various shapes and/or symbols for other features represented in the map (environmental landmarks relating to facilities, architectural elements, and/or traffic infrastructure elements), and type information relating to shapes and/or symbols for such other features.

The GIS map data and metadata may be stored in any of a variety of ways. For example, in some embodiments, the GIS map data and metadata may be organized into files, where each file includes the map data and metadata for a particular geographic region. In other embodiments, the GIS map data and metadata may be stored in database and may be indexed in the database by the geographical region to which the map data and metadata corresponds.

Facilities maps may include additional information that may be useful to facilitate a locate and/or marking operation. For example, various information that may be included in a legend of the facilities map, or otherwise associated with the facilities map (e.g., included in the metadata or otherwise represented on the map), may include, but is not limited to, a date of the facilities map (e.g., when the map was first generated/created, and/or additional dates corresponding to updates/revisions), a number of revisions to the facilities map (e.g., revision number, which may in some instances be associated with a date), one or more identifiers for a source, creator, owner and/or custodian of the facilities map (e.g., the owner of the facility type represented in the map), various text information (e.g., annotations to update one or more aspects or elements of the map), and any other legend information that may be included or represented in the map.

For facilities maps in electronic form, a variety of digital formats of facilities maps may be used including, but not limited to, a vector image format that is the typical output format of computer-aided design (CAD) tools. In one example, some facilities maps may be in a DWG ("drawing") format, which is a format that used for storing two and three dimensional design data and metadata, and is a native used by several CAD packages including AutoCAD, Intellicad, and PowerCAD. However, those skilled in the art will recognize that facilities maps may be in any of several vector and/or raster image formats, such as, but not limited to, DWG, DWF, DGN, PDF, TIFF, MFI, PMF, and JPG.

As noted above, in some instances in which facilities maps are in a vector image format, a certain line on the facilities map may be represented by a starting point geo-location, an ending point geo-location, and metadata about the line (e.g., type of line, depth of line, width of line, distance of line from a reference point (i.e., tie-down), overhead, underground, line specifications, etc.). According to one embodiment of the present invention as discussed in greater detail below, to facilitate display of facilities map information relating to multiple different types of facilities, each vector image may be assembled in layers, in which respective layers correspond, for example, to different types of facilities (e.g., gas, water, electric, telecommunications, etc.). In one aspect of such an embodiment, each layer is, for example, a set of vector images that are grouped together in order to render the representation of the certain type of facility.

Figure 8:
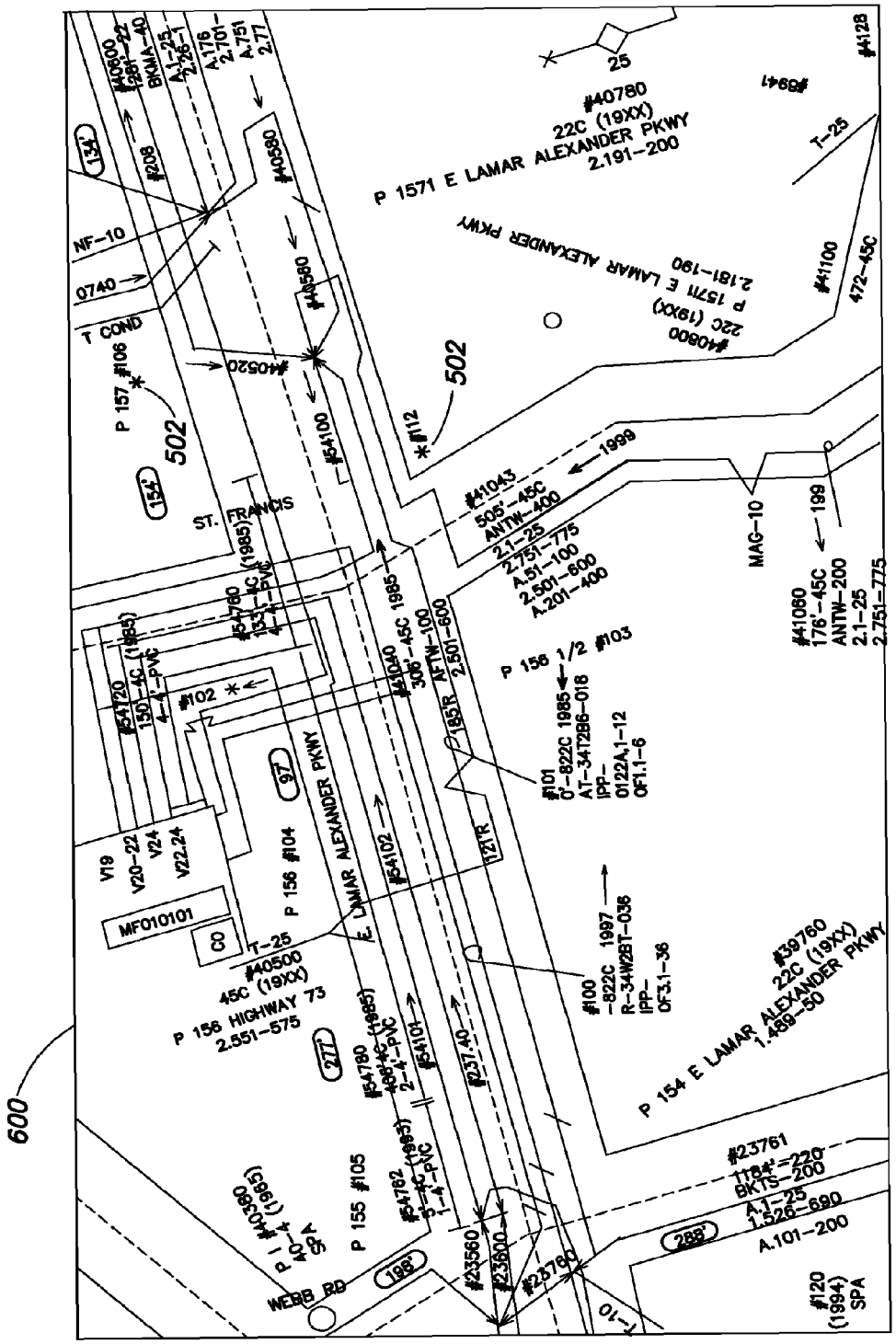
FIG. 8 illustrates an example of facilities map information that may be viewed on the display of the marking device.

FIG. 8 shows an example of a visual representation of a portion of an electronic facilities map 600. In this example, facilities map 600 is a telecommunications facilities map that is supplied by a telecommunications company. Facilities map 600 shows telecommunications facilities in relation to certain landmarks, such as streets and roads, using lines and shapes. As discussed above, the electronic facilities map may include metadata indicating what various lines, symbols and/or shapes represent, and indicating the geo-location of these lines, symbols and/or shapes. With respect to exemplary environmental landmarks and other features, facilities map 600 may include both visual information (graphics and text) and metadata relating to utility poles 602, manhole 604, streets 606, and any of a variety of other landmarks and features that may fall within the geographic area covered by the facilities map 600.

III. OTHER TYPES OF IMAGE INFORMATION

As also noted above and discussed in further detail below, various embodiments of the present invention relate to accessing and displaying not only facilities map information but other types of image information as well and, as with facilities map information, different images can be selected for viewing on the marking device at different times, according to various criteria. In some exemplary implementations, an "input image" may be stored in local memory 122 of the marking device and/or retrieved from the optional remote computer 150 (e.g., via the communication interface 124) and then stored in local memory, accessed, and various information may be derived therefrom for display (e.g., all or a portion of the input image, metadata associated with the input image, etc.).

For purposes of the present application, an input image is any image represented by source data that is electronically processed (e.g., the source data is in a computer-readable format) to display the image on a display device. An input image may include any of a variety of paper/tangible image sources that are scanned (e.g., via an electronic scanner) or otherwise converted so as to create source data (e.g., in various formats such as XML, PDF, JPG, BMP, etc.) that can be processed to display the input image, including scans of paper facilities maps. An input image also may include an image that originates as source data or an electronic file without necessarily having a corresponding paper/tangible copy of the image (e.g., an image of a "real-world" scene acquired by a digital still frame or video camera or other image acquisition device, in which the source data, at least in part, represents pixel information from the image acquisition device).

In some exemplary implementations, input images may be created, provided, and/or processed by a geographic information system (GIS) that captures, stores, analyzes, manages and presents data referring to (or linked to) location, such that the source data representing the input image includes pixel information from an image acquisition device (corresponding to an acquired "real world" scene or representation thereof), and/or spatial/geographic information ("geo-encoded information").

In view of the foregoing, various examples of input images and source data representing input images, to which the inventive concepts disclosed herein may be applied, include but are not limited to:

Manual "free-hand" paper sketches of the geographic area (which may include one or more buildings, natural or man-made landmarks, property boundaries, streets/intersections, public works or facilities such as street lighting, signage, fire hydrants, mail boxes, parking meters, etc.);

Various maps indicating surface features and/or extents of geographical areas, such as street/road maps, topographical maps, military maps, parcel maps, tax maps, town and county planning maps, call-center and/or facility polygon maps, virtual maps, etc. (such maps may or may not include geo-encoded information);

Architectural, construction and/or engineering drawings and virtual renditions of a space/geographic area (including "as built" or post-construction drawings);

Land surveys, i.e., plots produced at ground level using references to known points such as the center line of a street to plot the metes and bounds and related location data regarding a building, parcel, utility, roadway, or other object or installation;

A grid (a pattern of horizontal and vertical lines used as a reference) to provide representational geographic information (which may be used "as is" for an input image or as an overlay for an acquired "real world" scene, drawing, map, etc.);

"Bare" data representing geo-encoded information (geographical data points) and not necessarily derived from an acquired/captured real-world scene (e.g., not pixel information from a digital camera or other digital image acquisition device). Such "bare" data may be nonetheless used to construct a displayed input image, and may be in any of a variety of computer-readable formats, including XML); and Photographic renderings/images, including street level, topographical, satellite, and aerial photographic renderings/images, any of which may be updated periodically to capture changes in a given geographic area over time (e.g., seasonal changes such as foliage density, which may variably impact the ability to see some aspects of the image).

It should also be appreciated that source data representing an input image may be compiled from multiple data/information sources; for example, any two or more of the examples provided above for input images and source data representing input images, or any two or more other data sources, can provide information that can be combined or integrated to form source data that is electronically processed to display an image on a display device.

Figure 9:
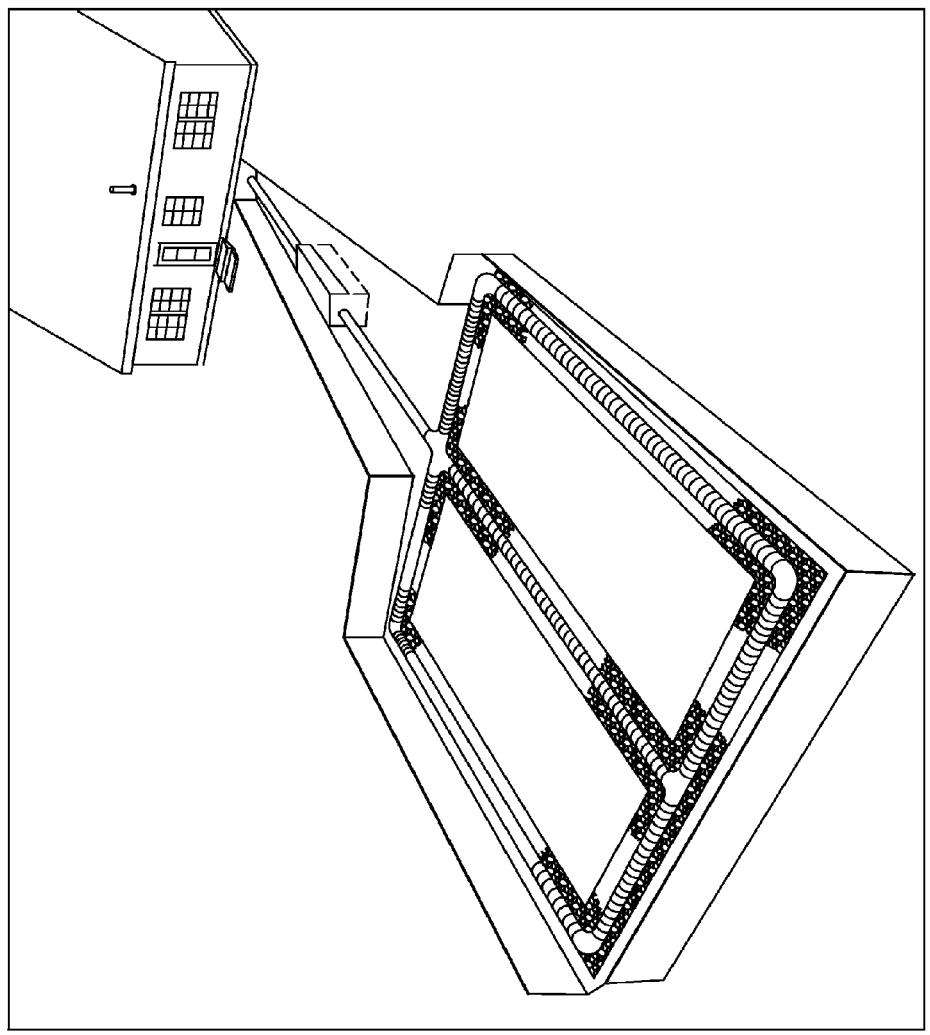
FIG. 9 illustrates a sketch representing an exemplary input image that may be viewed on the display of the marking device.
Figure 10:
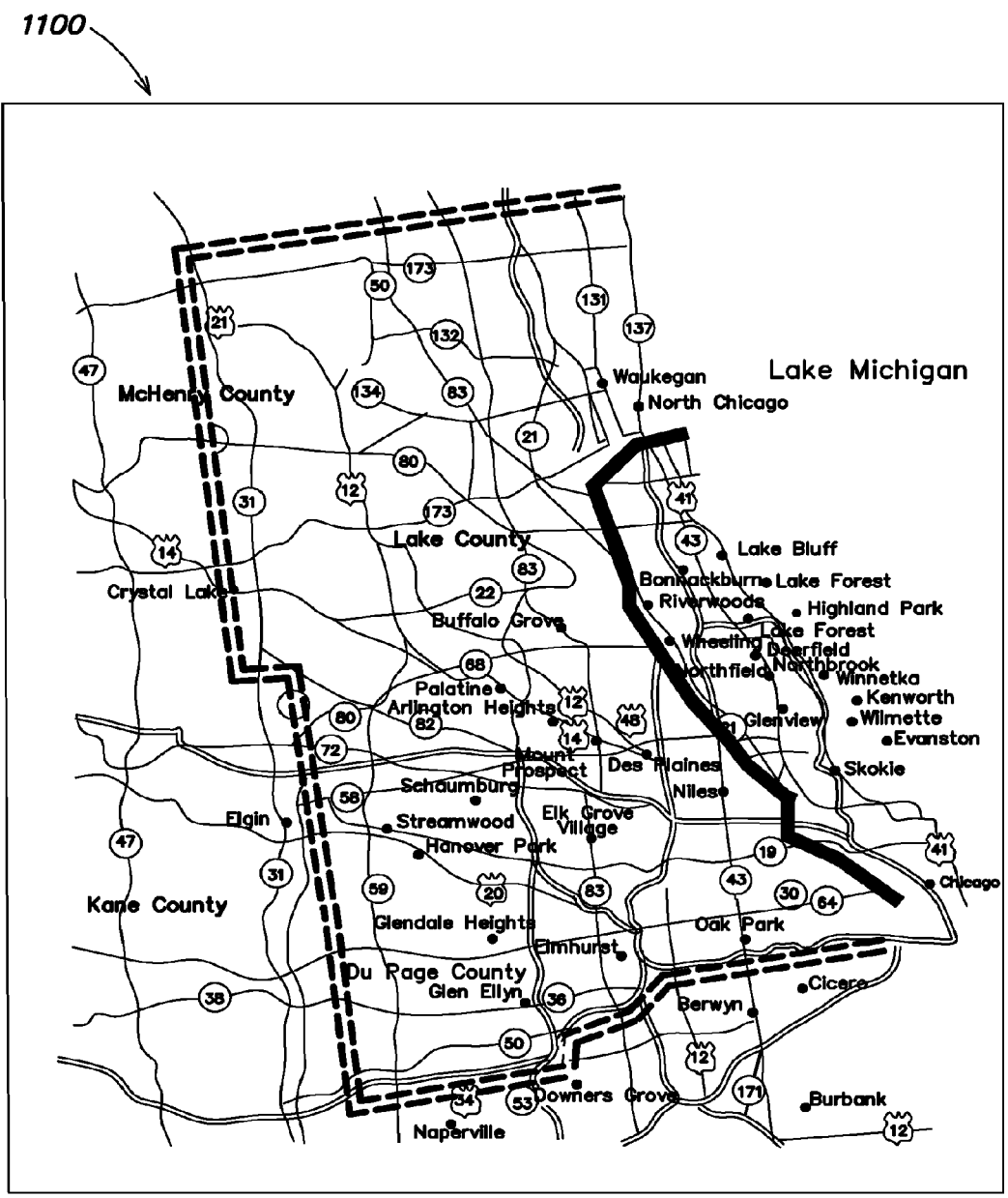
FIG. 10 illustrates a map, representing an exemplary input image that may be viewed on the display of the marking device.
Figure 11:
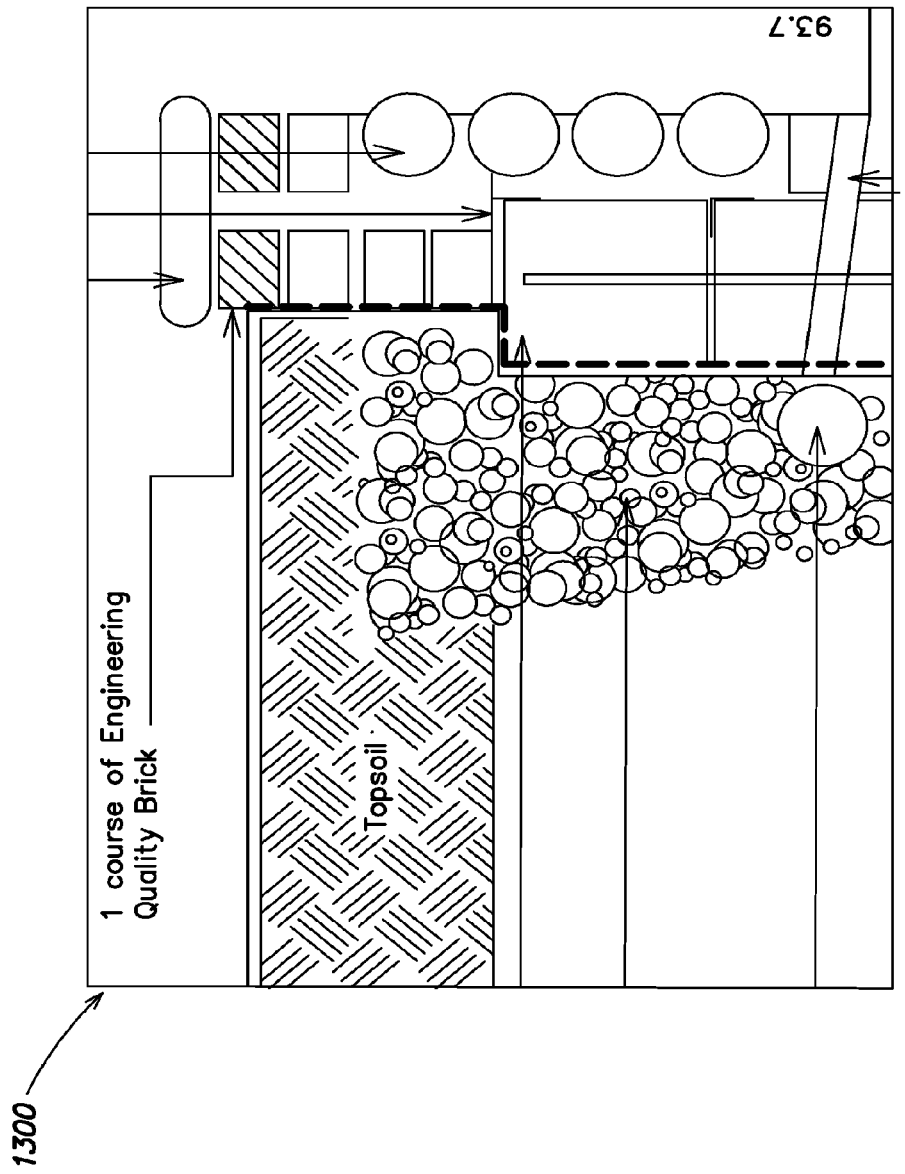
FIG. 11 illustrates a construction/engineering drawing, representing an exemplary input image that may be viewed on the display of the marking device.
Figure 12:
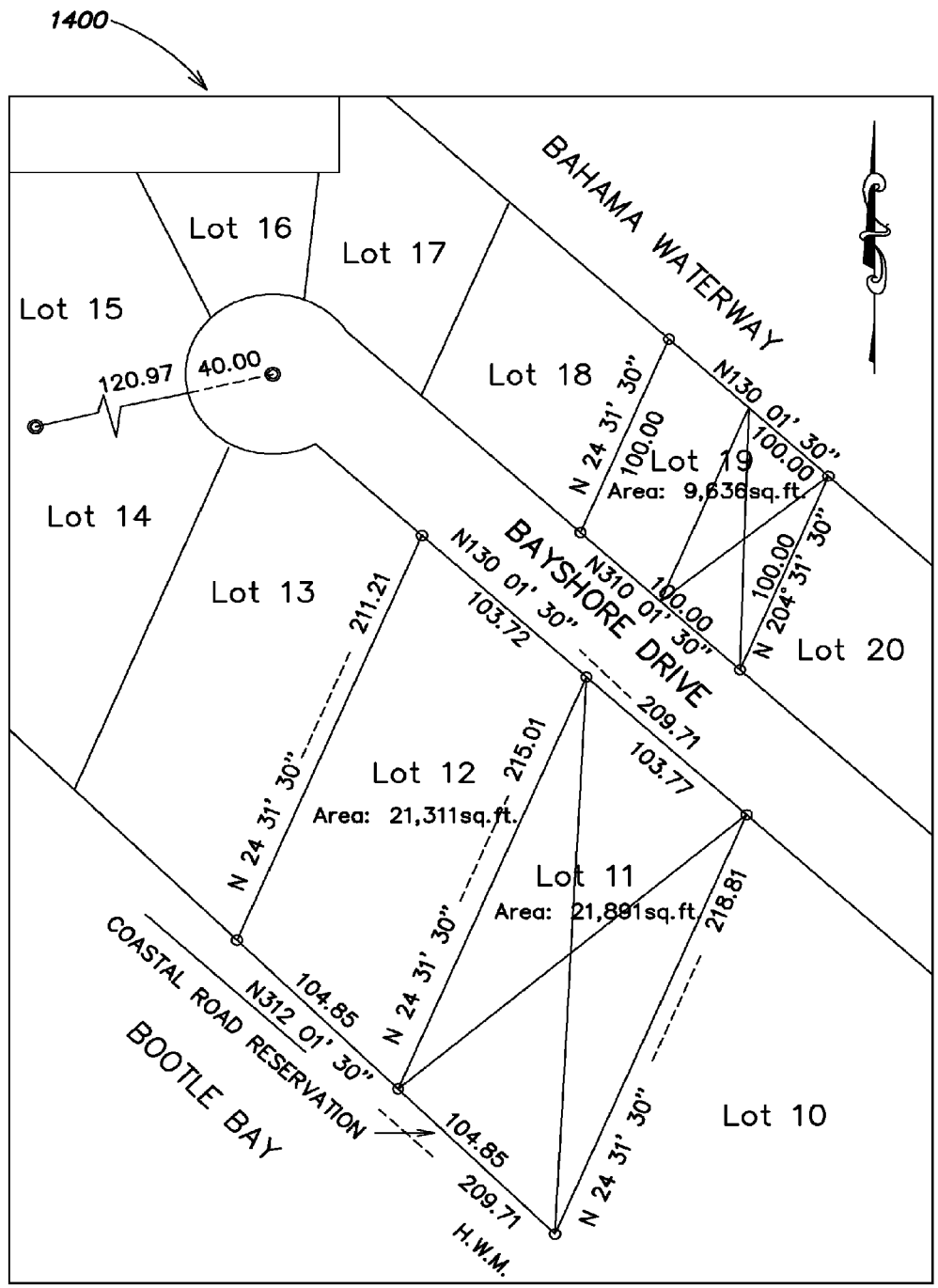
FIG. 12 illustrates a land survey map, representing an exemplary input image that may be viewed on the display of the marking device.
Figure 13:
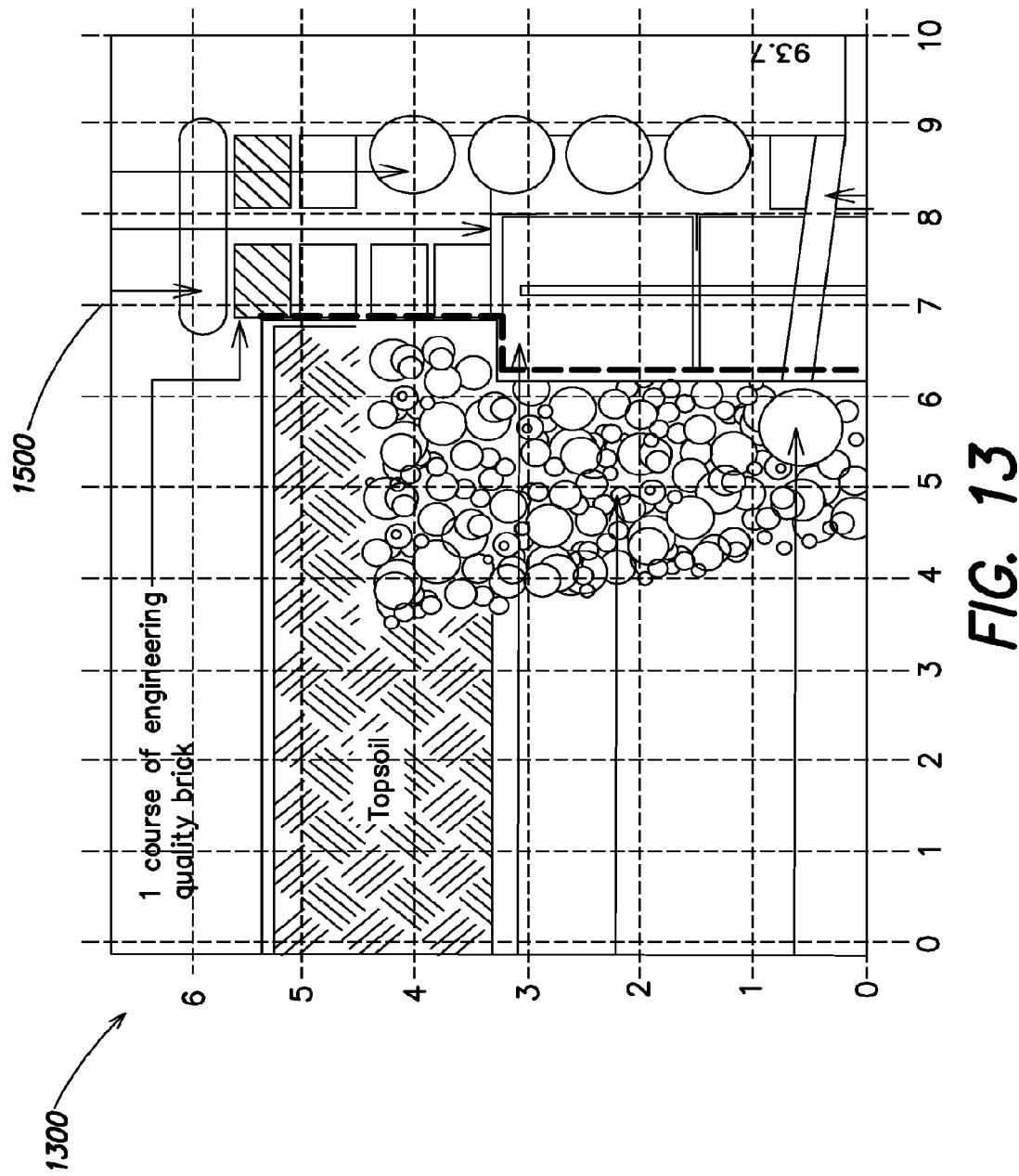
FIG. 13 illustrates a grid, overlaid on the construction/engineering drawing of FIG. 11, representing an exemplary input image that may be viewed on the display of the marking device.
Figure 14:
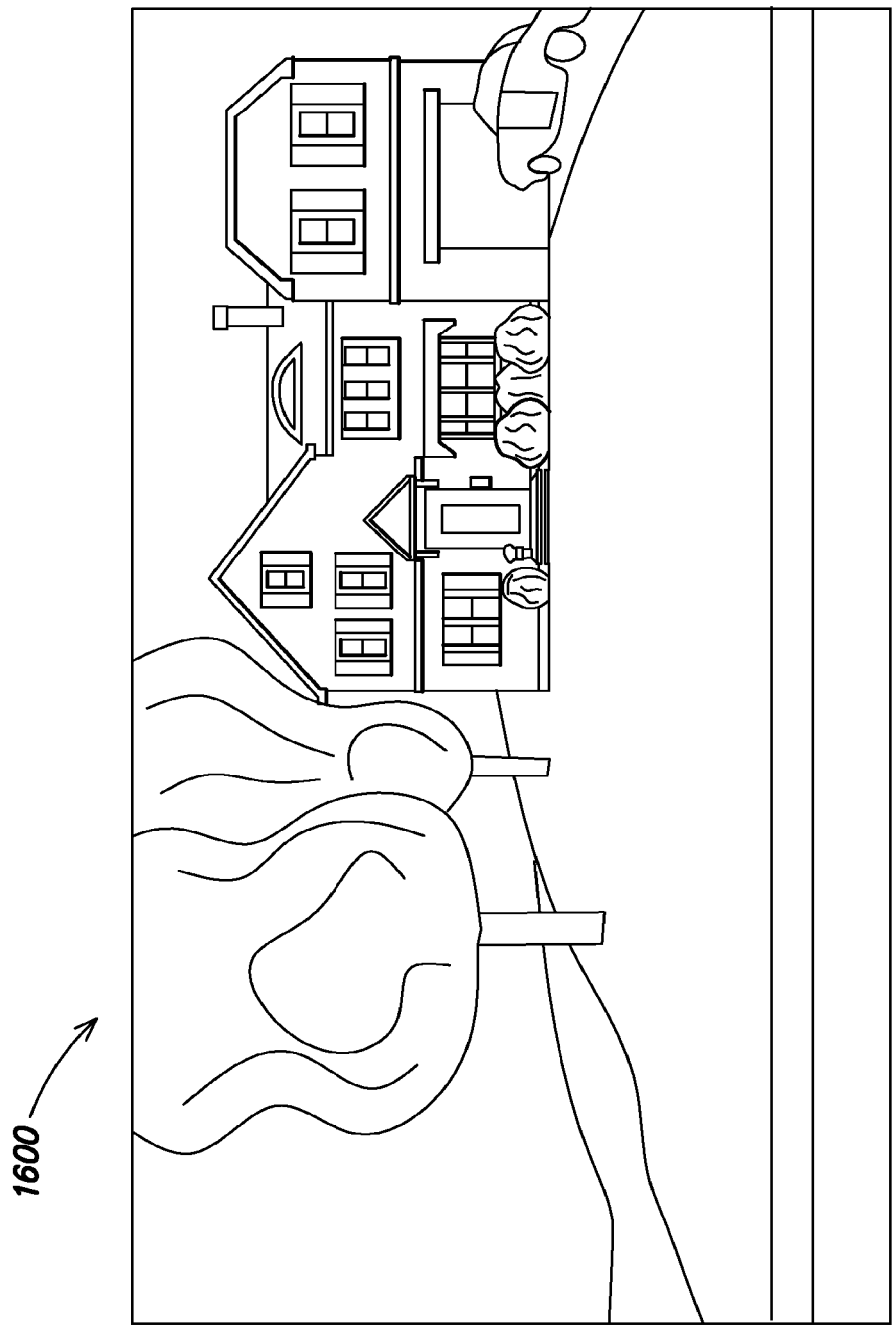
FIG. 14 illustrates a street level image, representing an exemplary input image that may be viewed on the display of the marking device.

Various examples of input images as discussed above are provided in FIGS. 9-14. For example, FIG. 9 shows a sketch 1000, representing an exemplary input image; FIG. 10 shows a map 1100, representing an exemplary input image; FIG. 11 shows a construction/engineering drawing 1300, representing an exemplary input image; FIG. 12 shows a land survey map 1400, representing an exemplary input image; FIG. 13 shows a grid 1500, overlaid on the construction/engineering drawing 1300 of FIG. 11, representing an exemplary input image; and FIG. 14 shows a street level image 1600, representing an exemplary input image.

IV. DISPLAYING FACILITIES MAP INFORMATION AND/OR OTHER IMAGE INFORMATION ON A MARKING DEVICE

In some embodiments, marking device 110 may display various information relating to one or more facilities maps or one or more input images on display 146. For example, processor(s) 118 may access facilities map data (e.g., from a file or a database) stored in local memory 122 or may retrieve facilities map data stored on remote computer 150 and may display on display 146 facilities maps based on the facilities map data.

In some embodiments, processor 118 may execute a map viewer application 113 for displaying facilities maps and/or input images. The map viewer application 113 may be a custom application or any conventional viewer application that is capable of reading in electronic facilities maps data or other input images, and rendering all or a portion of the electronic facilities maps data/input images to an image that can be viewed on display 146. Examples of conventional map viewer applications suitable for purposes of some embodiments of the present invention include, but are not limited to, the Bentley® viewer application from Bentley Systems, Inc. (Exton, Pa.) and the ArcGIS viewer application from Environmental Systems Research Institute (Redlands, Calif.). While the discussion below initially focuses on the display of facilities map information for purposes of illustrating some of the inventive concepts disclosed herein, it should be appreciated that the various concepts discussed below apply generally to the display of other types of image information as well.

Processor 118 may select a map to be displayed on display 146 in any of variety of ways. In some embodiments, a technician using the marking device may manually select a map to be displayed. For example, the technician may access a list of facilities maps available in local memory 122 and/or stored on remote computer using user interface 126 (e.g., via a menu-driven graphics user interface on the user interface 126) and may select a desired map from the list. In response, processor 118 may access the corresponding map data and render an image of the map or a portion of the map on display 146 (e.g., using the map viewer application 113). The technician may then also adjust the particular portion of the map that is displayed on display 146 by using user interface 146 to pan or scroll to the desired portion of the map, and may additionally select the desired zoom level at which the portion of the map is displayed.

In some embodiments, processor 118, in addition to or instead of providing the capability for a user/technician to manually select facilities map information to be displayed on display 146, may also automatically select a facilities map and display all or a portion of the selected facilities map on display 146. A variety of techniques may be used to automatically select a facilities map to be displayed on display 146, as well as a default pan and/or zoom for the selected map, and the invention is not limited to any particular technique.

In some embodiments, a facilities map may be automatically selected for display based, at least in part, on the type of facility being marked by the marking device and/or the current location of the marking device (e.g., obtained from the location tracking system).

For example, in some embodiments, processor 118 may determine the type of facility being marked by the marking device (e.g., using marking material detection mechanism 132) and select a facilities map based on that facility type. As discussed above, marking material detection mechanism may determine the type of facility being marked by determining the color of the marking material loaded into and/or being dispensed by the marking device. Because each marking material color corresponds to a particular type of facility, the color of the marking material may be used to select a facilities map. Table 1 shows an example of the correspondence of marking material color to the type of facility to be marked.

TABLE 1

Correspondence of color to facility type

| Marking material color | Facility Type |
| --- | --- |
| Red | Electric power lines, cables or conduits, and lighting cables |
| Yellow | Gas, oil, steam, petroleum, or other hazardous liquid or gaseous materials |
| Orange | Communications, cable TV, alarm or signal lines, cables, or conduits |
| Blue | Water, irrigation, and slurry lines |
| Green | Sewers, storm sewer facilities, or other drain lines |
| White | Proposed excavation |
| Pink | Temporary survey markings |
| Purple | Reclaimed water, irrigation and slurry lines |
| Black | Mark-out for errant lines |

Thus, for example, if processor 118 determines from marking material detection mechanism that the color of the marking material loaded into and/or being dispensed by the marking device is red, then electric power lines may be determined as the type of facility being marked. As another example, if processor 118 determines from marking material detection mechanism that the color of the marking material loaded into and/or being dispensed by the marking device is yellow, then gas lines may be determined as the type of facility being marked.

In some embodiments, rather than determine the type of facility being marked based on the color of the marking material, processor 118 may prompt, via user interface 126, the technician using the marking device to manually input the type of facility being marked, and may accept the technician's input as the type of facility being marked. In yet another embodiment, facility type information may be derived from the ticket information, discussed above in section I; in particular, ticket information typically includes one or more member codes representing facility owners of different types of facilities, and available ticket information may be parsed to determine relevant facility types based on one or more member codes present in the ticket information. Accordingly, in some implementations, one or more appropriate facilities maps may be selected, before the marking operation and independently of the marking material and/or other manual input from the user, based on facility type information derived from the ticket information.

In some embodiments, once the type of facility being marked has been determined, processor 118 may select a facilities map or facilities map data to render a display on display 146 by determining the current geo-location of the marking device and selecting a facilities map or facilities map data corresponding to the facility type being marked based on the current location of the marking device. Processor 118 may determine the current geo-location of the marking device from location tracking system 130 and may select a facilities map or facilities map data for the type of facility being marked that includes the current geo-location. For example, if the current location of the marking device is 2650.9348,N, 08003.5057,W, and the type of facility is electric power lines, processor 118 may access facilities map data that covers an area including 2650.9348,N,08003.5057,W and includes data indicating the location of electric power lines in this area, and may render a map image on display 146 showing the area and location of the electric power lines in that area.

Other techniques for automatically selecting a facilities map or facilities map data to render a displayed image may be used. For example, in some embodiments, processor 118 may select a facilities map or facilities map data to be displayed using information from the ticket for a particular locate operation. For example, an address from the ticket may be used to select facilities map data that covers the geographic area in which the address is located. In some embodiments, one or more member codes from the ticket may be used to determine a facility type that is to be marked and automatically select the appropriate facilities map data for that facility type. For example, if a ticket includes a member code for the gas company, processor 118 may automatically select gas facilities map data. In some situations, a ticket may include multiple member codes corresponding to different utility types. In such situations, standard operating procedure may be used to determine which facilities map to automatically select first. For example, a ticket may include member codes for the gas company and the electric company. Standard operating procedure may be specify that gas is to be marked before electric and, as such, processor 118 may automatically select the gas facilities map data to be displayed first and, once the gas locate and marking operation is complete, may automatically select the electric facilities map to be displayed next.

In some embodiments, information about the entity that requested that the locate operation be performed may be used in automatically selecting facilities map data. For example, if the electric company requested that the locate operation be performed, processor 118 may automatically select the electric facilities map data to be visually rendered and displayed.

In addition, in some embodiments, facilities map data may be selected based on a virtual white line (VWL) image that includes markings imposed on an image that delimit an area in which excavation is planned. Thus, for example, processor 118 may select facilities map data that includes the area indicated by the markings.

In some embodiments, once facilities map data has been automatically selected, a portion of the facilities map or facilities map data to render an image on display 146 may be identified. That is, the facilities map data that has been automatically selected may cover an area significantly larger than the work site/dig area at which a locate and/or marking operation is being conducted, and thus only a portion of the selected map data needs to be displayed on display 146. Accordingly, in some embodiments, the map viewer application 113 executing on processor 118 may display only a portion of the facilities map data on display 146. The portion of the facilities map to be displayed may be selected in a variety of ways. For example, in some embodiments, a technician may have the ability to manually select the portion of a facilities map that is desired to be displayed on display 146. As an example, once a particular facilities map has been automatically selected, the facilities map may be displayed on display 146 at a default zoom level, centered at the current geo-location of the marking device. If the technician desires to a view a different portion of the map or adjust the zoom level, the technician may pan or scroll to a different part of the map and adjust the zoom level using the controls of user interface 126.

In some embodiments, in addition to or instead of providing a technician with the capability to manually select a portion of a facilities map data to be displayed, processor 118 may automatically select a portion of the facilities map data to be displayed. For example, in some embodiments, processor 118 may select a portion of the selected facilities map data to be displayed based on one or more aspects of the ticket information pursuant to which the locate and/or marking operation is being performed. In particular, as noted above, the ticket information generally includes some description of the work site/dig area (in which excavation, digging or otherwise disturbing the ground is anticipated). While conventionally such information about the work site/dig area may be included as text comments in the ticket information, in some instances the ticket information may include a digital image (e.g., an aerial image) of a geographic area surrounding/proximate to the work site, on which are placed (e.g., via an electronic drawing tool) one or more dig area indicators to indicate or delimit a dig area. These marked-up digital images may be saved together with metadata pertaining to various information in the images.

An example of a drawing application that may be used to create such marked-up images including dig area indicators is described in U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" U.S. patent application Ser. No. 12/422,364 filed Apr. 13, 2009, entitled "Virtual white lines (VWL) application for indicating a planned excavation or locate path." Each of these patent applications is hereby incorporated by reference herein in its entirety.

In one example, the dig area indicators in a marked-up image may include two-dimensional (2D) drawing shapes, shades, points, symbols, coordinates, data sets, or other indicators to indicate on a digital image the dig area in which excavation is to occur. To generate the electronic image having dig area indicators, an image (e.g., an aerial image) of the work site may be sent to an excavator via a network, the excavator may use a computing device executing the drawing application to create a marked-up image by marking up the image to include one or more dig area indicators precisely delimiting one or more dig areas within the work site and, in response, the marked-up image may be received from the excavator via the network.

As noted above, a marked-up image may include metadata corresponding to any markings or content in the image; in particular, geographic information including geographic coordinates (e.g., latitude and longitude values) for any dig area indicators on the marked-up image may accompany or be included in an image file as metadata, and these geographic coordinates may be employed in a variety of manners to select a portion of the facilities map data to be displayed on display 146.

For example, in some embodiments, the portion of the facilities map data to be displayed may be selected to include all or a portion of the dig area as indicated on the marked-up image. In particular, in one exemplary implementation, geographic coordinates associated with a single dig area indicator may be used to select facilities map contents that relates only to a geographic area including the geographic coordinates for the dig area indicator, or contents that falls within a predetermined radius of the geographic coordinates for the dig area indicator or a polygon-shaped buffer zone around the geographic coordinates for the dig area indicator. In yet another example, geographic coordinates associated with multiple dig area indicators that delimit a specific dig are may be used to select only contents of the facilities map that corresponds to the delimited dig area. In yet another embodiment, the contents of the facilities map that corresponds to the delimited dig area may be displayed with a "buffer frame" around the delimited dig area (e.g., to provide some margins for the viewed subject matter). Accordingly, it should be appreciated that in some embodiments, the dig area indicator coordinates may identify a plurality of points along a perimeter of the delimited dig area, and these coordinates may be used to select specific geographic information from the facilities maps (e.g., filter out geographic information outside of the delimited dig area). In other embodiments, the dig area indicator coordinates may identify a single point, in which case the coordinates may be used to select particular information based at least in part on the coordinates for the single point.

In some embodiments, the map viewer application 113 executing on processor 118 may automatically select an orientation of the map or portion of the map that is displayed on display 146 based on the direction in which a technician of the marking device is moving. In some conventional techniques for displaying map information, a displayed map generally is oriented so that north is at the top of the display and south is at the bottom of the display. However, the inventors have appreciated that when displaying a facilities map or portion thereof on a marking device during a locate and/or marking operation, orienting the map such that the direction in which the technician is moving is at the top of the map may aid the technician in identifying the location of underground facilities relative to his or her current position. Thus, for example, if the technician is walking north, then the map viewer application may display the selected portion of the map such that north is at the top of the screen. If the technician turns left and is walking west, then the map viewer application may re-orient the selected portion of the map such that west is at the top of the screen. In this manner, the map viewer application 113 executing on processor 118 may update the portion and/or the orientation of the facilities map that is being displayed on display 146 in essentially real-time (e.g., update one or more of pan, zoom, and orientation as the technician moves from one place to another during the operation).

The map viewer application 113 may determine the direction in which a technician is walking using any of a variety of techniques. For example, in some embodiments, processor 118 may monitor the current geo-location of the marking device as indicated by location tracking system 130, determine the direction in which the marking device is moving based on changes in the geo-location, and provide this direction to the map viewer application. For example, in some embodiments processor 118 may determine the direction in which the marking device is moving by obtaining the current heading from the electronic compass.

In some embodiments, marking device 110 may include other devices that may be used to determine the direction in which the marking device is moving, such as a compass, an accelerometer, and/or an inclinometer. Thus, in some embodiments, processor 118 may use these devices instead of or in addition to location tracking system 130 to determine the direction in which the marking device is moving. For example, in some embodiments, the compass may be used to determine a heading in which the marking device is moving. In other embodiments, the accelerometer and/or inclinometer may be used to determine the direction in which the marking device is moving.

Figure 15:
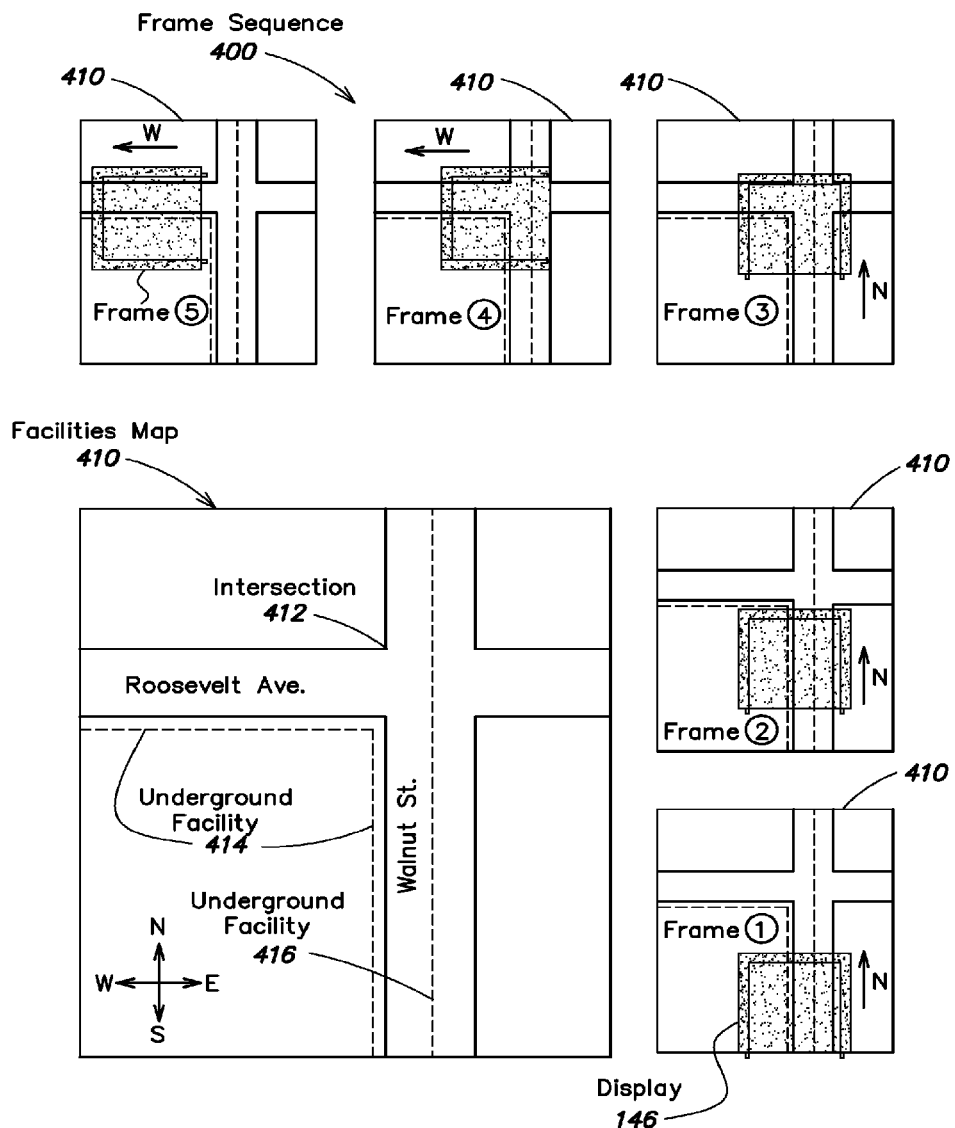
FIG. 15 illustrates an example of a video frame sequence of a facilities map that may be displayed on the display of a marking device, in accordance with some embodiments.

To demonstrate the concept of automatically orienting and positioning a portion of a facilities map based on technician/device movement and heading, FIG. 15 illustrates an example of a video frame sequence 400 that may be displayed on display 146 of marking device 110 as a technician moves the marking device to different geo-locations during a locate and/or marking operation. To illustrate video frame sequence 400, FIG. 15 shows an example facilities map 410, which is the facilities map to be displayed on display 146. Facilities map 410 shows, for example, an intersection 412 of Roosevelt Avenue, which runs east and west, and Walnut Street, which runs north and south. Installed along Roosevelt Avenue and/or Walnut Street is a first underground facility 414 and a second underground facility 416. By way of example, video frame sequence 400 shows a frame sequence that is presented on display 146 (e.g., by the map viewer application 113) to the technician while in the process of locating and/or marking the first underground facility 414. Each frame of video frame sequence 400 represents a segment of facilities map 410 that is being displayed.

Referring to FIG. 15, as the locate technician moves in a northerly direction along Walnut Street, frame 1 of video frame sequence 400 that is displayed on display 146 shows underground facility 414 at the south end of Walnut Street with respect to facilities map 410. Additionally, frame 1 is oriented on display 146 with a north heading.

As the locate technician continues to move in a northerly direction along Walnut Street, frame 2 of video frame sequence 400 that is displayed on display 146 shows underground facility 414 while approaching intersection 412 of facilities map 410. Additionally, frame 2 is still oriented on display 146 with a north heading.

As the locate technician continues to move in a northerly direction through intersection 412, frame 3 of video frame sequence 400 that is displayed on display 146 shows underground facility 414 at intersection 412. Additionally, frame 3 is still oriented on display 114 with a north heading.

As the locate technician changes direction and moves in a westerly direction along Roosevelt Avenue, frame 4 of video frame sequence 400 that is displayed on display 146 shows underground facility 414 while exiting intersection 412 along Roosevelt Avenue. Additionally, frame 4 the orientation of facilities map 410 on display 146 has been updated from a north heading to a west heading.

As the locate technician continues to move in a westerly direction along Roosevelt Avenue, frame 5 of video frame sequence 400 that is displayed on display 146 shows underground facility 414 at the west end of Roosevelt Avenue with respect to facilities map 410. Additionally, frame 5 is still oriented on display 146 with a west heading.

The inventors have appreciated that, in some situations where the locate technician is moving in a particular direction, the locate technician may reach a location that is at the end of a the portion of the map that is currently being displayed, such that if the technician were to continue to move along a vector that includes a component in that direction, his or her location will no longer be a location on the portion of the map that is currently being displayed, but rather may be a location that is in a different map portion.

Thus, in some embodiments, when a location technician moves from a location that is on the map portion currently being displayed to a location that is not on the map portion that is currently being displayed, processor 118 may determine that the technician has moved off the map portion that is currently being displayed. Processor 118 may then identify and select additional map data (e.g., stored in the local memory 122 of the marking device, or retrieved from a library/archive stored on remote computer 150) that includes the location to which the technician has moved and cause the map viewer application 113 to display this other map, in a manner similar to that discussed above in connection with appropriate selection of maps/images for display.

In addition, in some embodiments, it may be desired to display a map such that the current location of the technician is roughly centered on the display. In this way, as the technician moves, the portion of the map that is displayed is adjusted so that the geographic location of technician on the map is displayed roughly in the center of the display. In such embodiments, the technician may be at a geographic location that is near or at the end of the currently displayed map portion. Thus, if the current location of the technician were to be displayed at roughly the center of the display, then a portion of the display may be left blank because the map data that belongs in that portion of the display is not in the map currently being displayed. Thus, in some embodiments, to address this issue, processor 118 may determine when the technician is at a location that warrants additional map data to be displayed on the display at the same time, determine which additional map data includes the desired data, stitch together a map image using the additional map data, and cause this "stitched together" image to be displayed on the display.

While the concepts described immediately above (e.g., updating pan, zoom and or orientation of displayed content based on technician/device movement and heading) were discussed for purposes of illustration using facilities map information, it should be appreciated that the foregoing discussion applies similarly to other types of image information (e.g., from one or more of the input images discussed above in Section III).

Figure 16:
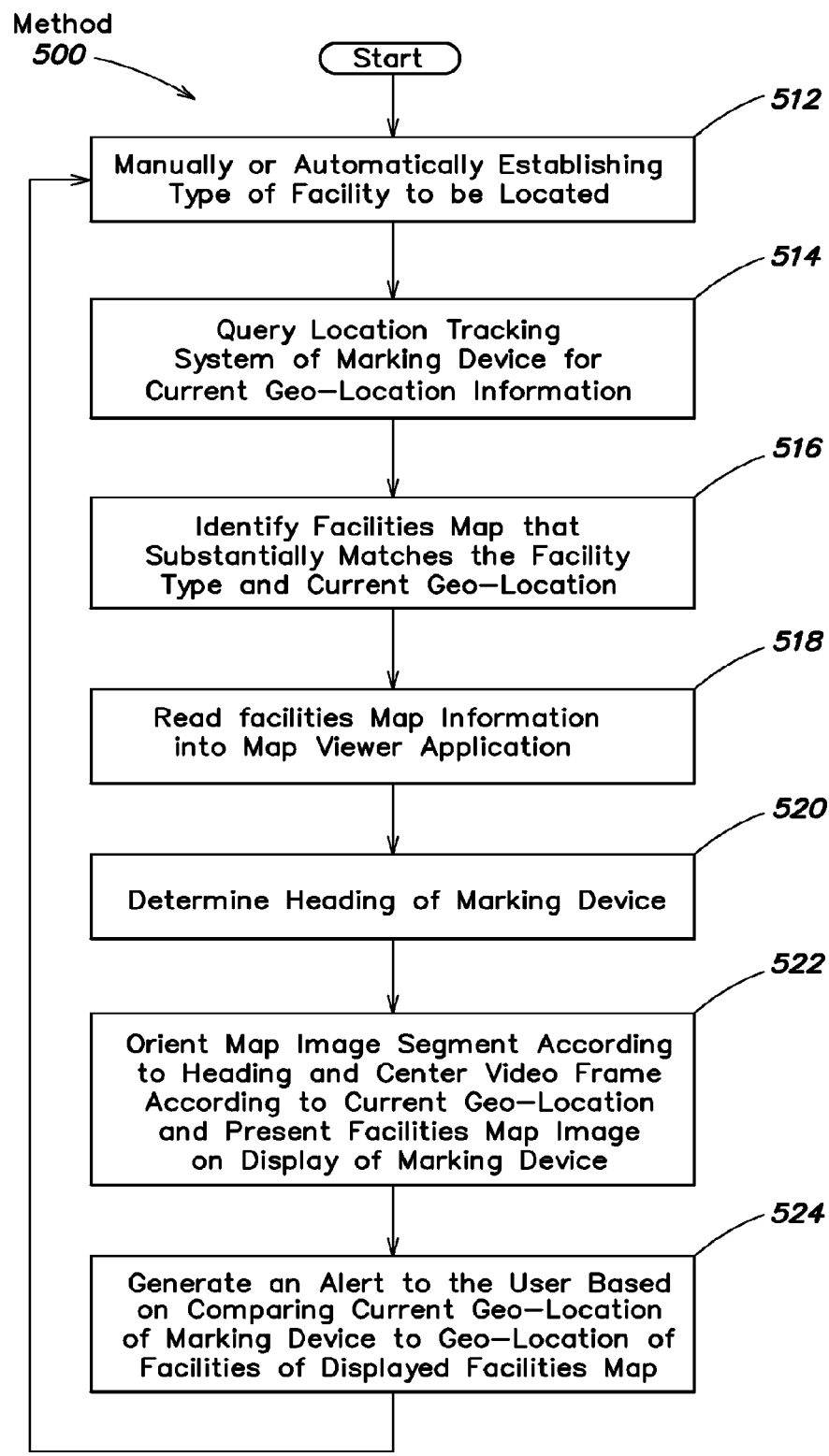
FIG. 16 illustrates a flow diagram of a process for displaying a facilities map on the display of a marking device, in accordance with some embodiments.

FIG. 16 illustrates a flow diagram of a process 500 for selecting and viewing facilities map information or other image information on a marking device, according to one embodiment of the present invention. Process 500 begins at act 512 where the type of facility to be marked is established manually or automatically using, for example, any of the techniques discussed above. The process then continues to act 514, where the location tracking system of the marking device is queried for the current geo-location information. The geo-location data from location tracking system 158 may be provided, in a variety of different formats, including for example, in degrees, minutes, and seconds (i.e., DDD° MM' SS.S"), degrees and decimal minutes (DDD° MM.MMM'), decimal degrees (DDD.DDDDD°), and/or any combination thereof.

The process next continue to act 516, where facilities map data that matches the determined facility type determined in act 512 and the geo-location determined in act 514 is identified. The process then continues to act 518, where the map viewer application reads in the identified facilities map data, preparing to present an image of this facilities map on the display of the marking device. The processor then continues to act 520, where the current heading (i.e., the direction in which the marking device is moving) is determined from, for example, the location tracking system, compass, inclinometer, and/or accelerometer. Once the current heading is determined, the process continues to act 522, where a map or map image segment is oriented according to the determined heading and centered according to the current geo-location of the marking device, and the facilities map image is presented on the display of the marking device.

In some embodiments, the marking device may alert the technician when he or she is at a location of a facility line, as indicated by the facilities map data. Thus, in some embodiments, the process may continue to act 524, where an alert to the locate technician may be generated based on comparing current geo-location of the marking device to the geo-location of the facilities of the displayed facilities map. In particular, in one exemplary implementation, the geo-location of the facilities of the displayed facilities map constitutes "reference information," to which "field information" in the form of the geo-location of the marking device (e.g., respective geo-locations of dispensed marking material) may be compared. Various methods and apparatus for comparing field information in the context of locate and marking operations to reference information derived from facilities maps is discussed in U.S. application Ser. No. 12/571,356, filed Sep. 30, 2009, and entitled, "Method And Apparatus For Analyzing Locate And Marking Operations With Respect To Facilities Maps," which is incorporated herein by reference in its entirety.

In one example, processor 118 may compare the geo-location data of location tracking system 130 to the geo-location information in the displayed facilities map. When the two geo-locations substantially match (within a certain acceptable tolerance), an audible indicator, such as a buzzer or alarm may be activated, a tactile indicator such as a device that vibrates the handle of the marking device, and/or a visual indicator, such as an LED of user interface 126, may be activated in order to alert the locate technician that he or she is at or near the location of the target facility to be marked.

In other embodiments, if the location of the marking device differs from the location at which the facilities map(s) indicate the facility line to be marked is located by at least a threshold distance (e.g. six feet or any other suitable threshold distance), processor 118 may cause an alert (e.g., an audible indicator, a tactile indicator, and/or a visual indicator) to the technician to be activated. In addition, any discrepancies between the locations at which marking material was dispensed and the locations of the facility lines to be marked as indicated on the facilities map may be logged and later evaluated to determine whether the discrepancy is a result of facilities map inaccuracy or locate technician error.

As shown in FIG. 16, the acts of process 500 may repeat any number of times and at any programmed frequency (e.g., every 100 milliseconds) until the locate operation is complete. With each iteration of the acts of process 500, the map viewer application updates (or refreshes) the display with the current facilities map information in order to reflect any changing geo-location and/or heading of the marking device as the technician performs the locate operation.

IV. OVERLAY OF MARKING INFORMATION ON DISPLAYED FACILITIES MAP INFORMATION OR OTHER IMAGE INFORMATION

The inventors have appreciated that, as a technician using a marking device dispenses marking material during a locate and marking operation, it may be useful to overlay, on displayed facilities map information or other displayed image information, electronic marks that indicate where the marking material was dispensed. This provides the locate technician with a visual representation of where marking material was dispensed relative to the location of facility lines shown on the facilities map, and may accordingly provide a sense of how close the marking material that he or she dispensed is to the location of the facility lines, as indicated on the map. In addition, in some situations, it may be desirable to overlay one or more indicators, such as a "you are here" icon or a pointer icon on the displayed facilities map or other image information to provide the technician with a visual representation of his or her current location on the displayed portion of the map.

Figure 17:
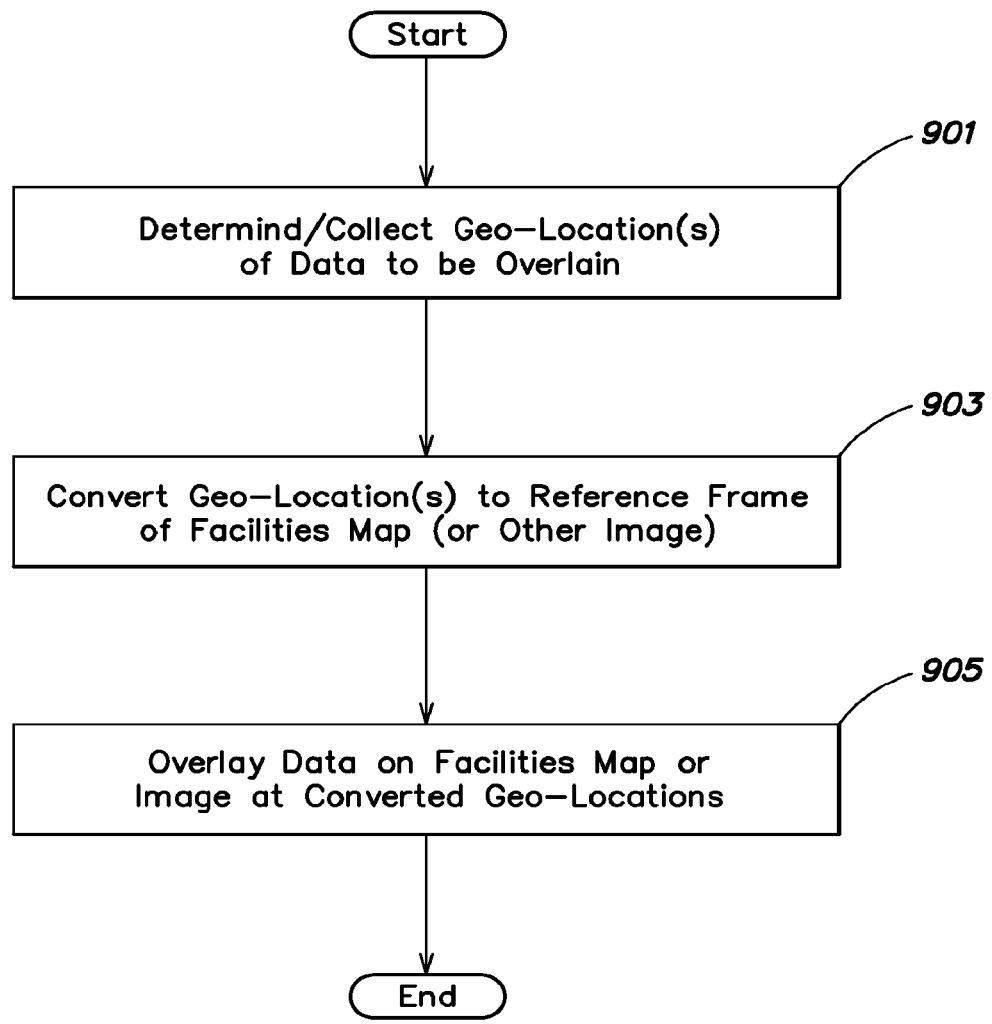
FIG. 17 illustrates a flow diagram of a process for overlaying data on a facilities map displayed on the display of a marking device.

FIG. 17 is an example of a process that may be used to overlay data, such as electronic markings indicative of geo-locations at which marking material was dispensed, a present location indicator or a "you are here" icon indicative of the current location of the marking device, or any other type of data, on displayed facilities map information or other image information, according to one embodiment of the present invention.

The process of FIG. 17 begins at act 901, where the geo-location data of the marking information to be overlaid (e.g., geo-location data corresponding to physical locate marks, or a current location mark) is determined/collected. For example, if the information to be overlaid is a current location mark or "you are here" icon indicative of the current location of the marking device, the current location of the marking device may be determined from location tracking system 130. If the information to be overlaid is an electronic mark indicative of a geo-location at which marking material was dispensed (e.g., to create a physical locate mark on ground, pavement or other surface), the geo-location data at which marking material was dispensed may be collected from the location tracking system 130 in response to actuation of the marking device and/or determined, for example, from the electronic record 135 generated and stored by the marking device. That is, as discussed above, in some embodiments, each time the marking device 110 is actuated, the location tracking system may be polled to provide one or more geo-location data points that may be overlaid on displayed facilities map information or other image information essentially in real-time as the data is collected, and/or the geo-location data may be logged as data event entries in the electronic record 135 and the electronic record 135 may be accessed thereafter to obtain geo-location data for overlaying on displayed facilities map or other image information.

Table 2 below shows another example of marking device data that may be captured as the result of, for example, one or more actuations of a marking device. Specifically, Table 2 illustrates multiple "actuation data sets" of an electronic record of a marking operation as generated by a marking device, in which each actuation data set includes information associated with multiple actuation event entries logged during a corresponding actuation of the marking device and dispensing of marking material. Table 2 shows three actuation data sets of an electronic record, corresponding to three actuations of the marking device (e.g., act-1, act-2, and act-3). As may be appreciated from the information shown in Table 2, in some embodiments multiple pieces of geo-location data may be logged for each actuation of a marking device (in addition to various other information). However, it should be appreciated that the present invention is not limited in this respect, and that multiple pieces of geo-location data per actuation are not necessarily required for overlay on displayed facilities map or other image information.

TABLE 2

Example actuation data set for act-1

| | | |
|---|---|---|
| act-1 | Service provider ID | 0482 |
| | User ID | 4815 |
| | Device ID | 7362 |
| | T1 timestamp data | Jul. 12, 2008; 09:35:15.2 |
| | T2 timestamp data | Jul. 12, 2008; 09:35:16.1 |
| | Duration (Δt) | 00:00:00.9 |
| | T1 geo-location data | 2650.9348, N, 08003.5057, W |
| | 1$^{st}$ interval location data | 2650.9353, N, 08003.5055, W |
| | 2$^{nd}$ interval location data | 2650.9356, N, 08003.5055, W |
| | — | — |
| | — | — |
| | Nth interval location data | 2650.9246, N, 08003.5240, W |
| | T2 geo-location data | 2650.9255, N, 08003.5236, W |
| | Product data | Color = Red, Brand = ABC, Type/Batch = 224B-1 |
| | Locate request data | Requestor: XYZ Construction Company, Requested service address: 222 Main St, Orlando, FL |

Example actuation data set for act-2

| | | |
|---|---|---|
| act-2 | Service provider ID | 0482 |
| | User ID | 4815 |
| | Device ID | 7362 |
| | T1 timestamp data | Jul. 12, 2008; 09:35:17.5 |
| | T2 timestamp data | Jul. 12, 2008; 09:35:18.7 |
| | Duration (Δt) | 00:00:01.2 |

TABLE 2-continued

| | | |
|---|---|---|
| T1 geo-location data | 2650.9256, N, 08003.5234, W | |
| 1st interval location data | 2650.9256, N, 08003.5226, W | |
| 2nd interval location data | 2650.9256, N, 08003.5217, W | |
| — | — | |
| — | — | |
| — | — | |
| Nth interval location data | 2650.9260, N, 08003.5199, W | |
| T2 geo-location data | 2650.9266, N, 08003.5196, W | |
| Product data | Color = Red, Brand = ABC, Type/Batch = 224B-1 | |
| Locate request data | Requestor: XYZ Construction Company, Requested service address: 222 Main St, Orlando, FL | |

| Example actuation data set for act-3 | | |
|---|---|---|
| act-3 | Service provider ID | 0482 |
| | User ID | 4815 |
| | Device ID | 7362 |
| | T1 timestamp data | Jul. 12, 2008; 09:35:18.7 |
| | T2 timestamp data | Jul. 12, 2008; 09:35:19.8 |
| | duration (Δt) | 00:00:01.1 |
| | T1 geo-location data | 2650.9273, N, 08003.5193, W |
| | 1st interval location data | 2650.9281, N, 08003.5190, W |
| | 2nd interval location data | 2650.9288, N, 08003.5188, W |
| | — | — |
| | — | — |
| | — | — |
| | Nth interval location data | 2650.9321, N, 08003.5177, W |
| | T2 geo-location data | 2650.9325, N, 08003.5176, W |
| | Product data | Color = Red, Brand = ABC, Type/Batch = 224B-1 |
| | Locate request data | Requestor: XYZ Construction Company, Requested service address: 222 Main St, Orlando, FL |

Thus, the geo-location(s) at which marking material was dispensed may be obtained from these electronic records, and/or may be collected essentially in real-time as the marking operation is being performed. Once the geo-location data to be overlaid on the displayed information is determined, the process continues to optional act 903, where this geo-location data may be converted, if necessary, to the spatial reference frame used by the facilities map (or other image) from which the information displayed on the display 146 is derived.

As known in the relevant art, a geographic or "global" coordinate system (i.e., a coordinate system in which geographic locations on Earth are identified by a latitude and a longitude value, e.g., (LAT,LON)) may be used to identify geographic locations of locate marks and a facility line. In a "geocentric" global coordinate system (i.e., a coordinate system in which the Earth is modeled as a sphere), latitude is defined as the angle from a point on the surface of a sphere to the equatorial plane of the sphere, whereas longitude is defined as the angle east or west of a reference meridian between two geographical poles of the sphere to another meridian that passes through an arbitrary point on the surface of the sphere. Thus, in a geocentric coordinate system, the center of the Earth serves as a reference point that is the origin of the coordinate system. However, in actuality the Earth is not perfectly spherical, as it is compressed towards the center at the poles. Consequently, using a geocentric coordinate system can result in inaccuracies.

In view of the foregoing, the Earth is typically modeled as an ellipsoid for purposes of establishing a global coordinate system. The shape of the ellipsoid that is used to model the Earth and the way that the ellipsoid is fitted to the geoid of the Earth is called a "geodetic datum." In a "geodetic" global coordinate system, the latitude of a point on the surface of the ellipsoid is defined as the angle from the equatorial plane to a line normal to the reference ellipsoid passing through the point, whereas the longitude of a point is defined as the angle between a reference plane perpendicular to the equatorial plane and a plane perpendicular to the equatorial plane that passes through the point. Thus, geodetic latitude and longitude of a particular point depends on the geodetic datum used.

A number of different geodetic global coordinate systems exist that use different geodetic datums, examples of which include WGS84, NAD83, NAD27, OSGB36, and ED50. As such, a geographic point on the surface of Earth may have a different latitude and longitude values in different coordinate systems. For example, a stop sign at the corner Maple St. and Main St. may have a latitude and longitude of $(LAT_1, LON_1)$ in the WGS84 coordinate system, but may have a latitude and longitude of $(LAT_2, LON_2)$ in the NAD83 coordinate system (where $LAT_1 \neq LAT_2$ and/or $LON_1 \neq LON_2$). Thus, when comparing one geographic point to another geographic point to determine the distance between them, it is desirable to have both geographic points in the same global coordinate system.

Additionally, when determining a geographic location based on information derived from a map (e.g., a facilities map), the coordinate system provided by the map may not be a global coordinate system, but rather may be a "projected" coordinate system. As appreciated in the relevant art, representing the curved surface of the Earth on a flat surface or plane is known as a "map projection." Representing a curved surface in two dimensions causes distortion in shape, area, distance, and/or direction. Different map projections cause different types of distortions. For example, a projection could maintain the area of a feature but alter its shape. A map projection defines a relation between spherical coordinates on the globe (i.e., longitude and latitude in a global coordinate system) and flat planar x,y coordinates (i.e., a horizontal and vertical distance from a point of origin) in a projected coordinate system. A facilities map may provide geographic location information in one of several possible projected coordinate systems.

Thus, to overlay geo-location data (e.g., obtained from the location tracking system 130 of the marking device) on displayed facilities map information (or other image information), it is desirable to have the geo-location data and the facilities map information represented in the same geodetic global coordinate system or projected coordinate system (projected from the same geodetic geographical coordinate system). For example, in some embodiments, the geo-location data points obtained by the location tracking system of the marking device may be provided as geo-location data in the WGS84 coordinate system (i.e., the coordinate system typically used by GPS equipment), whereas the facilities map information may be expressed in the NAD83 coordinate system. Thus, at act 903, the geo-location data coordinates provided by the location tracking system of the marking device may be converted to the NAD83 coordinate system so that they may be appropriately overlaid on the displayed facilities map information.

The process next continues to act 905, where the data, converted if/as appropriate, may be overlaid on the information displayed on display 146, such that display 146 displays both the facilities map/image information and the overlaid data. For example, if the technician dispensed marking material at 2650.9273,N,08003.5193,W (decimal degrees) in the coordinate system used by the facilities map, an electronic mark may be overlaid on the displayed facilities map at the portion of the facilities map that corresponds to 2650.9273, N,08003.5193,W. Similarly, if the current location of the marking device is 2680.5243,N,08043.4193,W in the coordinate system used by the facilities map, then a "you are here"

icon may be overlaid on the displayed facilities map at the portion of the facilities map that corresponds to 2680.5243, N,08043.4193,W.

Any one of a number of different techniques may be used to overlay data on the displayed facilities map or image. In some embodiments, the data to be visually rendered on the facilities map or image is mapped to a display field of the display device to ensure that the geo-location data for the data to be overlaid is displayed over the proper place on the displayed facilities map or image. For example, in one exemplary implementation, a transformation may be derived using information relating to the available display field (e.g., a reference coordinate system using an appropriate scale for a given display field of a display device) to map data points in the geo-location data for the data to be overlaid to the available display field. Once such a transformation is derived, the data to be overlaid may be rendered in the display field by applying the transformation to the geo-location data for the data to be overlaid.

In the illustrative processes of FIGS. 16 and 17, a separate facilities map may be selected for each facility type (or facility company). However, in some embodiments, rather than using a separate facilities map for each facility type or facility company, an aggregated facilities map or facilities map database may be generated by combining data from multiple facilities maps, and data from the aggregated facilities map database may be selected and displayed on the display of the marking device. For example, if gas lines, water lines, and power lines are to be marked during a locate and/or marking operation in a particular location, an aggregated facilities map database may be generated by accessing the facilities map from the gas company for the location, the facilities map from the water company for the location, and the facilities map from the electric company from the location, extracting information about the location of map features (e.g., facility lines, streets, and/or other map features) from each of these facilities maps, converting the locations to a common frame of reference (e.g., using the techniques discussed above), and combining the extracted features into a database (e.g., from which a single aggregated map may be derived). Thus, rather than performing the process of FIG. 16 or 17 three times with three separate facilities maps (i.e., once using the gas facilities map, once using the water facilities map, and once using the electric facilities map), the aggregated facilities map may be used each time.

As with a facilities map for a single type of facility, in some embodiments, an electronic representation of the physical locate marks dispensed on the ground, an electronic representation of the current location of the technician (e.g., a you are here icon), or other information may be generated and rendered visually (i.e., overlaid) on the aggregated facilities map.

In some embodiments, the map or image data and the data to be overlaid (e.g., the electronic representation of the physical locate marks dispensed on the ground or the electronic representation of the current location of the technician), may be displayed as separate "layers" of the visual rendering, such that a viewer of the visual rendering may turn on and turn off displayed data based on a categorization of the displayed data. For example, all facilities map or image data may be categorized generally under one layer designation (e.g., "Reference"), and independently enabled or disabled for display (e.g., hidden) accordingly. Similarly, all overlaid data may be categorized generally under another layer designation (e.g., "Field") and independently enabled or disabled for display accordingly. Respective layers may be enabled or disabled for display in any of a variety of manners; for example, in one implementation, a "layer directory" or "layer legend" pane may be included in the display field (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "Field," different facility types that may have been marked (and indicated in the field data by color, for example) may be categorized under different sub-layer designations (e.g., "Field—Electric;" "Field—Gas;" etc.); in this manner, a viewer may be able to hide the electric field data while viewing the gas field data, or vice versa, in addition to having the option to view or hide all field data.

In some embodiments, a variety of other sub-layers may be used. For example, sub-layers may be provided for certain types of map metadata. In one example, landmarks (e.g., poles, pedestals, curbs, hydrants, street lights, and/or other types of landmarks) may be a separate sub-layer that can be toggled on and off from the display. In another example, sub-layers for a particular facility type may be provided. As one example, within the sub-layer "Field—Electric," a sub-layer may be provided for aerial electric lines, and another sub-layer may be provided for underground electric lines. As another example, for a sub-layer for telephone lines (e.g., "Field—Telephone"), sub-layers may be provided for the type of material used. For example, one sub-layer may be provided for copper telephone lines, while another sub-layer may be provided for fiber lines.

Similarly, in embodiments in which an aggregated facilities map is displayed on the display device, the "Reference" layer may have sub-layers for each facility type in the aggregated facilities map. That is, each facility type in the aggregated facilities map may have a different sub-layer designation, such that a viewer may be able to individually select which sub-layers are displayed on the display device. For example, if an aggregated facilities map includes information from a gas facilities map, an electric facilities map, and a cable TV (CATV) facilities map, the data from the gas facilities map, the data from the electric facilities map, and the data from the CATV facilities may each be a separate sub-layer. As such, the viewer may be able to select which of these layers he or she wishes to be displayed on the display, and which he or she wishes to be hidden.

Figure 18:
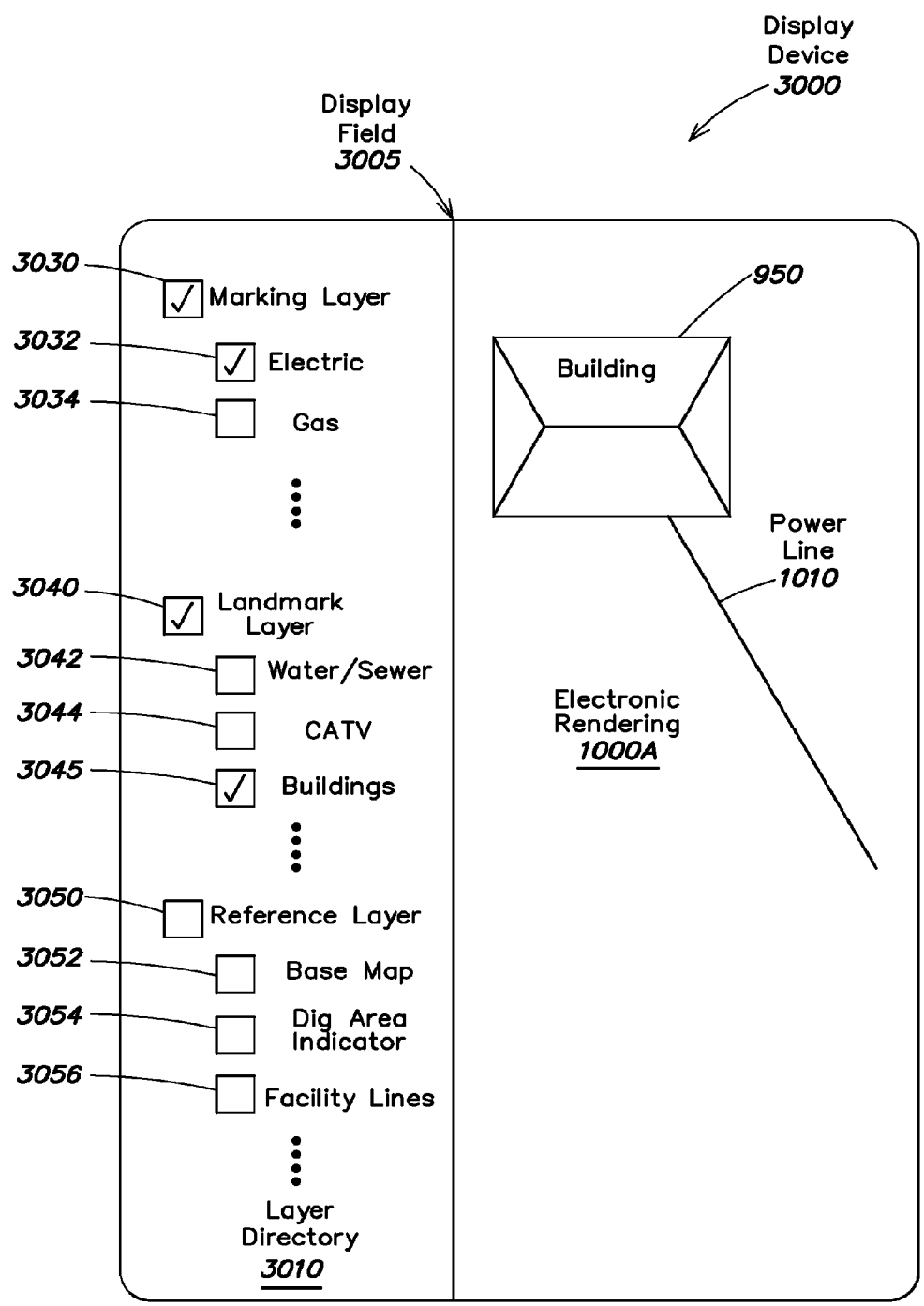
FIG. 18 shows a display device having a display field in which one or more display layers and/or sub-layers of marking information, landmark information and/or image/reference information may be selectively enabled or disabled for display, according to one embodiment of the present invention.

FIG. 18 shows a generic display device 3000 having a display field 3005 with exemplary content for purposes of explaining some concepts germane to display layers, according to one embodiment. For example, all marking information may be categorized generally under one layer designation 3030 ("marking layer") and independently enabled or disabled for display accordingly, all landmark information may be categorized generally under yet another layer designation 3040 ("landmark layer") and independently enabled or disabled for display accordingly, and all reference information may be categorized generally under yet another layer designation 3050 ("reference layer") and independent enabled or disabled for display. Respective layers may be enabled or disabled for display in any of a variety of manners; for example, in one implementation, a "layer directory" or "layer legend" pane 3010 may be included in the display field 3005 (or as a separate window selectable from the display field of the visual rendering), showing all available layers, and allowing a viewer to select each available layer to be either displayed or hidden, thus facilitating comparative viewing of layers.

Furthermore, any of the above-mentioned general categories for layers may have sub-categories for sub-layers, such that each sub-layer may also be selectively enabled or disabled for viewing by a viewer. For example, under the general layer designation of "marking layer," different facility types that may have been marked during a locate and/or marking operation (and indicated in the locate information by color, for example) may be categorized under different sub-layer designations (e.g., designation 3032 for "marking layer—electric;" designation 3034 for "marking layer—gas;" etc.); in this manner, a viewer may be able to hide only the electric marking information while viewing the gas marking information, or vice versa, in addition to having the option to view or hide all marking information. Under the layer designation of "landmark layer" different types of landmarks may be categorized under different sub-layer designations (e.g., designation 3042 for water/sewer landmarks, designation 3044 for cable TV landmarks, and designation 3045 for buildings). Under the layer designation of "reference layer" different types of reference information may be categorized under different sub-layer designations (e.g., designation 3052 for base map information, designation 3054 for dig area indicators, designation 3056 for facility lines).

As shown in the example of FIG. 18, of the marking, landmark, and reference layers, only the electric sub-layer of the marking layer and the buildings sub-layer of the landmark layer are enabled for display. Accordingly, in FIG. 18, only the electronic markings 1010 indicating where marking material for a power line was dispensed and building 950 appear in the electronic rendering 1000A shown in FIG. 18.

Virtually any characteristic of the information available for display may serve to categorize the information for purposes of displaying layers or sub-layers. In particular, with respect to information obtained during performance of a locate and/or marking operation, any of a variety of exemplary constituent elements of such information (e.g., timing information, geographic information, service-related information, ticket information, facility type information) may be categorized as a sub-layer, and one or more sub-layers may further be categorized into constituent elements for selective display (e.g., as sub-sub-layers). For example, timing information may be used to categorize the marking information based on a time at which marking material was dispensed, such that one sub-layer may include an electronic representation of the locations at which marking material was dispensed during a particular time window. Geographic information may be used to categorize the marking information based on a location at which marking material was dispensed, so that one sub-layer may include electronic representations of the locations at which marking material was dispensed for a particular geographic area.

Service-related information may include, for example, a service-provider identifier indicative of a service-provider overseeing the locate and/or marking operation, a technician identifier representing a technician that performs the locate operation and/or the marking operation, a device identifier representing a device used by the technician during the locate operation and/or the marking operation, and a status identifier representing an operating status of the at least one device. Any such service-related information may be used to categorize the marking information into one or more sub-layers.

Ticket information may include a ticket number identifying the ticket, a party identifier representing a party requesting the locate and/or the marking operation, a facility identifier representing a type and/or number of one or more facilities to be detected and/or marked in the locate and/or the marking operation, and/or a ground type identifier representing a ground type for a work site and/or dig area at which the locate and/or the marking operation is performed. Any such ticket information may be used to categorize the marking information into one or more sub-layers.

Similarly, with respect to the "Reference" layer, virtually any characteristic of the information available for display in this layer may serve to categorize the information for purposes of displaying sub-layers. For example, landmarks, particular types of landmarks, particular types of facility lines, dig area indicators (e.g., virtual white lines), facility lines owned by a particular entity, and/or facility lines in a particular geographic area may each be a separate sub-layer.

In some embodiments, processor 118 may automatically select which sub-layers in the "Reference" layer and/or the "Field" layer are displayed. For example, in some embodiments, processor 118 may automatically select particular sub-layers to be displayed based on the type of facility being marked. As discussed above, processor 118 may determine the type of facility being marked in a variety of ways, including for example, based on the color of the marking material in the marking material dispenser of the marking device. Based on the color of the marking material, processor 118 may automatically select certain sub-layers to be displayed and may select certain other sub-layers to not be displayed. For example, processor 118 may automatically select sub-layers related to facility type corresponding to the color of the marking material to be displayed, and may select sub-layers not related to that facility type to not be displayed. As one example, if the marking material in the marking material dispenser of the marking device is red, then processor 118 may automatically select for display one or more sub-layers for the "Field" layer that pertain to electric lines and may not display sub-layers related to other utility types. Processor 118 may also select sub-layers for the "Reference" layer that pertain to electric lines and may not display sub-layers related to other utility types.

In general, it should be appreciated that any constituent element of information from the field (e.g., marking information and/or landmark information) may be used as a basis for automatically selecting/enabling for display one or more sub-layers of reference/image information. For example, if landmark information indicates that acquired landmark geo-location data is associated with a hydrant, a "water facilities" sub-layer and/or a "water landmarks" sub-layer may be automatically selected from the "Reference" layer for display in the display field. Similarly, if marking information indicates that a gas main is being marked, a "gas facilities" sub-layer and/or a "gas landmarks" sub-layer may be automatically selected from the "Reference" layer for display in the display field. The foregoing are merely illustrative examples of automatic selection/enabling of Reference sub-layers, and the inventive concepts discussed herein are not limited in these respects.

V. CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A marking apparatus to mark a presence or an absence of an underground facility, the marking apparatus comprising:
    a housing;
    a marking dispenser holder coupled to the housing to hold a replaceable marking material;
    an actuator that, when actuated, causes dispensing of the marking material;
    a display device coupled to the housing;
    at least one sensor, coupled to the housing, to output geographic information indicative of a geographic location of the marking apparatus;
    at least one memory; and
    at least one processor, communicatively coupled to the display device and the at least one memory, the at least one processor configured to cause a display of a digital image on the display device, the at least one processor further configured to generate the digital image based at least in part on first digital image data selected by the at least one processor, wherein:
    the at least one processor is configured to select the first digital image data based, at least in part, on:
        at least one of facilities map data, survey map data, land survey data, photographic image data, construction drawings, and engineering drawings; and
        the geographic information output by the at least one sensor and indicative of the geographic location of the marking apparatus; and
    the at least one processor configured to overlay, on the displayed digital image, based at least in part on the geographic location of the marking apparatus, at least one electronic marking representing the dispensed marking material and a detected presence or absence of the underground facility.

2. The marking apparatus of claim 1, wherein the at least one processor is further configured to generate the digital image based at least in part on first digital image data from a remote device.

3. The marking apparatus of claim 2, wherein the at least one processor is configured to store the first digital image data in the at least one memory.

4. The marking apparatus of claim 2, wherein the first digital image data comprises at least one map image.

5. The marking apparatus of claim 1, wherein the at least one processor is configured to store data indicating a type of facility and the geographic location of the marking apparatus.

6. The marking apparatus of claim 1, wherein the at least one processor is configured to select a type of facility in response to a user input.

7. The marking apparatus of claim 1, wherein the at least one processor is configured to determine a type of facility to be marked in response to information provided by the at least one sensor.

8. The marking apparatus of claim 7, wherein the at least on sensor comprises at least one global position system (GPS) receiver that is coupled to the housing.

9. The marking apparatus of claim 8, wherein the marking apparatus further comprises an electronic compass, and wherein the information provided by the at least one sensor comprises information indicative of a heading of the marking apparatus, and wherein the at least one processor is configured to generate the digital image based at least in part on the heading of the marking apparatus.

10. The marking apparatus of claim 7, wherein the at least one sensor comprises a marking material sensing device configured to detect a color of the marking material in the marking dispenser holder, and wherein the information provided by the sensor comprises information indicative of the color of the marking material in the marking dispenser holder.

11. The marking apparatus of claim 1, wherein the at least one processor is configured to determine a type of facility to be marked based at least in part on information obtained from a ticket associated with a locate operation.

12. The marking apparatus of claim 11, wherein the information obtained from the ticket comprises an address at which the locate operation is requested to be performed.

13. The marking apparatus of claim 12, wherein the information obtained from the ticket comprises at least one member code indicative of the type of facility to be marked during performance of the locate operation.

14. The marking apparatus of claim 12, wherein the information obtained from the ticket comprises information identifying an entity that requested performance of the locate operation.

15. The marking apparatus of claim 2, wherein the at least one processor is configured to select the first digital image data based, at least in part, on a virtual white line image that indicates a location at which excavation is planned.

16. The marking apparatus of claim 2, wherein the first digital image data comprises first facilities map data, wherein the at least one memory stores the facilities map data including the first facilities map data, and wherein the at least one processor is configured to select the first facilities map data from the facilities map data stored in the at least one memory.

17. The marking apparatus of claim 1, wherein the at least one processor is configured to select an orientation at which to display, on the display device, the digital image, based at least in part on heading information indicative of a direction in which the marking apparatus is moving.

18. The marking apparatus of claim 17, further comprising at least one electronic compass, and wherein the at least one processor is configured to determine the heading information from the at least one electronic compass.

19. The marking apparatus of claim 16, further comprising at least one global positioning system (GPS) receiver, and wherein the at least one processor is configured to determine the heading information using information from the at least one GPS receiver.

20. The marking apparatus of claim 1, wherein the at least one processor is configured to at least one of translate, rotate and zoom the digital image.

21. The marking apparatus of claim 20, wherein the at least one processor is configured to at least one of translate, rotate and zoom the digital image in response to user input indicating a desired orientation or zoom of the digital image.

22. The marking apparatus of claim 1, wherein the digital image is a first digital image, and wherein the at least one processor is configured to cause the first digital image to be replaced on the display device with a second digital image that is in response to a change in the geographic location of the marking apparatus.

23. A method for displaying information on a marking wand having a housing, a marking dispenser holder coupled to the housing to hold a replaceable marking material, an actuator that, when actuated, causes dispensing of the marking material, a display device coupled to the housing, at least one sensor, coupled to the housing, to output geographic information indicative of a geographic location of the marking apparatus; at least one memory, and at least one processor, coupled to the display device and the at least one memory, the method comprising:
generating via the at least one processor, a digital image based at least in part on first digital image data selected by the at least one processor, wherein:
the at least one processor is configured to select the first digital image data based, at least in part, on:
at least one of facilities map data, survey map data, land survey data, photographic image data, constructions drawings, and engineering drawings; and
the geographic information output by the at least one sensor and indicative of the geographic location of the marking apparatus;
displaying on the display device coupled to the housing of the marking wand the digital image that is generated by the at least one processor; and
overlaying on the displayed digital image, based at least in part on the geographic location of the marking apparatus, at least one electronic marking representing the dispensed marking material and a detected presence or absence of the underground facility.

24. The method of claim 23, further comprising:
obtaining at least a portion first digital image data from a remote device.

25. The method of claim 24, further comprising:
storing the at least the portion of the first digital image data in the at least one memory.

26. The method of claim 24, wherein the at least the portion of the first digital image data comprises at least one map image.

27. The method of claim 23, wherein the at least one processor is configured to generate the digital image based on at least a portion of first digital image data.

28. The method of claim 23, wherein the at least one memory stores digital image data including the first digital image data and wherein the method further comprises:
selecting the first digital image data in response to a user input.

29. The method of claim 23, wherein the at least one memory stores digital image data including the first digital image data and wherein the method further comprises:
selecting the first digital image data in response to information provided by the at least one sensor.

30. The method of claim 23, wherein the at least one memory stores digital image data including the first digital image data and wherein method further comprises:
selecting the first digital image data in response to a user input and information provided by the at least one sensor.

31. The method of claim 29, wherein the at least one sensor comprises a global position system (GPS) receiver that is coupled to the housing, and wherein the information provided by the at least one sensor comprises information indicative of the geographic location of the marking apparatus.

32. The method of claim 31, wherein the at least one sensor comprises an electronic compass, and wherein the information provided by the at least one sensor comprises information indicative of a heading of the marking apparatus, and wherein the method further comprises:
selecting the first digital image data based at least in part on the heading of the marking apparatus.

33. The method of claim 29, wherein the marking wand comprises a marking material sensing device configured to detect a color of the marking material in the marking dispenser holder, and wherein the information provided by the marking material sensing device comprises information indicative of the color of the marking material in the marking dispenser holder.

34. The method of claim 23, wherein the method further comprises:
selecting the first digital image data based, at least in part, on information obtained from a ticket associated with a locate operation.

35. The method of claim 34, wherein the information obtained from the ticket comprises an address at which the locate operation is requested to be performed.

36. The method of claim 35, wherein the information obtained from the ticket comprises at least one member code indicative of a facility type to be marked during performance of the locate operation.

37. The method of claim 35, wherein the information obtained from the ticket comprises information identifying an entity that requested performance of the locate operation.

38. The method of claim 23, further comprising:
  selecting the first digital image data based, at least in part, on a virtual white line image that indicates a location at which excavation is planned.

39. The method of claim 23, wherein the first digital image data comprises first facilities map data, wherein the at least one memory stores facilities map data including the first facilities map data, and wherein the method further comprises:
  selecting the first facilities map data from the facilities map data stored in the at least one memory.

40. The method of claim 23, further comprising:
  selecting an orientation at which to display, on the display device, the digital image, based at least in part on heading information indicative of a direction in which the marking apparatus is moving.

41. The method of claim 40, wherein the marking apparatus further comprises at least one electronic compass, and wherein the method further comprises:
  determining the heading information from the at least one electronic compass.

42. The method of claim 40, wherein the marking apparatus further comprises at least one global positioning system (GPS) receiver, and wherein the method further comprises:
  determining the heading information using information from the at least one GPS receiver.

43. The method of claim 23, further comprising:
  translating, rotating or zooming the digital image.

44. The method of claim 43, wherein the act of translating, rotating or zooming the digital image is performed in response to user input indicating a desired orientation or zoom of the digital image.

45. The method of claim 23, wherein the digital image is a first digital image, and wherein the method further comprises:
  in response to a change in the geographic location of the marking apparatus, replacing the first digital image on the display device with a second digital image that is generated from second digital image data.

46. The method of claim 45, wherein the second digital image data comprises information not included in the first digital image data.

47. At least one non-transitory computer-readable storage medium encoded with instructions that, when executed on at least one processor in a marking apparatus having a housing, a marking dispenser holder coupled to the housing to hold a replaceable marking material, an actuator that, when actuated, causes dispensing of the marking material, a display device coupled to the at least one processor and the housing, at least one sensor, coupled to the housing, to output geographic information indicative of a geographic location of the marking apparatus; and at least one memory coupled to the at least one processor, causes the at least one processor to perform a method comprising:
  generating via the at least one processor, a digital image based at least in part on first digital image data selected by the at least one processor, wherein the at least one processor is configured to select the first digital image data based, at least in part, on:
    at least one of facilities map data, survey map data, land survey data, photographic image data, constructions drawings, and engineering drawings; and
    the geographic information output by the at least one sensor and indicative of the geographic location of the marking apparatus;
  displaying on the display device coupled to the housing of the marking apparatus the digital image that is generated by the at least one processor; and
  overlaying on the displayed digital image, based at least in part on the geographic location of the marking apparatus, at least one electronic marking representing the dispensed marking material and a detected presence or absence of the underground facility.

* * * * *